US012800987B2

(12) United States Patent
Lee

(10) Patent No.: US 12,800,987 B2
(45) Date of Patent: Nov. 17, 2026

(54) CAMERA ACTUATOR AND CAMERA MODULE COMPRISING SAME

(71) Applicant: LG INNOTEK CO., LTD., Seoul (KR)

(72) Inventor: Sung Guk Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 261 days.

(21) Appl. No.: 18/709,911

(22) PCT Filed: Nov. 21, 2022

(86) PCT No.: PCT/KR2022/018415

§ 371 (c)(1),
(2) Date: May 14, 2024

(87) PCT Pub. No.: WO2023/096287

PCT Pub. Date: Jun. 1, 2023

(65) Prior Publication Data

US 2025/0020974 A1 Jan. 16, 2025

(30) Foreign Application Priority Data

Nov. 26, 2021 (KR) ........................ 10-2021-0164988

(51) Int. Cl.
*G03B 5/00* (2021.01)
*G02B 27/64* (2006.01)
*G03B 30/00* (2021.01)

(52) U.S. Cl.
CPC ............. *G03B 5/00* (2013.01); *G02B 27/646* (2013.01); *G03B 30/00* (2021.01);
(Continued)

(58) Field of Classification Search
None
See application file for complete search history.

(56) References Cited

U.S. PATENT DOCUMENTS

2023/0314830 A1* 10/2023 Lee ...................... G02B 27/646
359/555
2024/0302625 A1* 9/2024 Lee ...................... H02K 11/215

FOREIGN PATENT DOCUMENTS

JP 2021-107854 7/2021
KR 10-2020-0013020 2/2020
(Continued)

OTHER PUBLICATIONS

International Search Report dated Feb. 21, 2023 issued in Application No. PCT/KR2022/018415.

*Primary Examiner* — Derek S. Chapel
(74) *Attorney, Agent, or Firm* — KED & ASSOCIATES, LLP

(57) ABSTRACT

An embodiment of the present invention discloses a camera actuator comprising: a housing; a mover disposed in the housing and having an optical member disposed therein; a tilting guide portion for guiding tilting of the mover; and a first magnetic body which presses the tilting guide portion against the mover and a second magnetic body which is smaller than the first magnetic body, wherein the tilting guide portion comprises: a base; first protrusions protruding from one surface of the base toward the mover; and second protrusions protruding from the other surface of the base in the opposite direction to the first protrusions, wherein any one of the first protrusions and the second protrusions are spaced apart from each other in a horizontal direction and have a plurality of contact points with any one of the mover and the housing, and the first magnetic body is located within contact points facing each other among the plurality of contact points.

20 Claims, 33 Drawing Sheets

(52) U.S. Cl.
CPC ................ *G03B 2205/0023* (2013.01); *G03B 2205/003* (2013.01); *G03B 2205/0069* (2013.01)

(56) References Cited

FOREIGN PATENT DOCUMENTS

| | | | | | |
|---|---|---|---|---|---|
| KR | 20210054716 | A | * | 5/2021 | ............. G03B 17/12 |
| KR | 10-2021-0067420 | | | 6/2021 | |
| KR | 10-2021-0078103 | | | 6/2021 | |
| KR | 10-2021-0117124 | | | 9/2021 | |

* cited by examiner

1150; 1151, 1152, 1153, 1154, 1155

PR2 : PR2a, PR2b

CAMERA ACTUATOR AND CAMERA MODULE COMPRISING SAME

CROSS-REFERENCE TO RELATED PATENT APPLICATIONS

This application is a U.S. National Stage Application under 35 U.S.C. § 371 of PCT Application No. PCT/KR2022/018415, filed Nov. 21, 2022, which claims priority to Korean Patent Application No. 10-2021-0164988, filed Nov. 26, 2021, whose entire disclosures are hereby incorporated by reference.

TECHNICAL FIELD

The present invention relates to a camera actuator and a camera module including the same.

BACKGROUND ART

A camera is a device for taking pictures or videos by capturing images of subjects and is mounted on mobile devices, drones, vehicles, or the like. To improve the quality of the image, a camera module may have an image stabilizer (IS) function for correcting or preventing the image shake caused by the movement of a user, an auto focusing (AF) function for aligning a focal length of a lens by automatically adjusting an interval between an image sensor and the lens, and a zooming function for capturing a remote subject by increasing or decreasing the magnification of the image of the remote subject through a zoom lens.

Meanwhile, a pixel density of the image sensor increases as a resolution of the camera increases, and thus a size of the pixel becomes smaller, and as the pixel becomes smaller, the amount of light received for the same time decreases. Therefore, as the camera has a higher pixel density, the image shake caused by hand shaking due to a shutter speed decreased in a dark environment may more severely occur. As a representative IS technique, there is an optical image stabilizer (OIS) technique of correcting motion by changing a path of light.

According to a general OIS technique, the motion of the camera may be detected through a gyro sensor or the like, and a lens may tilt or move, or a camera module including a lens and an image sensor may tilt or move based on the detected motion. When the lens or the camera module including the lens and the image sensor tilts or moves for an OIS, it is necessary to additionally secure a space for tilting or moving around the lens or the camera module.

Meanwhile, an actuator for an OIS may be disposed around the lens. In this case, the actuator for an OIS may include an actuator for X-axis tiling and an actuator for Y-axis tiling, wherein two axes, i.e., an X-axis and a Y-axis, are perpendicular to a Z-axis which is an optical axis.

However, according to the needs of ultra-slim and ultra-small camera modules, there is a large space constraint for arranging the actuator for an OIS, and it may be difficult to ensure a sufficient space where the lens or the camera module including the lens and the image sensor itself may tilt or move for an OIS. In addition, as the camera has a higher pixel density, it is preferable that a size of the lens be increased to increase the amount of received light, and there may be a limit to increasing the size of the lens due to a space occupied by the actuator for an OIS.

In addition, when a zooming function, an AF function, and an OIS function are all included in the camera module, there is also a problem that an OIS magnet and an AF or zoom magnet are disposed close to each other to cause magnetic field interference.

Furthermore, there is a problem that a protruding portion of a tilting guide unit in the camera actuator is affected by a magnetic force generated by magnets, thereby increasing a frictional force, increasing current consumption due to the frictional force, and decreasing an OIS suppression ratio.

DISCLOSURE

Technical Problem

The present invention is directed to providing a camera actuator and a camera device in which positions of a magnet and a protruding portion of a tilting guide unit are adjusted to decrease a force applied to the protruding portion of the tilting guide unit by the magnet.

In addition, the present invention is directed to providing a camera actuator and a camera device in which the magnet overlaps an inner region of the protruding portion of the tilting guide unit in an optical axis direction.

In addition, the present invention is directed to providing a camera actuator and a camera device applicable to ultra-slim, ultra-small, and high-resolution cameras.

The objects of embodiments are not limited thereto and may also include objects or effects that may be identified from the configurations or embodiments to be described below.

Technical Solution

A camera actuator according to an embodiment of the present invention includes a housing, a mover which is disposed in the housing and in which an optical member is disposed, a tilting guide unit configured to guide tilting of the mover, and a first magnet and a second magnet smaller than the first magnet, which press the tilting guide unit against the mover, wherein the tilting guide unit includes a base, first protruding portions protruding from one surface of the base toward the mover, and second protruding portions protruding from the other surface of the base in a direction opposite to a protruding direction of the first protruding portion, any protruding portions of the first protruding portions and the second protruding portions are disposed to be spaced apart from each other in a horizontal direction and have a plurality of contact points with any one of the mover and the housing, and the first magnet is positioned between contact points facing each other among the plurality of contact points.

The mover may include a first groove in which the first protruding portion is disposed, and the housing may include a second groove in which the second protruding portion is disposed.

The second protruding portion may include a first sub-protrusion and a second sub-protrusion spaced apart from each other in the horizontal direction, and the second groove may include a first contact point and a second contact point therein, wherein the first contact point may be in contact with the first sub-protrusion therein, and the second contact point may be in contact with the second sub-protrusion therein.

An inner region of the first contact point in the first sub-protrusion may have a different area from an inner region of the second contact point in the second sub-protrusion.

The first magnet may be positioned between the first contact point and the second contact point.

At least a portion of the first magnet may overlap the first sub-protrusion and the second sub-protrusion in an optical axis direction.

The first magnet may be misaligned with the first contact point and the second contact point in an optical axis direction.

The first magnet may be disposed between the first sub-protrusion and the second sub-protrusion to be misaligned with the first sub-protrusion and the second sub-protrusion in an optical axis direction.

The first magnet may be disposed inside the first protruding portion separated in a vertical direction, and the vertical direction may be a direction perpendicular to an optical axis direction and may be parallel to a direction in which light is incident on the optical member.

The optical axis direction may correspond to a direction from the first magnet to the second magnet.

The first magnet and the second magnet may face each other with the same polarity.

Advantageous Effects

According to embodiments of the present invention, it is possible to provide a camera actuator and a camera device in which positions of a magnet and a protruding portion of a tilting guide unit are adjusted to decrease a force applied to the protruding portion of the tilting guide unit by the magnet.

In addition, according to the present invention, it is possible to provide the camera actuator and the camera device in which the magnet overlaps an inner region of the protruding portion of the tilting guide unit in an optical axis direction.

In addition, since the protruding portion of the tilting guide unit is less affected from a magnet force generated by the magnets, it is possible to decrease a frictional force between the protruding portion and a contact point, thereby decreasing current consumption and increasing a suppression ratio for an optical image stabilizer (OIS).

According to the present invention, it is possible to implement a camera actuator and a camera device applicable to ultra-slim, ultra-small, and high-resolution cameras.

Various and beneficial advantages and effects of the present invention are not limited to the above-described contents and will be more readily understood in a process of describing specific embodiments of the present invention.

MODES OF THE INVENTION

Figure 1:
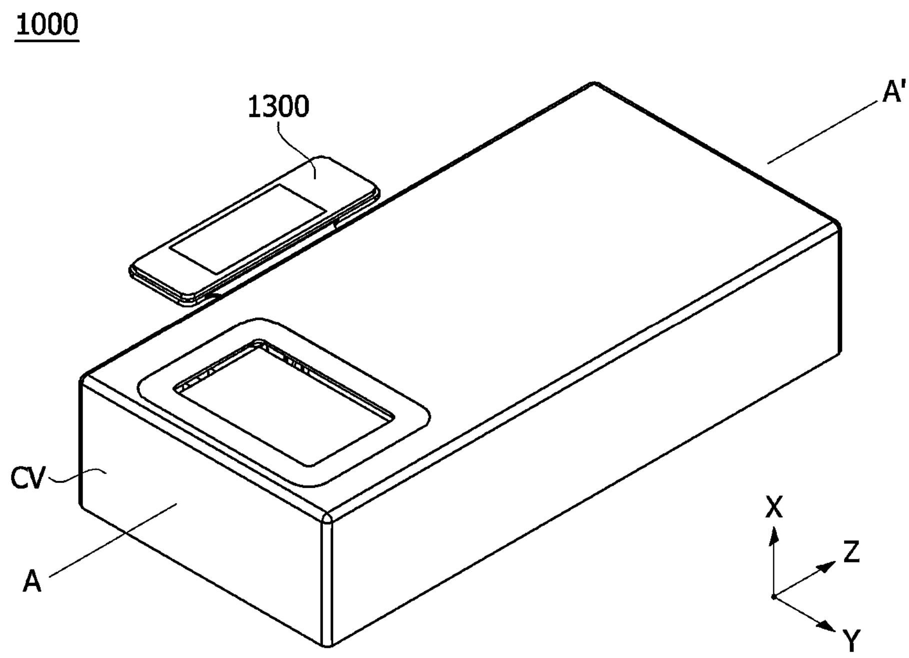
FIG. 1 is a perspective view of a camera module according to an embodiment.

Since the present invention may have various changes and embodiments, specific embodiments are shown and described in the accompanying drawings. However, it should be understood that it is not intended to limit specific embodiments, and it should be understood to include all modifications, equivalents, and substitutes included in the spirit and scope of the present disclosure.

Terms including ordinal numbers such as second or first may be used to describe various components, but the components are not limited by the terms. The terms are used only for the purpose of distinguishing one component from another. For example, a second component may be referred to as a first component, and similarly, the first component may also be referred to as the second component without departing from the scope of the present invention. The term "and/or" includes a combination or any of a plurality of related listed items.

When a first component is described as being "connected" or "coupled" to a second component, it should be understood that the first component may be directly connected or coupled to the second component or a third component may be present therebetween. On the other hand, when the first component is described as being "directly connected" or "directly coupled" to the second component, it should be understood that the third component is not present therebetween.

The terms used in the application are only used to describe specific embodiments and are not intended to limit the present invention. The singular expression includes the plural expression unless the context clearly dictates otherwise. In the application, it should be understood that terms "include" and "have" are intended to specify that a feature, a number, a step, an operation, a component, a part, or a combination thereof described in the specification is present, but do not preclude the possibility of the presence or addition of one or more other features, numbers, steps, operations, components, parts, or combinations thereof.

Unless defined otherwise, all terms used herein, including technical or scientific terms, have the same meaning as commonly understood by those of ordinary skill in the art to which the present invention pertains. Terms such as those defined in a commonly used dictionary should be construed as having a meaning consistent with the meaning in the context of the related art and should not be construed in an ideal or excessively formal meaning unless explicitly defined in the application.

Hereinafter, embodiments will be described in detail with reference to the accompanying drawings, and the same or corresponding components are denoted by the same reference numeral regardless of the reference numerals, and overlapping descriptions thereof will be omitted.

Figure 2:
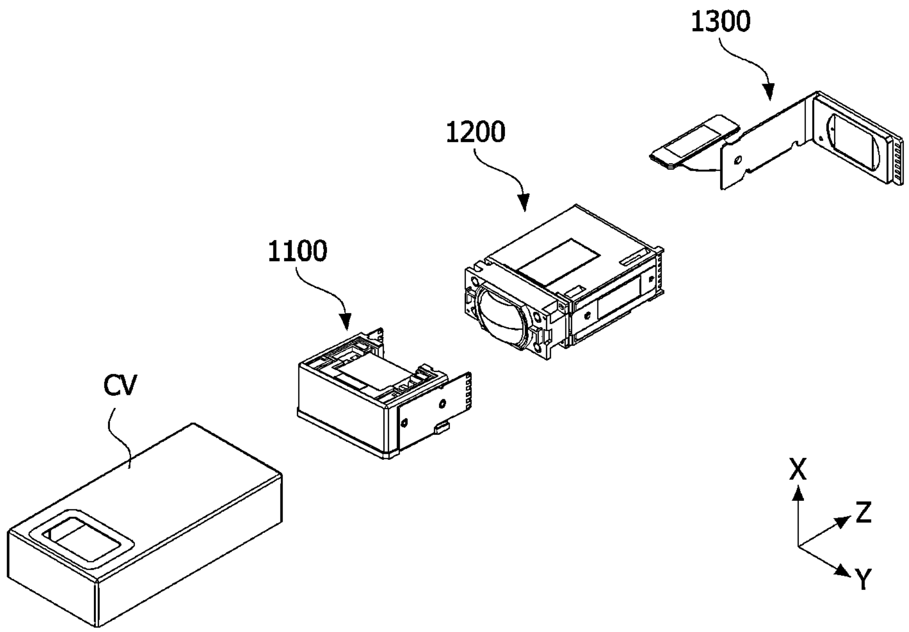
FIG. 2 is an exploded perspective view of the camera module according to the embodiment.
Figure 3:
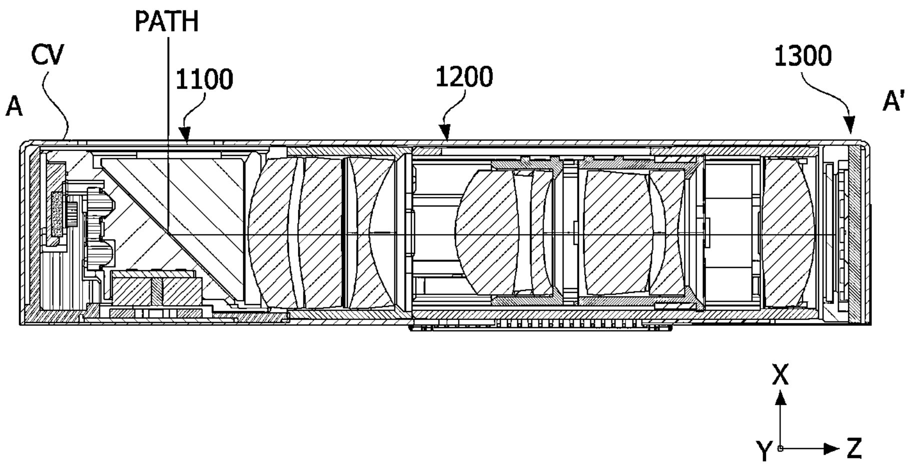
FIG. 3 is a cross-sectional view along line AA' in FIG. 1.

FIG. 1 is a perspective view of a camera module according to an embodiment, FIG. 2 is an exploded perspective view of the camera module according to the embodiment, and FIG. 3 is a cross-sectional view along line AA' in FIG. 1.

Referring to FIGS. 1 and 2, a camera module 1000 according to the embodiment may include a cover CV, a first camera actuator 1100, a second camera actuator 1200, and a circuit board 1300. Here, the first camera actuator 1100 may be used interchangeably with "first actuator," and the second camera actuator 1200 may be used interchangeably with "second actuator."

The cover CV may cover the first camera actuator 1100 and the second camera actuator 1200. It is possible to increase a coupling strength between the first camera actuator 1100 and the second camera actuator 1200 by the cover CV.

Furthermore, the cover CV may be made of a material which blocks electromagnetic waves. Therefore, it is possible to easily protect the first camera actuator 1100 and the second camera actuator 1200 in the cover CV.

In addition, the first camera actuator 1100 may be an optical image stabilizer (OIS) actuator. For example, the first camera actuator 1100 may move an optical member in a direction perpendicular to an optical axis.

The first camera actuator 1100 may include a fixed focal length lens disposed in a predetermined barrel (not shown). The fixed focal length lens may be referred to as "single focal length lens" or "single lens."

The first camera actuator 1100 may change an optical path. In an embodiment, the first camera actuator 1100 may vertically change the optical path through an internal optical member (e.g., a prism or a mirror). With this configuration, even when a thickness of a mobile terminal decreases, a configuration of a lens which is greater than the thickness of the mobile terminal is disposed in the mobile terminal so that zooming, auto focusing (AF), and OIS functions may be performed through the change in the optical path.

However, the present invention is not limited thereto, and the first camera actuator 1100 may change the optical path vertically or at a predetermined angle multiple times.

The second camera actuator 1200 may be disposed at a rear end of the first camera actuator 1100. The second camera actuator 1200 may be coupled to the first camera actuator 1100. In addition, the mutual coupling may be performed in any of various methods.

In addition, the second camera actuator 1200 may be a zoom actuator or an AF actuator. For example, the second camera actuator 1200 may support one lens or a plurality of lenses and perform an AF function or a zooming function by moving the lenses according to a predetermined control signal of a control unit. In addition, one lens or a plurality of lens may independently or separately move in an optical axis direction.

In addition, the circuit board 1300 may be disposed at a rear end of the second camera actuator 1200. The circuit board 1300 may be electrically connected to the second camera actuator 1200 and the first camera actuator 1100. In addition, a plurality of circuit boards 1300 may be provided.

A camera module according to the embodiment may be formed of one camera module or a plurality of camera modules. For example, the plurality of camera modules may include a first camera module and a second camera module.

In addition, the first camera module may include one actuator or a plurality of actuators. For example, the first camera module may include the first camera actuator 1100 and the second camera actuator 1200.

In addition, the second camera module may include an actuator (not shown) disposed in a predetermined housing (not shown) and capable of driving a lens unit. The actuator may be a voice coil motor, a micro actuator, a silicon actuator, and the like and applied in various methods such as an electrostatic method, a thermal method, a bimorph method, and an electrostatic force method, but the present invention is not limited thereto. In addition, in the specification, the camera actuator may be referred to as "actuator" or the like. In addition, the camera module formed of the plurality of camera modules may be mounted in any of various electronic devices such as a mobile terminal.

Referring to FIG. 3, the camera module according to the embodiment may include the first camera actuator 1100 for performing the OIS function and the second camera actuator 1200 for performing the zooming function and the AF function.

Light may enter the camera module or the first camera actuator through an opening region positioned in an upper surface of the first camera actuator 1100. In other words, the light may enter the first camera actuator 1100 in an optical axis direction (e.g., an X-axis direction), and the optical path may be changed in a Z-axis direction through the optical member. In addition, the light may pass through the second camera actuator 1200 and enter an image sensor IS positioned at one end of the second camera actuator 1200 (PATH).

In the specification, a lower surface indicates one side in a first direction. In addition, the first direction is the X-axis direction in the drawings and can be used interchangeably with a second axis direction or the like. A second direction is a Y-axis direction in the drawings and can be used interchangeably with a first axis direction or the like. The second direction is a direction perpendicular to the first direction. In addition, the third direction is the Z-axis direction in the drawings and can be used interchangeably with a third axis direction or the like. In addition, the third direction is perpendicular to both the first direction and the second direction. Here, the third direction (Z-axis direction) corresponds to the optical axis direction, and the first direction (X-axis direction) and the second direction (Y-axis direction) are directions perpendicular to an optical axis and may be tilted by the second camera actuator. In addition, hereinafter, the optical axis direction is the third direction (Z-axis direction) in the description of the first camera actuator 1100, and based on the same, the following description will be made. Furthermore, the first camera actuator can be used interchangeably with "first actuator," "first lens driving device," "first lens driving unit," "first lens transport device," "first lens moving device," or the like. In addition, the second camera actuator can be used interchangeably with "second actuator," "second lens driving device," "second lens driving unit," "second lens transport device," "second lens moving device," or the like. Furthermore, the camera module is used interchangeably with "camera apparatus," "camera device," "camera assembly," "imaging apparatus," "imaging device," or the like.

In addition, in the specification, "inward" may be a direction from the cover CV toward the first camera actuator, and "outward" may be a direction opposite to "inward." In other words, the first camera actuator and the second camera actuator may be positioned inside the cover CV, and the cover CV may be positioned outside the first camera actuator or the second camera actuator.

In addition, with this configuration, the camera module according to the embodiment may resolve the spatial limitations of the first camera actuator and the second camera actuator by changing the optical path. In other words, the camera module according to the embodiment may extend the optical path in response to the change in the optical path while minimizing the thickness of the camera module. Furthermore, it should be understood that the second camera actuator may provide a high range of magnification by controlling a focus or the like in the extended optical path.

In addition, the camera module according to the embodiment can implement an OIS by controlling the optical path through the first camera actuator, thereby minimizing the occurrence of a decentering or tilting phenomenon and providing the best optical characteristics.

Furthermore, the second camera actuator 1200 may include an optical system and a lens driving unit. For example, at least one of a first lens assembly, a second lens assembly, a third lens assembly, and a guide pin may be disposed in the second camera actuator 1200.

In addition, the second camera actuator 1200 may include a coil and a magnet to perform a high-magnification zooming function.

For example, although the first lens assembly and the second lens assembly may be moving lenses which move through the coil, the magnet, and the guide pin, and the third lens assembly may be a fixed lens, the present invention is not limited thereto. For example, the third lens assembly may perform a function of a focator by which light forms an image at a specific position, and the first lens assembly may perform a function of a variator for re-forming an image formed by the third lens assembly, which is the focator, at another position. Meanwhile, the first lens assembly may be in a state in which a magnification change is large because a distance to a subject or an image distance is greatly changed, and the first lens assembly, which is the variator, may play an important role in a focal length or magnification change of the optical system. Meanwhile, imaging points of an image formed by the first lens assembly, which is the variator, may be slightly different depending on a position. Therefore, the second lens assembly may perform a position compensation function for the image formed by the variator. For example, the second lens assembly may perform a function of a compensator for accurately forming an image at an actual position of the image sensor using the imaging points of the image formed by the first lens assembly which is the variator. For example, the first lens assembly and the second lens assembly may be driven by an electromagnetic force generated by the interaction between the coil and the magnet. The above description may be applied to a lens assembly to be described below. In addition, the first lens assembly to the third lens assembly may move in the optical axis direction, that is, in the third direction. In addition, the first lens assembly to the third lens assembly may move in the third direction independently or dependently.

Meanwhile, when the OIS actuator and the AF or zoom actuator are disposed according to the embodiment of the present invention, it is possible to prevent magnetic field interference with an AF or zoom magnet when an OIS is driven. Since a first driving magnet of the first camera actuator 1100 is disposed separately from the second camera actuator 1200, it is possible to prevent the magnetic field interference between the first camera actuator 1100 and the second camera actuator 1200. In the specification, an OIS can be used interchangeably with terms such as hand shaking correction, optical image stabilization, optical image correction, or shaking correction.

Figure 4:
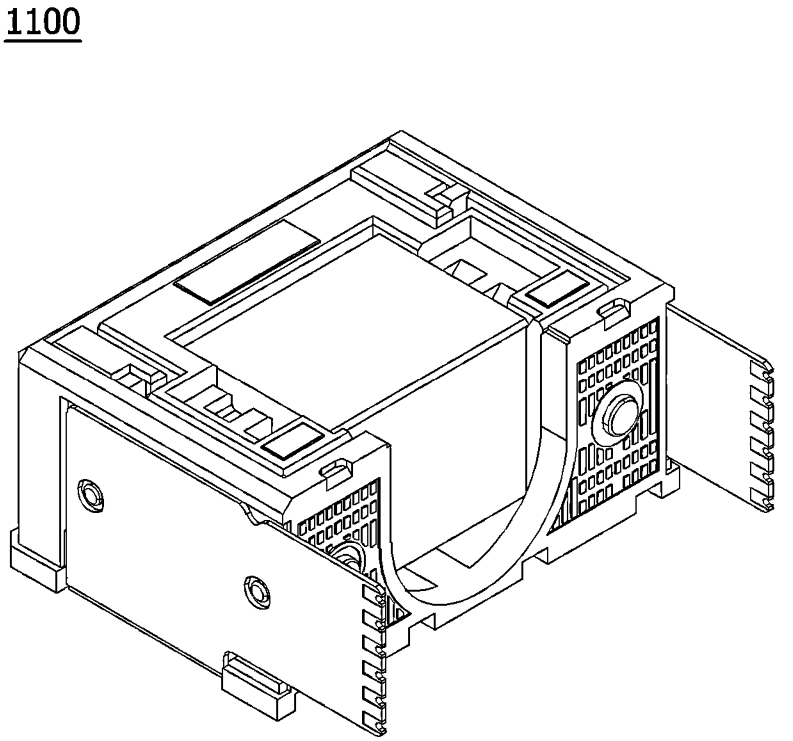
FIG. 4 is a perspective view of a first camera actuator according to the embodiment.
Figure 5:
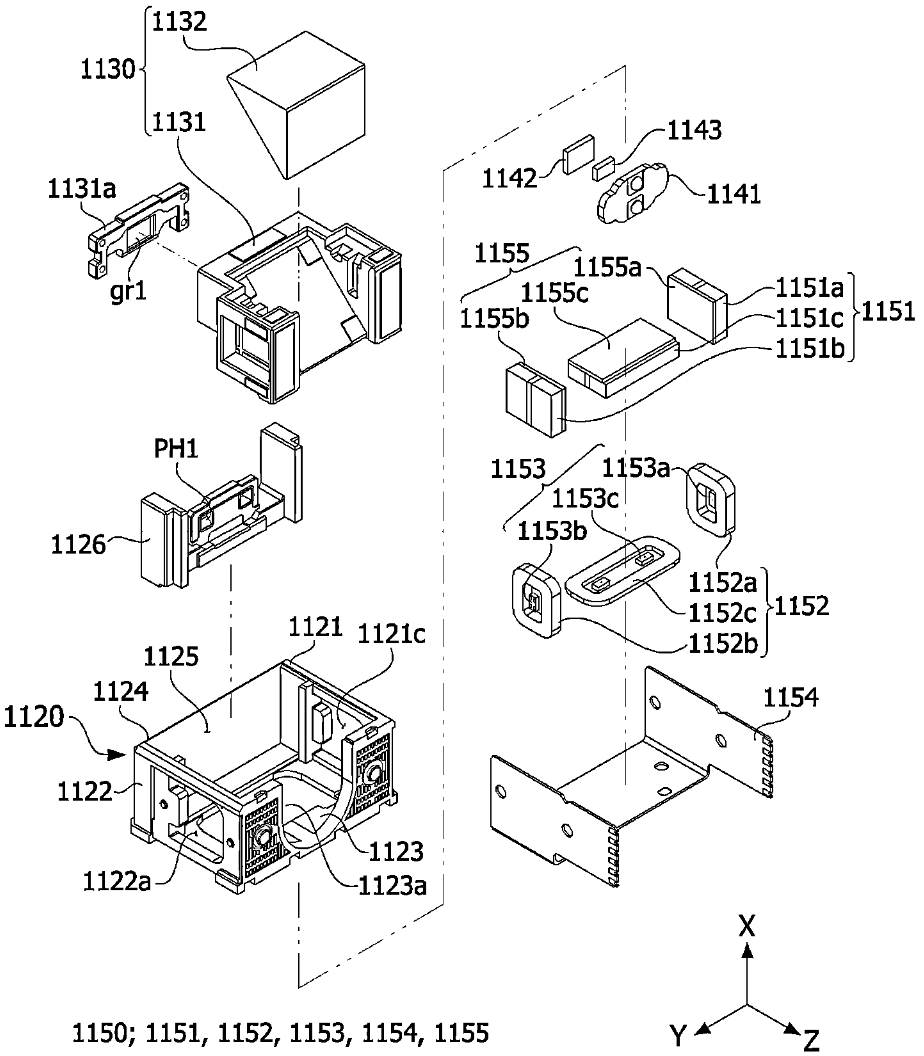
FIG. 5 is an exploded perspective view of the first camera actuator according to the embodiment.

FIG. 4 is an exploded perspective view of the first camera actuator according to the embodiment, and FIG. 5 is an exploded perspective view of the first camera actuator according to the embodiment.

Referring to FIGS. 4 and 5, the first camera actuator 1100 according to the embodiment includes a first housing 1120, a mover 1130, a rotating unit 1140, a first driving unit 1150, a first member 1126, and a second member 1131*a*.

The mover 1130 may include the holder 1131 and the optical member 1132 seated on the holder 1131. In addition, the mover 1130 may be disposed in the housing 1120. In addition, the rotating unit 1140 may include the tilting guide unit 1141, and a second magnet 1142 and a first magnet 1143 having different polarities to press the tilting guide unit 1141. The first magnet 1143 and the second magnet 1142 may have different sizes. In an embodiment, the first magnet 1143 may have a greater size than the second magnet 1142. For example, the first magnet 1143 and the second magnet 1142 may have the same length in the optical axis direction or the third direction (Z-axis direction) and have different areas in the first direction and the second direction. In this case, the area of the first magnet 1143 may be greater than the area of the second magnet 1142. In addition, the first driving unit 1150 includes a driving magnet 1151, a driving coil 1152, a Hall sensor unit 1153, a first board unit 1154, and a yoke unit 1155.

First, the first camera actuator 1100 may include a shield can (not shown). The shield can (not shown) may be positioned at an outermost side of the first camera actuator 1100 to surround the rotating unit 1140 and the first driving unit 1150, which will be described below.

The shield can (not shown) can block or reduce electromagnetic waves generated from the outside. In other words, the shield can (not shown) can reduce the occurrence of malfunction in the rotating unit 1140 or the first driving unit 1150.

A first housing 1120 may be positioned inside the shield can (not shown). When there is no shield can, the first housing 1120 may be positioned at the outermost side of the first camera actuator.

In addition, the first housing 1120 may be positioned inside the first board unit 1154 to be described below. The first housing 1120 may be fastened by being fitted into or matched with the shield can (not shown).

The first housing 1120 may include a first housing side portion 1121, a second housing side portion 1122, a third housing side portion 1123, and a fourth housing side portion 1124. Detailed description thereof will be made below.

The first member 1126 may be disposed in the first housing 1120. The first member 1126 may be disposed between a second member **1131*a* and the housing. The first member 1126** may be disposed in the housing or positioned at one side of the housing. Description thereof will be made below.

The mover 1130 may include a holder 1131 and an optical member 1132 seated on the holder 1131.

The holder 1131 may be seated in an accommodating part 1125 of the first housing 1120. The holder 1131 may include a first holder outer surface to a fourth holder outer surface corresponding to the first housing side portion 1121, the second housing side portion 1122, the third housing side portion 1123, and the first member 1126, respectively. For example, the first holder outer surface to the fourth holder outer surface may correspond to or face inner surfaces of the first housing side portion 1121, the second housing side portion 1122, the third housing side portion 1123, and the first member 1126, respectively.

In addition, the holder 1131 may include the second member **1131*a*** disposed in a fourth seating groove. Detailed description thereof will be made below.

The optical member 1132 may be seated on the holder 1131. To this end, the holder 1131 may have a seating surface, and the seating surface may be formed by an accommodating groove. In an embodiment, the optical member 1132 may be formed of a mirror or a prism. Hereinafter, the optical member 1132 is shown as being the prism, but may be formed of a plurality of lenses as in the above-described embodiment. Alternatively, the optical member 1132 may be formed of the plurality of lenses and the prism or the mirror. In addition, the optical member 1132 may include a reflector disposed therein. However, the present invention is not limited thereto.

In addition, the optical member 1132 may reflect light reflected from the outside (e.g., an object) into the camera module. In other words, the optical member 1132 can resolve the spatial limitations of the first camera actuator and the second camera actuator by changing the path of the reflected light. Therefore, it should be understood that the camera module may provide a high range of magnification by extending the optical path while minimizing a thickness thereof.

Additionally, the second member **1131*a* may be coupled to the holder 1131. The second member 1131*a* may be disposed outside the holder 1131 and inside the housing. In addition, the second member 1131*a* may be seated in an additional groove positioned in a region other than the fourth seating groove in the fourth holder outer surface of the holder 1131. Therefore, the second member 1131*a* may be coupled to the holder 1131, and at least a portion of the first member 1126 may be positioned between the second member 1131*a* and the holder 1131. For example, the at least a portion of the first member 1126 may pass through a space formed between the second member 1131*a* and the holder 1131**.

In addition, the second member **1231*a* may be structured separately from the holder 1131. With this configuration, the first camera actuator may be easily assembled as will be described below. Alternatively, the second member 1131*a* may be integrally formed with the holder 1131**, but will be described below as the separated structure.

The rotating unit 1140 includes a tilting guide unit 1141, and the second magnet 1142 and the first magnet 1143 having different polarities to press the tilting guide unit 1141.

The tilting guide unit 1141 can be used interchangeably with any of various terms such as "body," "body unit," "rotation guide unit," and "rotation plate."

In addition, the tilting guide unit 1141 may be coupled to the mover 1130 and the first housing 1120. Specifically, the tilting guide unit 1141 may be disposed between the holder 1131 and the first member 1126. Therefore, the tilting guide unit 1141 may be coupled to the mover 1130 of the holder 1131 and the first housing 1120. However, unlike the above description, in the present embodiment, the tilting guide unit 1141 may be disposed between the first member 1126 and the holder 1131. Specifically, the tilting guide unit 1141 may be positioned between the first member 1126 and the fourth seating groove of the holder 1131.

In addition, the second magnet 1142 and the first magnet 1143 may be respectively seated in a first groove gr1 formed in the second member **1131*a* and a second groove gr2 formed in the first member 1126. In the present embodiment, the positions of the first groove gr1 and the second groove gr2 may be different from those of the first and second grooves described above in other embodiments. However, the first groove gr1 is positioned in the second member 1131*a* and moves integrally with the holder, and the second groove gr2 is positioned on the first member 1126 corresponding to the first groove gr1 and coupled to the first housing 1120**. Therefore, the following description will be made by interchangeably using these terms.

In addition, the tilting guide unit 1141 may be disposed adjacent to the optical axis. Therefore, the actuator according to the embodiment may easily change the optical path according to first-axis tilting and second-axis tilting, which will be described below.

The tilting guide unit 1141 may include first protruding portions disposed to be spaced apart from each other in the first direction (X-axis direction) and second protruding portions disposed to be spaced apart from each other in the second direction (Y-axis direction). In addition, the first protruding portion and the second protruding portion may protrude in opposite directions. Detailed description thereof will be made below. The first protruding portion may protrude toward the mover. In addition, the first protruding portion may extend from a base in the optical axis direction or the third direction (Z-axis direction). In addition, the second protruding portion may protrude in a direction opposite to a protruding direction of the first protruding portion. In other words, the second protruding portion may extend in a direction opposite to the optical axis direction or a direction opposite to the third direction (Z-axis direction). In addition, the second protruding portion may extend toward the first member 1126 or the housing 1120.

In addition, as described above, the second magnet 1142 may be positioned in the second member 1131*a*. In addition, the first magnet 1143 may be positioned in the first member 1126.

The second magnet 1142 and the first magnet 1143 may have the same polarity. For example, the second magnet 1142 may be a magnet having an N pole, and the first magnet 1143 may be a magnet having an N pole. Alternatively, the second magnet 1142 may be a magnet having an S pole, and the first magnet 1143 may be a magnet having an S pole.

For example, a first pole surface of the first magnet 1143 and a second pole surface of the second magnet 1142 facing the first pole surface may have the same polarity.

The second magnet 1142 and the first magnet 1143 may generate a repulsive force therebetween due to the above-described polarity. With this configuration, the above-described repulsive force may be applied to the second member 1131*a* or the holder 1131 coupled to the second magnet 1142 and the first member 1126 or the first housing 1120 coupled to the first magnet 1143. In this case, the repulsive force applied to the second member 1131*a* may be transmitted to the holder 1131 coupled to the second member 1131*a*. Therefore, the tilting guide unit 1141 disposed between the second member 1131*a* and the first member 1126 may be pressed by the repulsive force. In other words, the repulsive force may maintain the position of the tilting guide unit 1141 between the holder 1131 and the first housing 1120 (or the first member 1126). With this configuration, the position between the mover 1130 and the first housing 1120 can be maintained even during X-axis tilting or Y-axis tilting. In addition, the tilting guide unit may be in close contact with the first member 1126 and the holder 1131 by the repulsive force between the first magnet 1143 and the second magnet 1142. The tilting guide unit 1141 may guide the tilting of the mover 1130.

The first driving unit 1150 includes the driving magnet 1151, the driving coil 1152, the Hall sensor unit 1153, the first board unit 1154, and the yoke unit 1155. Description thereof will be made below.

Figure 6A:
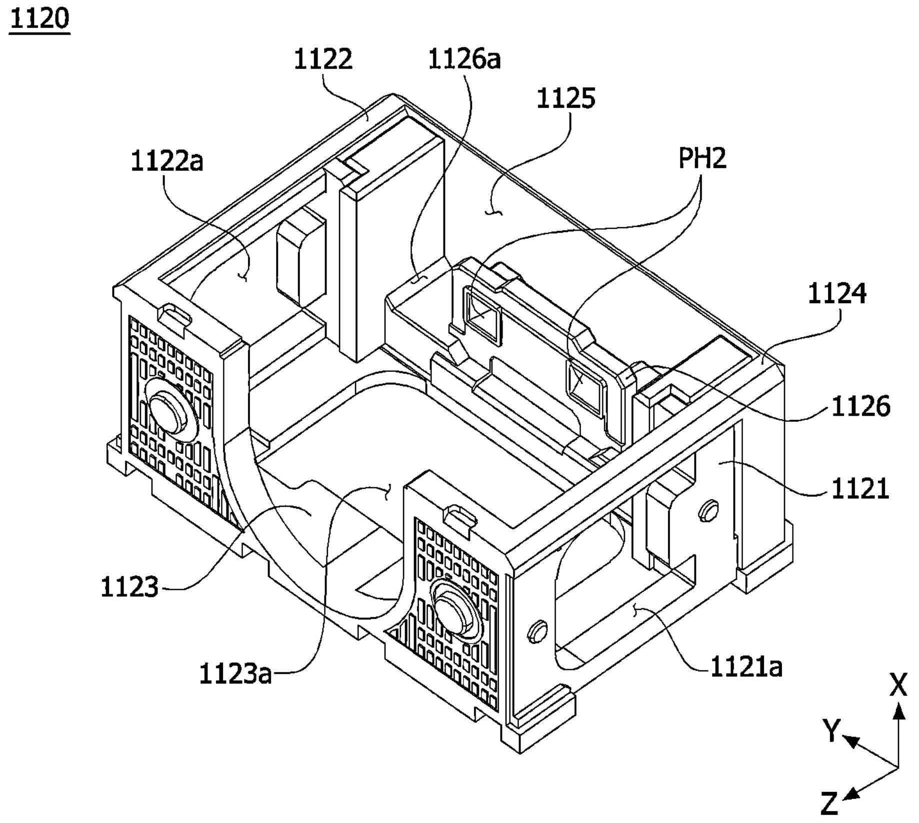
FIG. 6A is a perspective view of a first housing of the first camera actuator according to the embodiment.
Figure 6B:
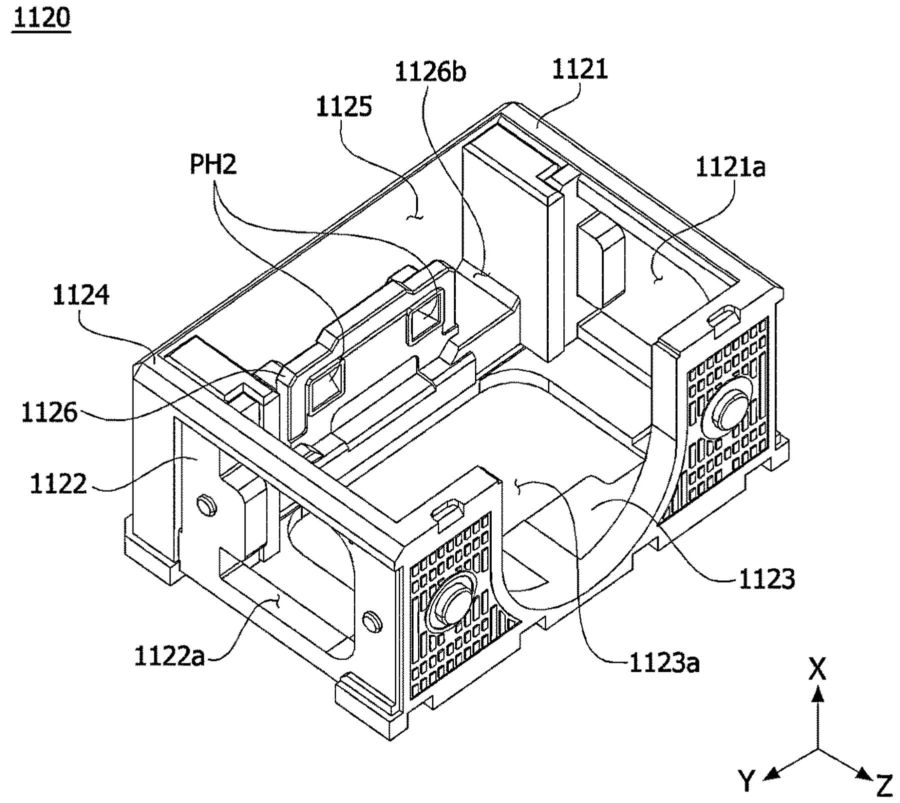
FIG. 6B is a perspective view in a different direction from FIG. 6A.
Figure 6C:
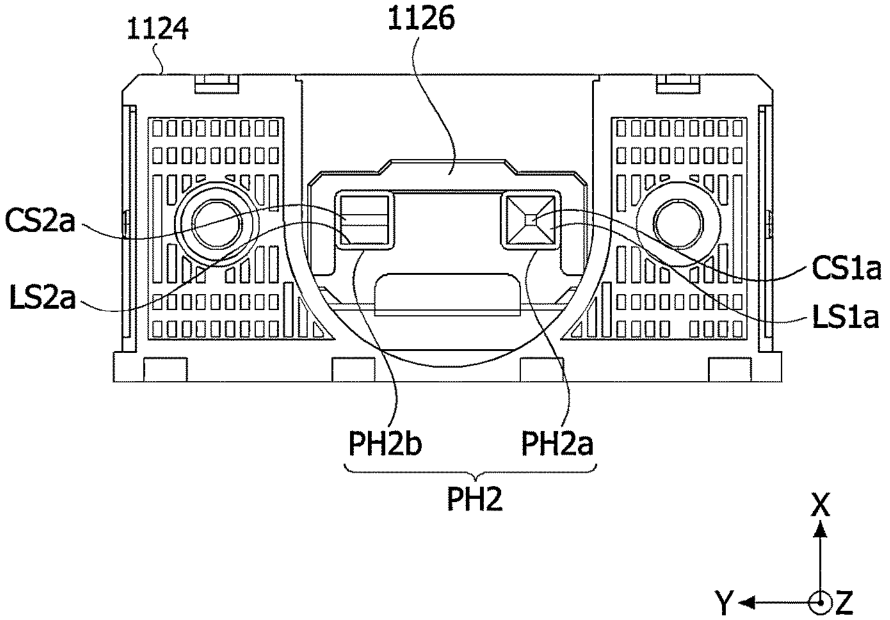
FIG. 6C is a front view of the first housing of the first camera actuator according to the embodiment.

FIG. 6A is a perspective view of a first housing of the first camera actuator according to the embodiment, FIG. 6B is a perspective view in a different direction from FIG. 6A, and FIG. 6C is a front view of the first housing of the first camera actuator according to the embodiment.

Referring to FIGS. 6A to 6C, the first housing 1120 according to the embodiment may include the first housing side portion 1121 to the fourth housing side portion 1124. In addition, the first member 1126 may be integrally formed by being coupled to the first housing 1120. Therefore, the first member 1126 may be a component included in the first housing 1120. In other words, the first housing 1120 may be integrally formed by being coupled to the first member 1126. Alternatively, the first housing 1120 may include the first member 1126. For example, the first member 1126 may be structured separately from the first housing 1120 for assembly and positioned on one side portion of the first housing 1120 as described above. For example, the first member 1126 may be in contact with the first housing side portion 1121 to the third housing side portion 1123. In addition, a sixth housing side portion 1126 may be seated between the first housing side portion 1121 to the fourth housing side portion 1124. Therefore, the sixth housing side portion 1126 may be positioned on the third housing side portion 1123. For example, the sixth housing side portion 1126 may be positioned at one side of the third housing side portion 1123. The sixth housing side portion 1126 and the holder may be sequentially positioned in the third direction.

The first housing side portion 1121 and the second housing side portion 1122 may be disposed to face each other. In addition, the third housing side portion 1123 and the fourth housing side portion 1124 may be disposed to face each other.

In addition, the third housing side portion 1123 and the fourth housing side portion 1124 may be disposed between the first housing side portion 1121 and the second housing side portion 1122.

The third housing side portion 1123 and the fourth housing side portion 1124 may be in contact with the first housing side portion 1121, the second housing side portion 1122, and the fourth housing side portion 1124. In addition, the third housing side portion 1123 may be a lower surface of the first housing 1120. In addition, the fourth housing side portion 1124 may be an upper surface of the first housing 1120. In addition, the above-described contents can also be applied to description of a direction in the same manner.

In addition, the first housing side portion 1121 may include a first housing hole 1121*a*. A first coil to be described below may be positioned in the first housing hole 1121*a*.

In addition, the second housing side portion 1122 may include a second housing hole 1122*a*. In addition, the second coil 1152*b* to be described below may be positioned in the second housing hole 1122*a*.

In addition, the first housing side portion 1121 and the second housing side portion 1122 may be side surfaces of the first housing 1120.

The first coil and the second coil may be coupled to a first board unit. In an embodiment, the first coil and the second coil may be electrically connected to the first board unit to allow a current to flow therethrough. The current is an element of an electromagnetic force capable of tilting the second camera actuator with respect to an X-axis.

In addition, the third housing side portion 1123 may include a third housing hole 1123*a*.

A third coil to be described below may be positioned in the third housing hole 1123*a*. In addition, the third coil 1152*c* may be electrically connected and coupled to the first board unit in contact with the first housing 1120. Therefore, the third coil may be electrically connected to the first board unit to receive a current from the first board unit. The current is an element of an electromagnetic force capable of tilting the second camera actuator with respect to a Y-axis.

The first member 1126 may be seated between the first housing side portion 1121 to the fourth housing side portion 1124. Therefore, the first member 1126 may be positioned on the third housing side portion 1123. For example, the first member 1126 may be positioned at one side of the third housing side portion 1123. The first member 1126 and the holder may be sequentially positioned in the third direction.

The fourth housing side portion 1124 may be disposed between the first housing side portion 1121 and the second housing side portion 1122 and may be in contact with the first housing side portion 1121, the second housing side portion 1122, and the third housing side portion 1123.

In addition, the fourth housing side portion 1124 may include a fourth housing hole 1124*a*. The fourth housing hole 1124*a* may be positioned above the optical member. Therefore, light may enter the optical member after passing through the fourth housing hole 1124*a*.

In addition, the first housing 1120 may include the accommodating part 1125 formed by the first housing side portion 1121 to the fourth housing side portion 1124. The first member 1126, the second member 1131*a*, and the mover 1130 may be positioned in the accommodating part 1125 as components.

In addition, the first housing 1120 may further include a fifth housing side portion facing the first member 1126. In addition, the fifth housing side portion may be disposed between the first housing side portion 1121 and the second housing side portion 1122 and may be in contact with the first housing side portion 1121, the second housing side portion 1122, and the third housing side portion 1123. In addition, the fifth housing side portion may include an opening region to provide a path along which the light reflected from the optical member 1132 moves. In addition, the fifth housing side portion may include protrusions, grooves, and the like to provide easy coupling with other camera actuators adjacent thereto. With this configuration, it is possible to increase the coupling strength between the fifth housing side portion providing the optical path and at the same time, having the opening providing the optical path and other components, thereby suppressing the position change of the opening due to separation or the like and thus minimizing a change in optical path. Furthermore, the first member 1126 or the sixth housing side portion may be positioned to face the fifth housing side portion. In addition, the first member 1126 includes a second protrusion groove in which the second protruding portion of the tilting guide unit is seated. A second protrusion groove PH2 may be positioned in the first member 1126. Therefore, in the first member 1126, the protruding portion (e.g., the second protruding portion) of the tilting guide unit is disposed adjacent to the prism in the fourth seating groove so that the protruding portion, which is a reference axis of tilting, is disposed adjacent to the center of gravity of the mover 1130. Therefore, when the holder is tilted, a moment for moving the mover 1130 for tilting can be minimized. Therefore, it is possible to minimize the current consumption for driving the coil, thereby reducing the power consumption of the camera actuator.

In addition, as described above, the first member 1126 may be a component included in the first housing 1120 by being coupled to the first housing 1120. In other words, the first housing 1120 may include the first member 1126.

In addition, the first member 1126 may be disposed in the first housing 1120. Alternatively, the first member 1126 may be positioned in the first housing 1120.

In addition, the first member 1126 may be coupled to the first housing 1120. In an embodiment, the first member 1126 may be positioned between the first housing side portion 1121 and the second housing side portion 1122. In addition, the first member 1126 may be positioned between the third housing side portion 1123 and the fourth housing side portion 1124.

In addition, the first member 1126 may be positioned on the third housing side portion 1123 and may be in contact with the first housing side portion to the third housing side portion.

In addition, when the first member 1126 is formed integrally with the first housing, the first member 1126 may include a through-hole. The through-hole may be provided as a plurality of through-holes and may include a first through-hole 1126*a* and a second through-hole 1126*b*.

First and second extensions of the second member, which will be described below, may pass through the first through-hole 1126*a* and the second through-hole 1126*b*, respectively. Therefore, the second member may be coupled to the first member. In other words, the first housing and the mover may be coupled.

The second protrusion groove PH2 may be positioned between the first through-hole 1126*a* and the second through-hole 1126*b*. With this configuration, it is possible to increase the coupling strength between the tilting guide unit 1141 and the first member 1126, thereby preventing a reduction in tilting accuracy caused by the movement of the tilting guide unit 1141 in the first housing.

In addition, the second groove gr2 may be positioned in the first member 1126. The first magnet may be seated in the second groove gr2. In addition, an outer surface of the first member 1126 may face an inner surface of the second member or a member base unit. Furthermore, the second magnet seated on the second member and the first magnet of the first member 1126 may face each other and generate the above-described repulsive force. Therefore, since the first member 1126 presses the tilting guide unit inward or the holder by the repulsive force, the mover may be spaced a predetermined distance from the third housing side portion in the first housing even without current injection into the coil. In other words, a coupling strength between the mover, the housing, and the tilting guide unit can be maintained.

In addition, when the first member 1126 is formed integrally with the first housing 1120, it is possible to increase the coupling strength between the first member 1126 and the first housing 1120, thereby improving the reliability of the camera actuator. In addition, when the first member 1126 is formed separately from the first housing 1120, it is possible to increase the ease of assembling and manufacturing of the first member 1126 and the first housing 1120.

In addition, in an embodiment, the first member 1126 may include the first through-hole 1126*a* and the second through-hole 1126*b* as described above. In addition, the first through-hole 1126*a* and the second through-hole 1126*b* may be disposed side by side in the second direction (Y-axis direction) and may overlap each other.

In addition, in an embodiment, a plurality of second protrusion grooves PH2 may be provided. For example, any one of the first protrusion groove PH1 and the second protrusion groove PH2 may include a 2-1 protrusion groove PH2*a* and a 2-2 protrusion groove PH2*b*. The following description will be made based on the second protrusion groove PH2 including the 2-1 protrusion groove PH2*a* and the 2-2 protrusion groove PH2*b*. In addition, the following description can also be applied to the second protrusion groove PH2 in the same manner. For example, the second protrusion groove PH2 may include the 2-1 protrusion groove and the 2-2 protrusion groove, in which the description of the 1-2 protrusion groove can be applied to the 2-1 protrusion groove, and the description of the 1-2 protrusion groove can be applied to the 2-2 protrusion groove.

The 2-1 protrusion groove PH2*a* and the 2-2 protrusion groove PH2*b* may be disposed side by side in the first direction (X-axis direction). The 2-1 protrusion groove PH2*a* and the 2-2 protrusion groove PH2*b* may have the same maximum area.

The numbers of inclined surfaces of the plurality of second protrusion grooves PH2 may differ from each other. For example, the second protrusion groove PH2 may include a groove lower surface and an inclined surface. In this case, the numbers of inclined surfaces of the plurality of protrusion grooves may differ from each other. In addition, lower surfaces of the protrusion grooves may also have different areas.

For example, the 2-1 protrusion groove PH2*a* may include a first groove lower surface LS1*a* and a first inclined surface CS1*a*. The 2-2 protrusion groove PH2*b* may include a second groove lower surface LS2*a* and a second inclined surface CS2*a*.

In this case, the first groove lower surface LS1*a* and the second groove lower surface LS2*a* may have different areas. The first groove lower surface LS1*a* may have a smaller area than the second groove lower surface LS2*a*.

In addition, the number of first inclined surfaces CS1*a* in contact with the first groove lower surface LS1*a* may differ from the number of second inclined surfaces CS2*a*. For example, the number of first inclined surfaces CS1*a* may be greater than the number of second inclined surfaces CS2*a*.

With this configuration, it is possible to easily compensate an assembly tolerance of the second protruding portion seated in the second protrusion groove PH2. For example, since the number of first inclined surfaces CS1*a* is larger than the number of second inclined surfaces CS2*a*, the second protruding portion may be in contact with more inclined surfaces, thereby more accurately maintaining the position of the second protruding portion in the 2-1 protrusion groove PH2*a*.

Unlike this, the 2-2 protrusion groove PH2*b* has a smaller number of inclined surfaces in contact with the second protruding portion than the 2-1 protrusion groove PH2*a*, thereby easily adjusting the position of the second protruding portion.

In an embodiment, the second inclined surfaces CS2*a* may be disposed to be spaced apart from each other in the second direction (Y-axis direction). In addition, the second groove lower surface LS2*a* may extend in the first direction (X-axis direction) so that the second protruding portion may be easily moved in the first direction (X-axis direction) in a state of being in contact with the second inclined surface CS2*a*. In other words, the position of the second protruding portion in the 2-2 protrusion groove PH2*b* may be easily adjusted.

Figure 7:
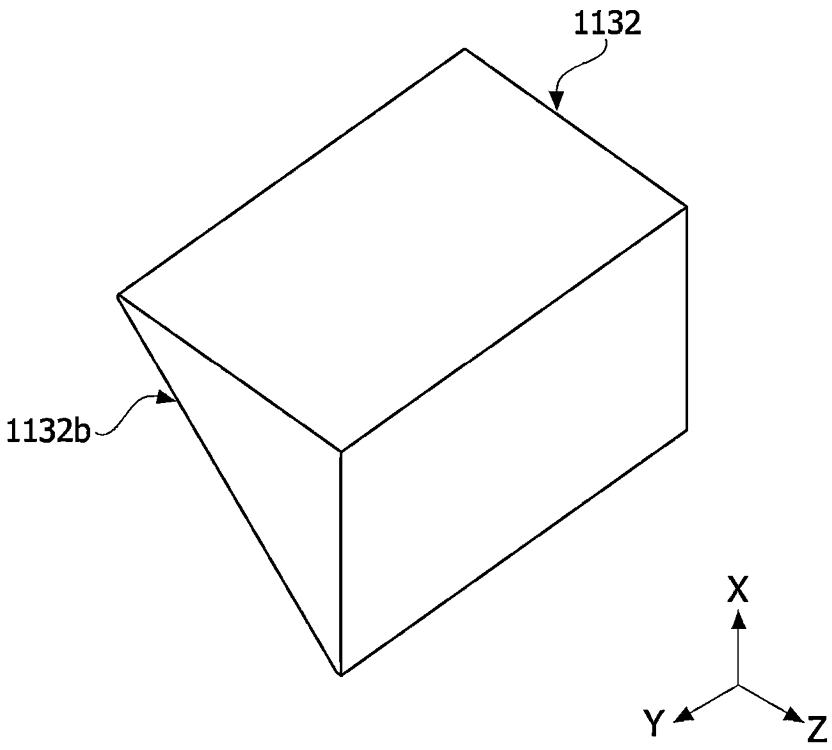
FIG. 7 is a perspective view of an optical member of the first camera actuator according to the embodiment.

FIG. 7 is a perspective view of an optical member of the first camera actuator according to the embodiment.

The optical member 1132 may be seated on the holder. The optical member 1132 may be a right-angled prism as a reflector. For example, the optical member 1132 may be another optical device or element for reflecting light, such as a prism or a mirror.

In an embodiment, the optical member 1132 may have a protruding portion (not shown) formed on a portion of an outer surface thereof. The optical member 1132 may be easily coupled to the holder through the protruding portion (not shown). In addition, the holder may be coupled to the optical member 1132 with a groove or a protrusion.

In addition, a lower surface 1132*b* of the optical member 1132 may be seated on the seating surface of the holder. Therefore, the lower surface 1132*b* of the optical member 1132 may correspond to the seating surface of the holder. In an embodiment, the lower surface 1132*b* may be formed as an inclined surface like the seating surface of the holder. Therefore, the optical member moves according to the movement of the holder, and at the same time, it is possible to prevent the optical member 1132 from being separated from the holder according to the movement of the holder.

In addition, a groove may be formed in the lower surface 1132*b* of the optical member 1132, and a bonding member may be applied to the groove so that the optical member 1132 may be coupled to the holder. Alternatively, the holder may be coupled to the optical member 1132 by applying the bonding member to the groove or protrusion of the holder.

In addition, as described above, the optical member 1132 may have a structure in which the light reflected from the outside (e.g., an object) may be reflected into the camera module. As in the embodiment, the optical member 1132 may be formed of a single mirror. In addition, the optical member 1132 can resolve the spatial limitations of the first camera actuator and the second camera actuator by changing the path of the reflected light. Therefore, it should be understood that the camera module may provide a high range of magnification by extending the optical path while minimizing a thickness thereof. In addition, it should be understood that the camera module including the camera actuator according to the embodiment may provide a high range of magnification by extending the optical path while minimizing the thickness thereof.

Figure 8A:
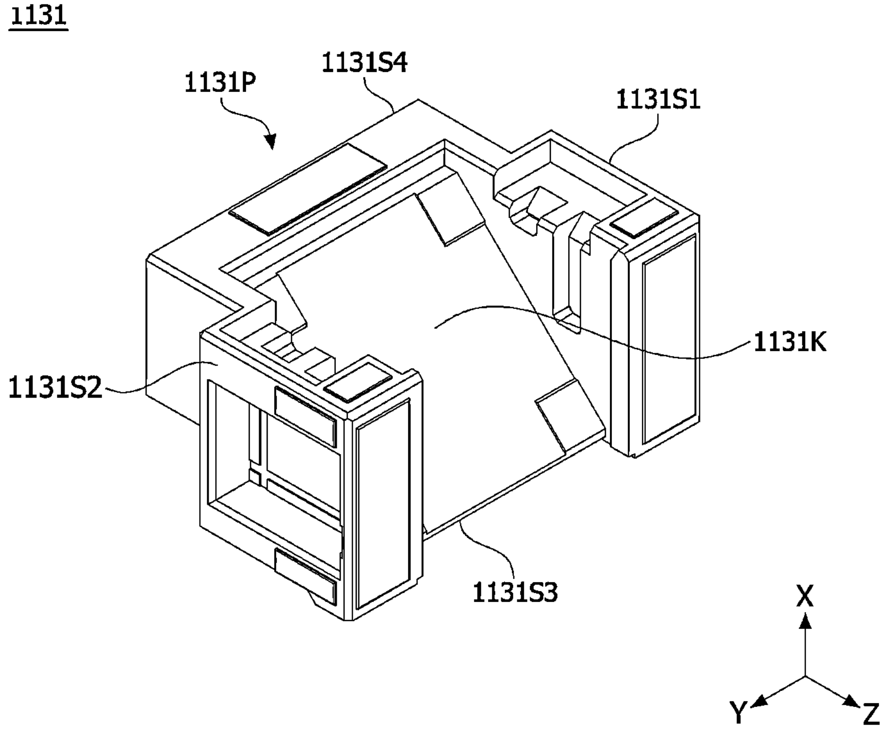
FIG. 8A is a perspective view of a holder of the first camera actuator according to the embodiment.
Figure 8B:
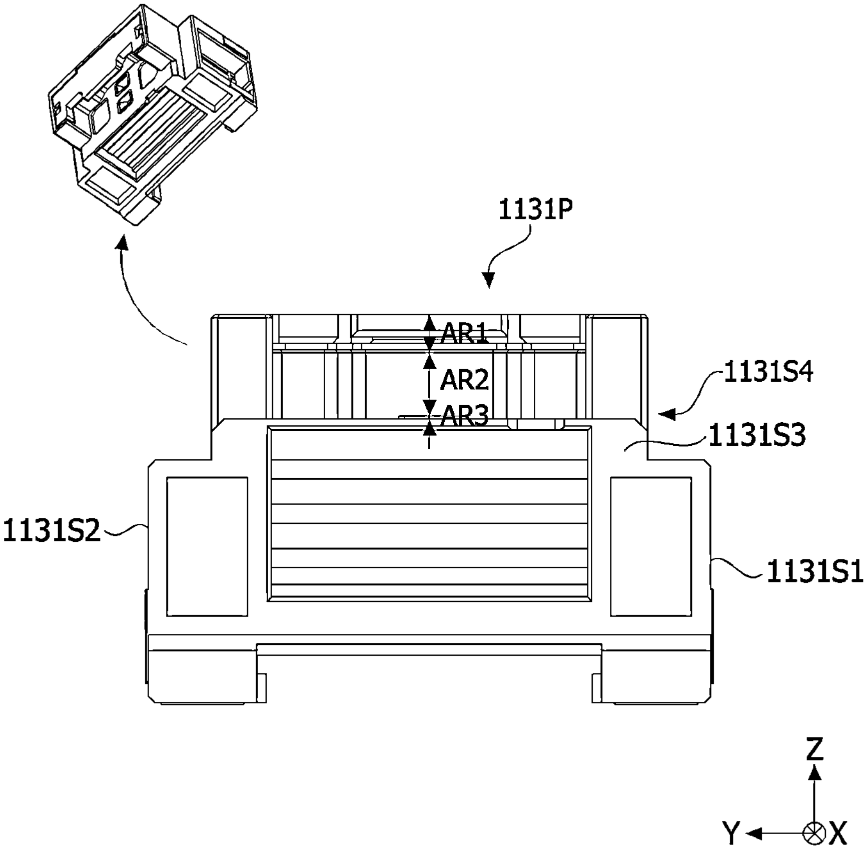
FIG. 8B is a bottom view of the holder of the first camera actuator according to the embodiment.
Figure 8C:
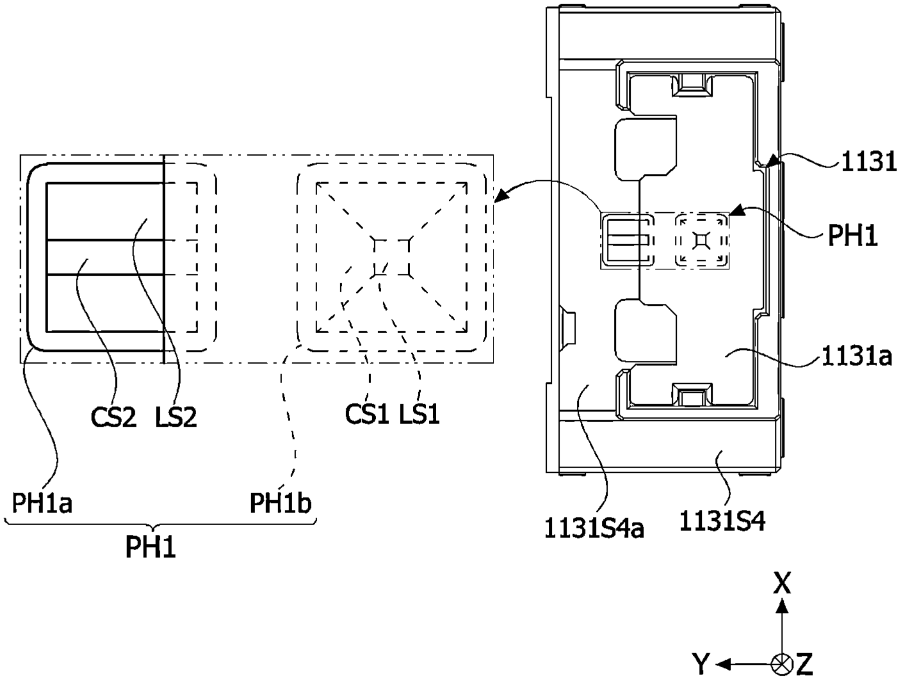
FIG. 8C is a front view of the holder of the first camera actuator according to the embodiment.
Figure 8D:
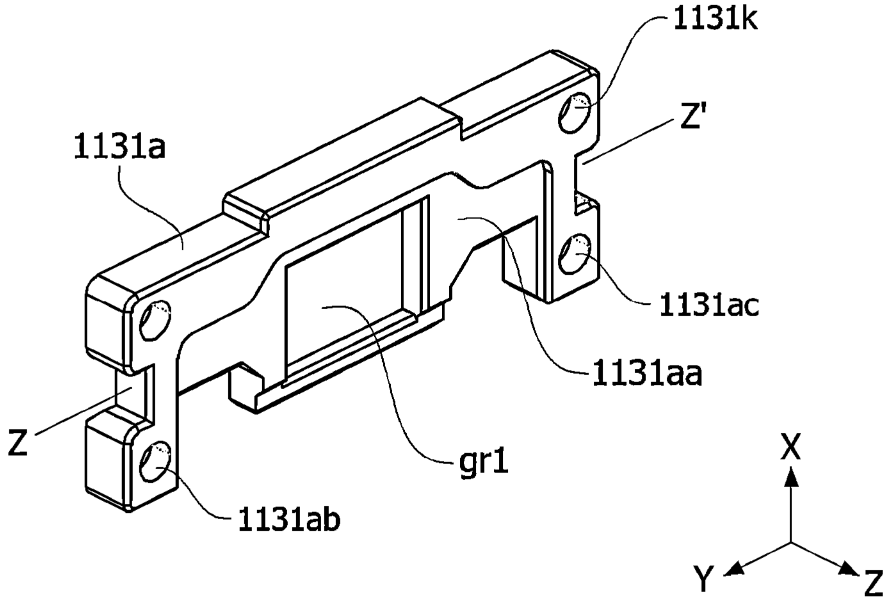
FIG. 8D is a rear view of a second member of the first camera actuator according to the embodiment.
Figure 8E:
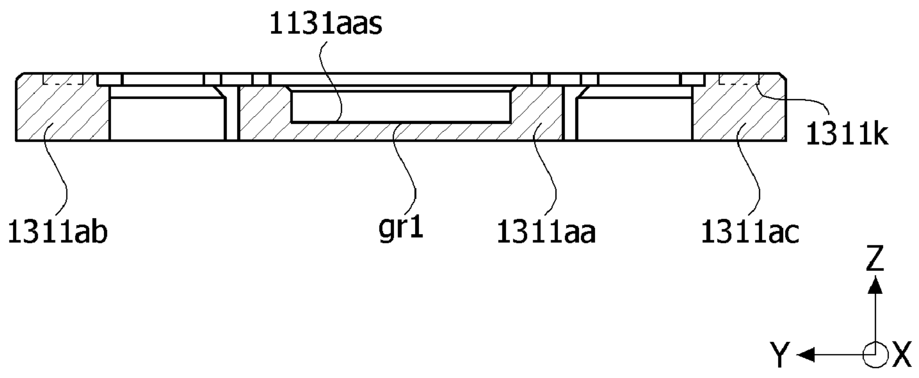
FIG. 8E is a view along line ZZ' in FIG. 8D.

FIG. 8A is a perspective view of a holder of the first camera actuator according to the embodiment, FIG. 8B is a bottom view of the holder of the first camera actuator according to the embodiment, FIG. 8C is a front view of the holder of the first camera actuator according to the embodiment, FIG. 8D is a rear view of a second member of the first camera actuator according to the embodiment, and FIG. 8E is a view along line ZZ' in FIG. 8D.

Referring to FIGS. 8A to 8E, the holder 1131 may include a seating surface 1131*k* on which the optical member 1132 is seated. The seating surface 1131*k* may be an inclined surface. In addition, the holder 1131 may include a stepped portion above the seating surface 1131*k*. In addition, the stepped portion of the holder 1131 may be coupled to the protruding portion (not shown) of the optical member 1132.

The holder 1131 may include a plurality of outer surfaces. For example, the holder 1131 may include a first holder outer surface 1131S1, a second holder outer surface 1131S2, a third holder outer surface 1131S3, and a fourth holder outer surface 1131S4.

The first holder outer surface 1131S1 may be positioned to face the second holder outer surface 1131S2. In other words, the first holder outer surface 1131S1 may be symmetrically disposed with the second holder outer surface 1131S2 with respect to the first direction (X-axis direction).

The first holder outer surface 1131S1 may be positioned to correspond to the first housing side portion. In other words, the first holder outer surface 1131S1 may be positioned to face the first housing side portion. In addition, the second holder outer surface 1131S2 may be positioned to correspond to the second housing side portion. In other words, the second holder outer surface 1131S2 may be positioned to face the second housing side portion.

In addition, the first holder outer surface 1131S1 may include a first seating groove 1131S1*a*. In addition, the second holder outer surface 1131S2 may include a second seating groove 1131S2*a*. The first seating groove 1131S1*a* and the second seating groove 1131S2*a* may be symmetrically disposed with respect to the first direction (X-axis direction).

In addition, the first seating groove 1131S1*a* and the second seating groove 1131S2*a* may be disposed to overlap each other in the second direction (Y-axis direction). In addition, the first magnet may be disposed in the first seating groove 1131S1*a*, and the second magnet may be disposed in the second seating groove 1131S2*a*. The first magnet and the second magnet may also be symmetrically disposed with respect to the first direction (X-axis direction). In the specification, it should be understood that the first magnet to the third magnet may be coupled to the housing through a yoke or a bonding member.

As described above, due to positions of the first and second seating grooves and the first and second magnets, an electromagnetic force generated by each magnet may be coaxially provided to the first holder outer surface S1131S1 and the second holder outer surface 1131S2. For example, a region (e.g., a portion having the strongest electromagnetic force) of the first holder outer surface S1131S1 to which the electromagnetic force is applied and a region (e.g., a portion having the strongest electromagnetic force) of the second holder outer surface S1131S1 to which the electromagnetic force is applied may be positioned on an axis parallel to the second direction (Y-axis direction). Therefore, the X-axis tilting may be accurately performed.

The first magnet 1151*a* may be disposed in the first seating groove 1131S1*a*, and the second magnet 1151*b* may be disposed in the second seating groove 1131S2*a*.

The third holder outer surface 1131S3 may be in contact with the first holder outer surface 1131S1 and the second holder outer surface 1131S2 and may be an outer surface extending from one sides of the first holder outer surface 1131S1 and the second holder outer surface 1131S2 in the second direction (Y-axis direction). In addition, the third holder outer surface 1131S3 may be positioned between the first holder outer surface 1131S1 and the second holder outer surface 1131S2. The third holder outer surface 1131S3 may be the lower surface of the holder 1131. In other words, the third holder outer surface 1131S3 may be positioned to face the third housing side portion.

In addition, the third holder outer surface 1131S3 may include a third seating groove 1131S3*a*. The third magnet may be positioned in the third seating groove 1131S3*a*. The third holder outer surface 1131S3 may be positioned to face the third housing side portion 1123.

In addition, at least a portion of the third housing hole 1123*a* may overlap the third seating groove 1131S3*a* in the first direction (X-axis direction). Therefore, the third magnet in the third seating groove 1131S3*a* and the third coil in the third housing hole 1123*a* may be positioned to face each other. In addition, the third magnet and the third coil may generate an electromagnetic force so that the second camera actuator may tilt with respect to the Y-axis.

In addition, while the X-axis tilting may be performed by a plurality of magnets (first and second magnets), the Y-axis tilting may be performed by only the third magnet.

In an embodiment, the third seating groove 1131S3*a* may have a larger area than the first seating groove 1131S1*a* or the second seating groove 1131S2*a* has. With this configuration, the Y-axis tilting may be performed by current control similar to that of the X-axis tilting.

The fourth holder outer surface 1131S4 may be in contact with the first holder outer surface 1131S1 and the second holder outer surface 1131S2 and may be an outer surface extending from the first holder outer surface 1131S1 and the second holder outer surface 1131S2 in the first direction (X-axis direction). In addition, the fourth holder outer surface 1131S4 may be positioned between the first holder outer surface 1131S1 and the second holder outer surface 1131S2. In other words, the fourth holder outer surface 1131S4 may be positioned to face the first member.

The fourth holder outer surface 1131S4 may include a fourth seating groove 1131S4*a*. The tilting guide unit 1141 may be positioned in the fourth seating groove 1131S4*a*. In addition, the second member 1131*a* and the first member 1126 may be positioned in the fourth seating groove 1131S4*a*. In addition, the fourth seating groove 1131S4*a* may include a plurality of regions. The fourth seating groove 1131S4*a* may include a first region AR1, a second region AR2, and a third region AR3.

The second member 1131*a* may be positioned in the first region AR1. In other words, the first region AR1 may overlap the second member 1131*a* in the first direction (X-axis direction). In particular, the first region AR1 may be a region in which the member base unit of the second member 1131*a* is positioned. In this case, the first region AR1 may be positioned on the fourth holder outer surface 1131S4. In other words, the first region AR1 may correspond to a region positioned above the fourth seating groove 1131S4*a*. In this case, the first region AR1 may not be one region in the fourth seating groove 1131S4*a*.

The first member 1126 may be positioned in the second region AR2. In other words, the second region AR2 may overlap the first member 1126 in the first direction (X-axis direction).

In addition, the second region AR2 may be positioned on the fourth holder outer surface 1131S4 like the first region. In other words, the second region AR2 may correspond to a region positioned above the fourth seating groove 1131S4*a*.

The tilting guide unit may be positioned in the third region AR3. In particular, the base of the tilting guide unit may be positioned in the third region AR3. In other words, the third region AR3 may overlap the tilting guide unit (e.g., the base) in the first direction (X-axis direction).

In addition, the second region AR2 may be positioned between the first region AR1 and the third region AR3.

In addition, the second member may be disposed in the first region AR1, and the second member 1131*a* may include the first groove gr1. In an embodiment, the second member 1131*a* may include the first groove gr1 formed on an inner surface 1131*aas*. In addition, the second magnet may be disposed in the first groove gr1 as described above.

In addition, as described above, the first member may be disposed in the second region AR2. The first groove gr1 may be positioned to face the second groove gr2. For example, at least a portion of the first groove gr1 may overlap the second groove gr2 in the third direction (Z-axis direction).

In addition, the repulsive force generated by the second magnet may be transmitted to the fourth seating groove 1131S4*a* of the holder 1131 through the second member. Therefore, the holder may apply a force to the tilting guide unit in the same direction as the repulsive force generated by the second magnet.

The first member may include the second groove gr2 facing the first groove gr1 formed in the outer surface thereof. In addition, the first member may include the second protrusion groove formed in the inner surface thereof as described above. In addition, the second protruding portion may be seated in the second protrusion groove.

In addition, like the second magnet, the repulsive force generated by the first magnet and the second magnet may be applied to the first member. Therefore, the first member and the second member may press the tilting guide unit disposed between the first member and the holder 1131 through the repulsive force.

The tilting guide unit 1141 may be disposed in the third region AR3.

In addition, the first protrusion groove PH1 may be positioned in the fourth seating groove 1131S4*a*. In addition, the first protruding portion PR1 of the tilting guide unit 1141 may be accommodated in the first protrusion groove PH1. Therefore, the first protruding portion PR1 may be in contact with the first protrusion groove. A maximum diameter of the first protrusion groove PH1 may correspond to a maximum diameter of the first protruding portion PR1. This can also be applied to the second protrusion groove and the second protruding portion PR2 in the same manner. In other words, a maximum diameter of the second protrusion groove may correspond to a maximum diameter of the second protruding portion PR2. Therefore, the second protruding portion may be in contact with the second protrusion groove. With this configuration, first-axis tilting may be easily performed with respect to the first protruding portion, second-axis tilting may be easily performed with respect to the second protruding portion, and a tilting radius can be increased.

In addition, in an embodiment, a plurality of first protrusion grooves PH1 may be provided. For example, any one of the first protrusion groove PH1 and the second protrusion groove PH2 may include a 1-1 protrusion groove PH1*a* and a 1-2 protrusion groove PH1*b*. The following description will be made based on the first protrusion groove PH1 including the 1-1 protrusion groove PH1*a* and the 1-1 protrusion groove PH1*b*. In addition, the following description can also be applied to the second protrusion groove PH2 in the same manner. For example, the second protrusion groove PH2 may include the 2-1 protrusion groove and the 2-2 protrusion groove, in which the description of the 1-1 protrusion groove can be applied to the 2-1 protrusion groove, and the description of the 1-2 protrusion groove can be applied to the 2-2 protrusion groove.

The 1-1 protrusion groove PH1*a* and the 1-2 protrusion groove PH1*b* may be disposed side by side in the first direction (X-axis direction). The 1-1 protrusion groove PH1*a* and the 1-2 protrusion groove PH1*b* may have the same maximum area.

The numbers of inclined surfaces of the plurality of first protrusion grooves PH1 may differ from each other. For example, the first protrusion groove PH1 may include a groove lower surface and an inclined surface. In this case, the plurality of protrusion grooves may have the number of inclined surfaces which differs from each other. In addition, lower surfaces of the protrusion grooves may also have different areas.

For example, the 1-1 protrusion groove PH1*a* may include a first groove lower surface LS1 and a first inclined surface CS1. The 1-2 protrusion groove PH1*b* may include a second groove lower surface LS2 and a second inclined surface CS2.

In this case, areas of the first groove lower surface LS1 and the second groove lower surface LS2 may be different. An area of the first groove lower surface LS1 may be smaller area than an area of the second groove lower surface LS2.

In addition, the number of first inclined surfaces CS1 in contact with the first groove lower surface LS1 may differ from the number of second inclined surfaces CS2. For example, the number of first inclined surfaces CS1 may be larger than the number of second inclined surfaces CS2.

With this configuration, it is possible to easily compensate an assembly tolerance of the first protruding portion seated in the first protrusion groove PH1. For example, since the number of first inclined surfaces CS1 is larger than the number of second inclined surfaces CS2, the first protruding portion may be in contact with more inclined surfaces, thereby more accurately maintaining the position of the first protruding portion in the 1-1 protrusion groove PH1*a*.

Unlike this, the 1-2 protrusion groove PH1*b* has a smaller number of inclined surfaces in contact with the first protruding portion than those of the 1-1 protrusion groove PH1*a*, thereby easily adjusting the position of the first protruding portion.

In an embodiment, the second inclined surfaces CS2 may be disposed to be spaced apart from each other in the second direction (Y-axis direction). In addition, the second groove lower surface LS2 may extend in the first direction (X-axis direction) so that the first protruding portion may be easily moved in the first direction (X-axis direction) in a state of being in contact with the second inclined surface CS2. In other words, the position of the first protruding portion in the 1-2 protrusion groove PH1*b* may be easily adjusted.

In addition, in the present embodiment, the first region AR1, the second region AR2, and the third region AR3 may have different heights in the first direction (X-axis direction). In an embodiment, the first region AR1 may have a larger height than the second region AR2 and the third region AR3 have in the first direction (X-axis direction). Therefore, a stepped portion may be positioned between the first region AR1 and the second region AR2.

In addition, the second member 1131*a* may include the first groove gr1. In other words, the first groove gr1 may be positioned in an inner surface of a member base unit 1131*aa*. In addition, the above-described second magnet may be seated in the first groove gr1. In addition, a plurality of first grooves gr1 may be provided according to the number of second magnets. In other words, the number of first grooves gr1 may correspond to the number of second magnets.

In addition, the second member 1131*a* may include the member base unit 1131*aa*, a first extension 1131*ab*, and a second extension 1131*ac*.

The member base unit 1131*aa* may be positioned at the outermost side of the first camera actuator. The member base unit 1131*aa* may be positioned outside the first member. In other words, the first member may be positioned between the member base unit 1131*aa* and the tilting guide unit.

The first extension 1131*ab* may extend from an edge of the member base unit 1131*aa* in the third direction (Z-axis direction). In other words, the first extension 1131*ab* may extend from the member base unit 1131*aa* to the holder 1131. It is also applied to the second extension 1131*ac* in the same manner. In addition, the second extension 1131*ac* may extend from the edge of the member base unit 1131*aa* in the third direction (Z-axis direction). In an embodiment, the first extension 1131*ab* and the second extension 1131*ac* may be positioned on the edge of the member base unit 1131*aa* in the second direction (Y-axis direction). In addition, the first extension 1131*ab* and the second extension 1131*ac* may be disposed between an upper member and a lower member.

Therefore, the second member 1131*a* may have a groove formed by the first extension 1131*ab* and the second extension 1131*ac*. In other words, the groove may be positioned between the first extension 1131*ab* and the second extension 1131*ac*. Therefore, the first extension 1131*ab* and the second extension 1131*ac* may be connected by only the member base unit 1131*aa*. With this configuration, the second member 1131*a* may continuously receive the repulsive force generated by the second magnet seated at the center of the member base unit 1131*aa*, particularly, in the first groove gr1.

In addition, the first extension 1131*ab* may be spaced apart from the second extension 1131*ac* in the second direction (Y-axis direction) to form a separation space. The first member and the tilting guide unit may be seated in such a separation space. In addition, the second magnet and the first magnet may be positioned in the separation space.

In addition, the first extension 1131*ab* and the second extension 1131*ac* may have the same length in the third direction (Z-axis direction). Therefore, a coupling strength, a weight, and the like may be formed in a balanced manner so that the tilting of the holder may be accurately performed without being biased to one side.

In addition, the first extension 1131*ab* and the second extension 1131*ac* may be coupled to the holder. In the specification, it should be understood that the coupling may be made through the bonding member other than the above-described protrusion and groove structures. In an embodiment, the first extension 1131*ab* and the second extension 1131*ac* may include a third coupling groove 1131*k* formed in the third direction (Z-axis direction). In addition, a coupling protrusion 1131*m* may be positioned in a region in which the first extension 1131*ab* and the second extension 1131*ac* overlap each other in the third direction (Z-axis direction) in the fourth seating groove 1131S4*a*. The coupling protrusion 1131*m* may be positioned to correspond to the third coupling groove 1131*k*.

For example, the bonding member such as epoxy may be applied to the third coupling groove 1131*k*. In addition, the coupling protrusion 1131*m* may be inserted into the third coupling groove 1131*k* of the first extension 1131*ab* and the second extension 1131*ac*. With this configuration, the second member 1131*a* and the holder 1131 may be coupled. In addition, the repulsive force applied to the second member 1131*a* may be transmitted to the holder 1131 through this coupling.

However, it should be understood that the above-described positions of the protrusion and groove structures may be interchanged as described above.

Figure 9A:
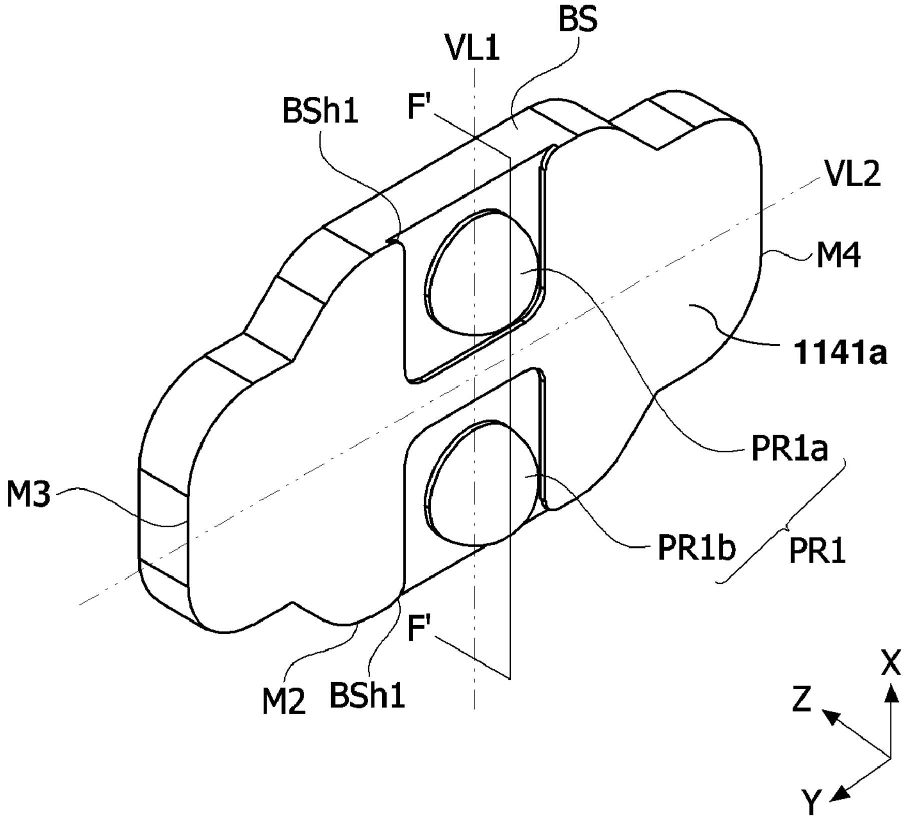
FIG. 9A is a perspective view of a tilting guide unit of the first camera actuator according to the embodiment.
Figure 9B:
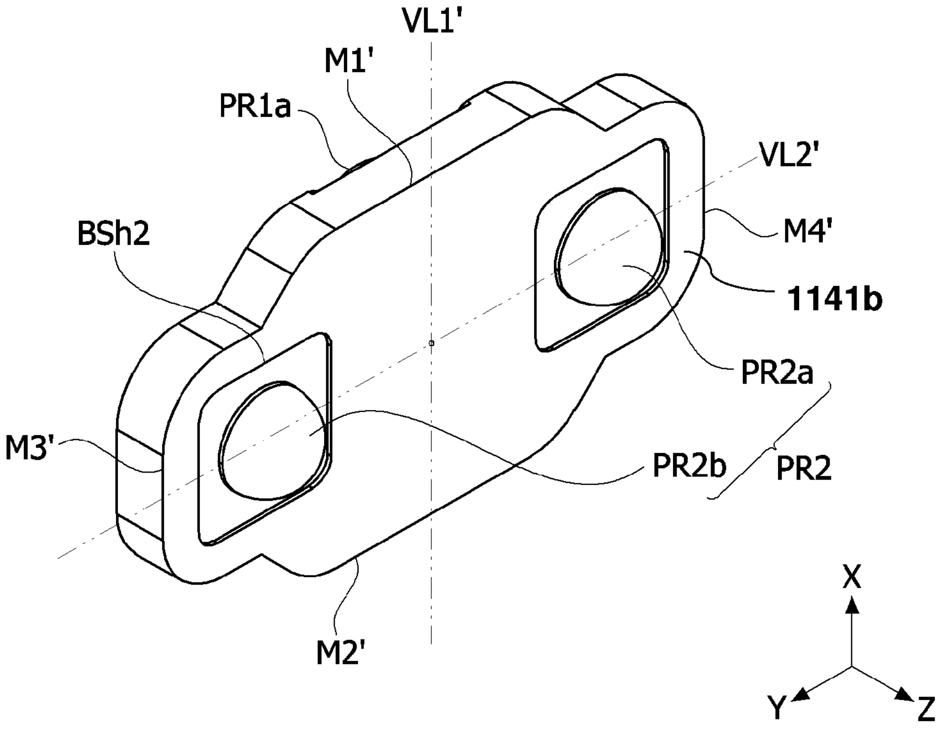
FIG. 9B is a perspective view in a different direction from FIG. 9A.
Figure 9C:
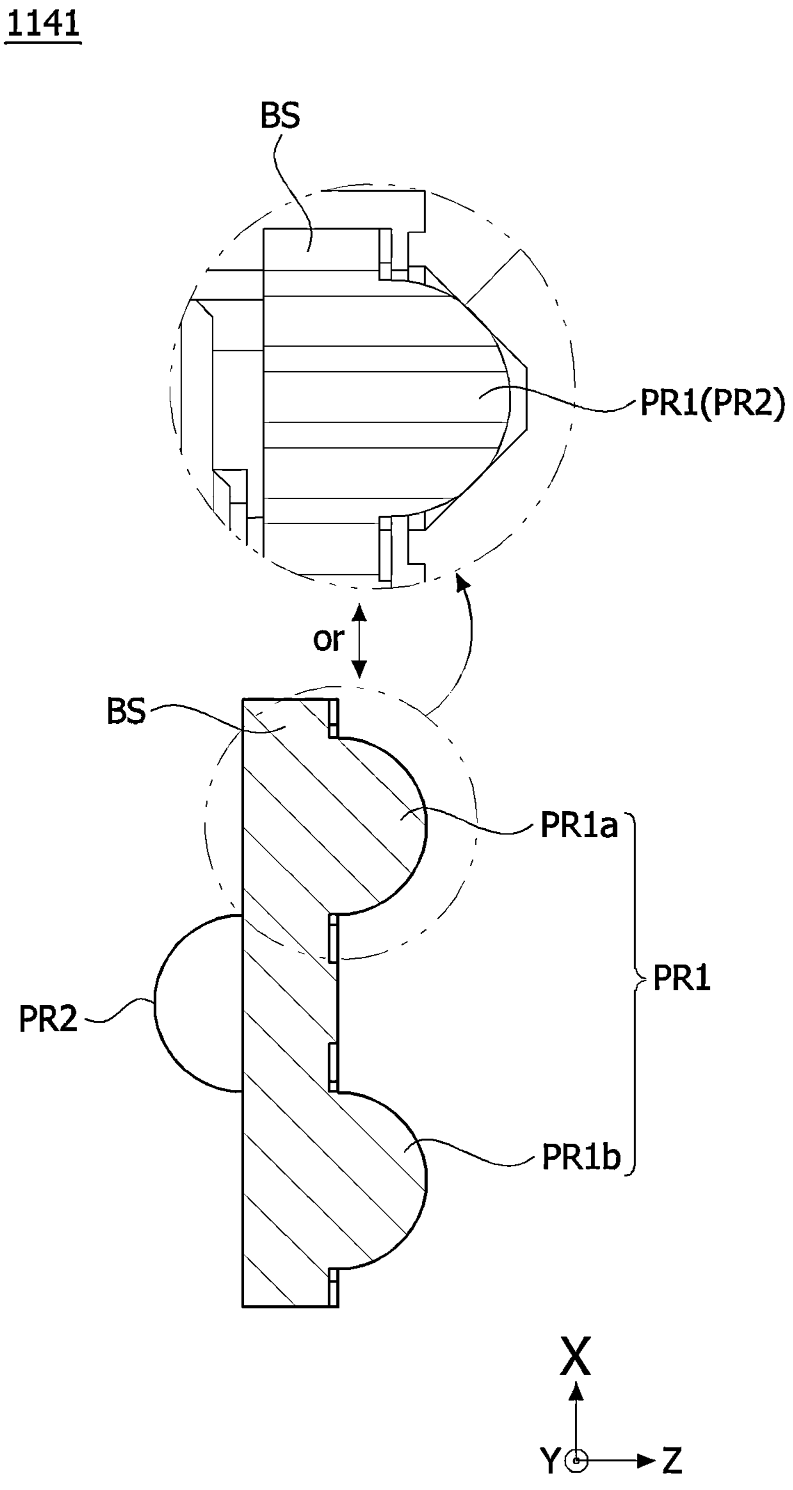
FIG. 9C is a cross-sectional view along line FF' in FIG. 9A.

FIG. 9A is a perspective view of a tilting guide unit of the first camera actuator according to the embodiment, FIG. 9B is a perspective view in a different direction from FIG. 9A, and FIG. 9C is a cross-sectional view along line FF' in FIG. 9A.

The tilting guide unit 1141 according to the embodiment may include a base BS, the first protruding portion PR1 protruding from a first surface 1141*a* of the base BS, and the second protruding portion PR2 protruding from a second surface 1141*b* of the base BS. In addition, the first protruding portion and the second protruding portion may be formed on opposite surfaces according to the structure, but the present invention will be described below with reference to the drawings. In addition, it should be understood that the first protruding portion PR1 and the second protruding portion PR2 may be integrally formed with the base BS, and as shown in the drawings, the first protruding portion PR1 and the second protruding portion PR2 may have a spherical shape like a ball.

First, the base BS may include the first surface 1141*a* and the second surface 1141*b* facing the first surface 1141*a*. In other words, the first surface 1141*a* may be spaced apart from the second surface 1141*b* in the third direction (Z-axis direction), and the first surface 1141*a* and the second surface 1141*b* may be outer surfaces opposite to each other or facing each other in the tilting guide unit 1141.

The tilting guide unit 1141 may include the first protruding portion PR1 extending to one side on the first surface 1141*a*. According to the embodiment, the first protruding portion PR1 may protrude toward the holder from the first surface 1141*a*. The first protruding portion PR1 may be provided as a plurality of first protruding portions and may include a 1-1 protrusion PR1*a* and a 1-2 protrusion PR1*b*. The 1-1 protrusion PR1*a* can be referred to as "third sub-protrusion," and the 1-2 protrusion PR1*b* can be referred to as "fourth sub-protrusion." Furthermore, the 2-1 protrusion PR2*a* to be described below can be referred to as "first sub-protrusion," and the 2-2 protrusion PR2*b* can be referred to as "second sub-protrusion."

The 1-1 protrusion PR1*a* and the 1-2 protrusion PR1*b* may be positioned side by side in the first direction (X-axis direction). In other words, the 1-1 protrusion PR1*a* and the 1-2 protrusion PR1*b* may overlap each other in the first direction (X-axis direction). In addition, in an embodiment, the 1-1 protrusion PR1*a* and the 1-2 protrusion PR1*b* may be bisected by a virtual line extending in the first direction (X-axis direction).

In addition, each of the 1-1 protrusion PR1*a* and the 1-2 protrusion PR1*b* may have a curvature and have, for example, a hemispherical shape. In addition, the 1-1 protrusion PR1*a* and the 1-2 protrusion PR1*b* may be in contact with the first groove of the housing at a point which is the farthest point from the first surface 1141*a* of the base BS.

In addition, an alignment groove may be positioned in the first surface 1141*a*. The alignment groove 1141*aa* may be disposed at one side of the first surface to provide an assembly position or assembly direction of the tilting guide unit 1141 during an assembly process.

In addition, the tilting guide unit 1141 may include the second protruding portion PR2 extending to one side on the second surface 1141*b*. According to the embodiment, the second protruding portion PR2 may protrude toward the housing from the second surface 1141*b*. In addition, the second protruding portion PR2 may be provided as a plurality of second protruding portions and may include a 2-1 protrusion PR2*a* and a 2-2 protrusion PR2*b* in the embodiment.

The 2-1 protrusion PR2*a* and the 2-2 protrusion PR2*b* may be positioned side by side in the second direction (Y-axis direction). In other words, the 2-1 protrusion PR2*a* and the 2-2 protrusion PR2*b* may overlap each other in the second direction (Y-axis direction). In addition, in an embodiment, the 2-1 protrusion PR2*a* and the 2-2 protrusion PR2*b* may be bisected by a virtual line extending in the second direction (Y-axis direction).

Each of the 2-1 protrusion PR2*a* and the 2-2 protrusion PR2*b* may have a curvature and have, for example, a hemispherical shape. In addition, the 2-1 protrusion PR2*a* and the 2-2 protrusion PR2*b* may be in contact with the second member 1131*a* at a point which is spaced apart from the second surface 1141*b* of the base BS.

The 1-1 protrusion PR1*a* and the 1-2 protrusion PR1*b* may be positioned in a region between the 2-1 protrusion PR2*a* and the 2-2 protrusion PR2*b* in the second direction. According to the embodiment, the 1-1 protrusion PR1*a* and the 1-2 protrusion PR1*b* may be positioned at the center of a separation space between the 2-1 protrusion PR2*a* and the 2-2 protrusion PR2*b* in the second direction. With this configuration, the actuator according to the embodiment may have an angle of the X-axis tilting in the same range with respect to the X-axis. In other words, the tilting guide unit 1141 and the holder may equally provide a range (e.g., a positive/negative range) in which the X-axis tilting may be performed with respect to the 1-1 protrusion PR1*a* and the 1-2 protrusion PR1*b* with respect to the X-axis.

In addition, the 2-1 protrusion PR2*a* and the 2-2 protrusion PR2*b* may be positioned in a region between the 1-1 protrusion PR1*a* and the 1-2 protrusion PR1*b* in the first direction. According to the embodiment, the 2-1 protrusion PR2*a* and the 2-2 protrusion PR2*b* may be positioned at the center of a separation space between the 1-1 protrusion PR1*a* and the 1-2 protrusion PR1*b* in the first direction. With this configuration, the actuator according to the embodiment may have an angle of the Y-axis tilting in the same range with respect to the Y-axis. In other words, the tilting guide unit 1141 and the holder may equally provide a range (e.g., a positive/negative range) in which the Y-axis tilting may be performed with respect to the 2-1 protrusion PR2*a* and the 2-2 protrusion PR2*b* with respect to the Y-axis.

Specifically, the first surface 1141*a* may include a first outer line M1, a second outer line M2, a third outer line M3, and a fourth outer line M4. The first outer line M1 and the second outer line M2 may face each other, and the third outer line M3 and the fourth outer line M4 may face each other. In addition, the third outer line M3 and the fourth outer line M4 may be positioned between the first outer line M1 and the second outer line M2. In addition, although the first outer line M1 and the second outer line M2 may be perpendicular to the first direction (X-axis direction), the third outer line M3 and the fourth outer line M4 may be parallel to the first direction (X-axis direction).

In this case, the first protruding portion PR1 may be positioned on a first virtual line VL1. Here, the first virtual line VL1 is a line which bisects the first outer line M1 and the second outer line M2. Alternatively, the first and third virtual lines VL1 and VL1' are lines which bisect the base BS in the second direction (Y-axis direction). Therefore, the tilting guide unit 1141 may easily perform the X-axis tilting through the first protruding portion PR1. In addition, since the tilting guide unit 1141 performs the X-axis tilting with respect to the first virtual line VL1, a rotational force may be uniformly applied to the tilting guide unit 1141. Therefore, it is possible to precisely perform the X-axis tilting and improve the reliability of the device.

In addition, the 1-1 protrusion PR1*a* and the 1-2 protrusion PR1*b* may be symmetrically disposed with respect to the first virtual line VL1 and a second virtual line VL2. Alternatively, the 1-1 protrusion PR1*a* and the 1-2 protrusion PR1*b* may be symmetrically positioned with respect to a first central point C1. With this configuration, upon performing the X-axis tilting, a support force supported by the first protruding portion PR1 may be equally applied to upper and lower sides with respect to the second virtual line VL2. Therefore, it is possible to improve the reliability of the tilting guide unit. Here, the second virtual line VL2 is a line which bisects the third outer line M3 and the fourth outer line M4. Alternatively, the second and fourth virtual lines VL2 and VL2' are lines which bisect the base BS in the first direction (X-axis direction).

In addition, the first central point C1 may be an intersection of the first virtual line VL1 and the second virtual line VL2. Alternatively, the first central point may be a point corresponding to the center of gravity according to the shape of the tilting guide unit 1141.

In addition, the second surface 1141*b* may include a fifth outer line M1', a sixth outer line M2', a seventh outer line M3', and an eighth outer line M4'. The fifth outer line M1' and the sixth outer line M2' may face each other, and the seventh outer line M3' and the eighth outer line M4' may face each other. In addition, the seventh outer line M3' and the eighth outer line M4' may be positioned between the fifth outer line M1' and the sixth outer line M2'. In addition, although the fifth outer line M1' and the sixth outer line M2' may be perpendicular to the first direction (X-axis direction), the seventh outer line M3' and the eighth outer line M4' may be parallel to the first direction (X-axis direction).

In addition, since the tilting guide unit 1141 performs the Y-axis tilting with respect to the fourth virtual line VL2', a rotating force may be uniformly applied to the tilting guide unit 1141. Therefore, it is possible to precisely the Y-axis tilting and improve the reliability of the device.

In addition, the 2-1 protrusion PR2*a* and the 2-2 protrusion PR2*b* may be symmetrically disposed on the fourth virtual line VL2' with respect to the third virtual line VL1'. Alternatively, the 2-1 protrusion PR2*a* and the 2-2 protrusion PR2*b* may be symmetrically positioned with respect to a second central point C1'. With this configuration, upon performing the Y-axis tilting, a support force supported by the second protruding portion PR2 may be equally applied to upper and lower sides of the tilting guide unit with respect to the fourth virtual line VL2'. Therefore, it is possible to improve the reliability of the tilting guide unit. Here, the third virtual line VL1' is a line which bisects the fifth outer line M1' and the sixth outer line M2'. In addition, the second central point C1' may be an intersection of the third virtual line VL1' and the fourth virtual line VL2'. Alternatively, the first central point may be a point corresponding to the center of gravity according to the shape of the tilting guide unit 1141.

In addition, a distance DR2 between the 1-1 protrusion PR1*a* and the 1-2 protrusion PR1*b* in the first direction (X-axis direction) may be greater than a length of the second protruding portion PR2 in the first direction (X-axis direction). Therefore, when the X-axis tilting is performed with respect to the 1-1 protrusion PR1*a* and the 1-2 protrusion PR1*b*, it is possible to minimize resistance due to the second protruding portion PR2.

Correspondingly, a distance ML2 between the 2-1 protrusion PR2*a* and the 2-2 protrusion PR2*b* in the second direction (Y-axis direction) may be greater than a length of the first protruding portion PR1 in the second direction (Y-axis direction). Therefore, when the Y-axis tilting is performed with respect to the 2-1 protrusion PR2*a* and the 2-2 protrusion PR2*b*, it is possible to minimize resistance due to the first protruding portion PR1.

Figure 10:
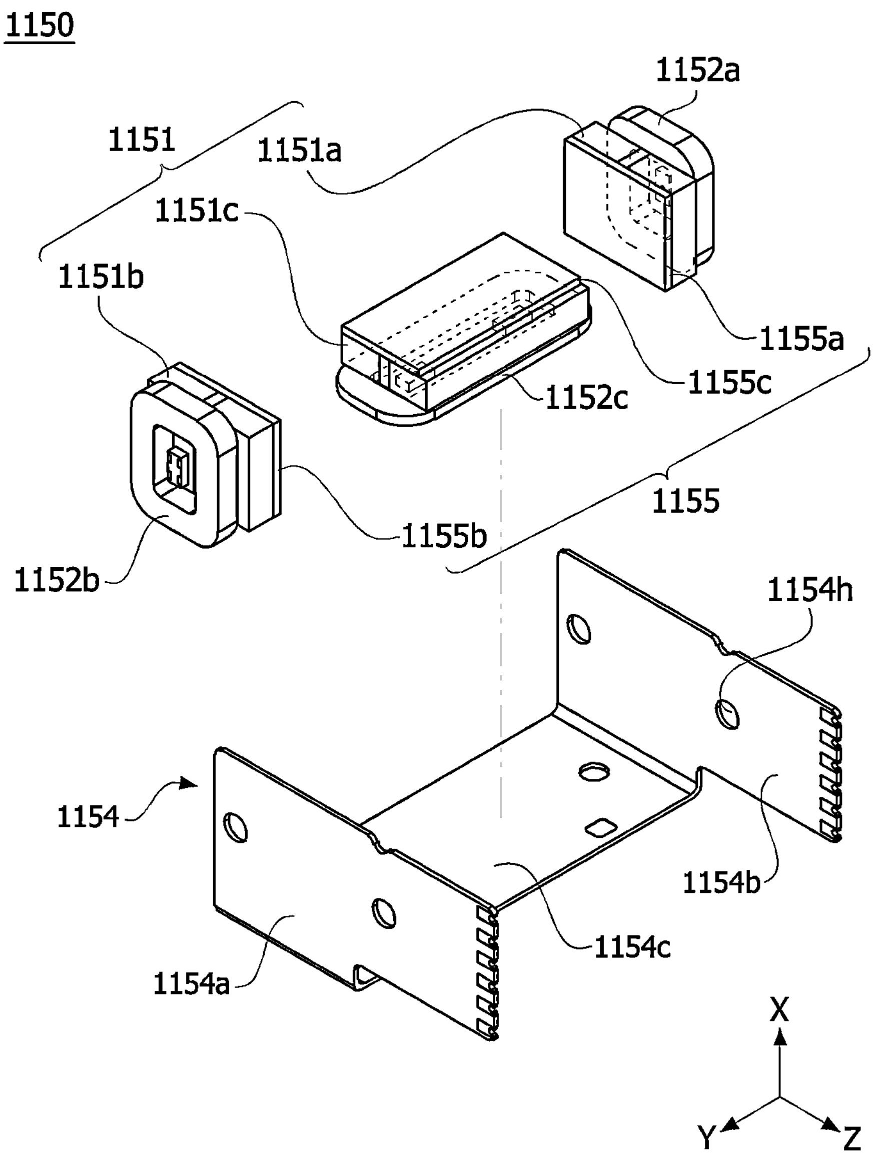
FIG. 10 is a view showing a first driving unit of the first camera actuator according to the embodiment.

FIG. 10 is a view showing a first driving unit of the first camera actuator according to the embodiment.

Referring to FIG. 10, a first driving unit 1150 includes the driving magnet 1151, the driving coil 1152, the Hall sensor unit 1153, the first board unit 1154, and the yoke unit 1155.

In addition, as described above, the driving magnet 1151 may include the first magnet 1151*a*, the second magnet 1151*b*, and the third magnet 1151*c*, which provide a driving force generated by an electromagnetic force. The first magnet 1151*a*, the second magnet 1151*b*, and the third magnet 1151*c* may each be positioned on the outer surface of the holder 1131.

In addition, the driving coil 1152 may include a plurality of coils. In an embodiment, the driving coil 1152 may include the first coil 1152*a*, the second coil 1152*b*, and the third coil 1152*c*.

The first coil 1152*a* may be positioned to face the first magnet 1151*a*. Therefore, as described above, the first coil 1152*a* may be positioned in the first housing hole 1121*a* of the first housing side portion 1121. In addition, the second coil 1152*b* may be positioned to face the second magnet 1151*b*. Therefore, as described above, the second coil 1152*b* may be positioned in the second housing hole 1122*a* of the second housing side portion 1122.

The second camera actuator according to the embodiment may control the mover 1130 to rotate along the first axis (in the X-axis direction) or the second axis (in the Y-axis direction) by the electromagnetic force between the driving magnet 1151 and the driving coil 1152, thereby minimizing the occurrence of a decentering or tilting phenomenon and providing the best optical characteristics upon implementing an OIS.

In addition, according to the embodiment, it is possible to provide an ultra-slim and ultra-small camera actuator and the camera module including the same by implementing the OIS through the tilting guide unit 1141 of the rotating unit 1140 disposed between the first housing 1120 and the mover 1130 to resolve the size limitation of the actuator.

The first board unit 1154 may include a first board side portion 1154*a*, a second board side portion 1154*b*, and a third board side portion 1154*c*.

The first board side portion 1154*a* and the second board side portion 1154*b* may be disposed to face each other. In addition, the third board side portion 1154*c* may be positioned between the first board side portion 1154*a* and the second board side portion 1154*b*.

In addition, the first board side portion 1154*a* may be positioned between the first housing side portion and the shield can, and the second board side portion 1154*b* may be positioned between the second housing side portion and the shield can. In addition, the third board side portion 1154*c* may be positioned between the third housing side portion and the shield can and may be a lower surface of the first board unit 1154.

The first board side portion 1154*a* may be coupled to and electrically connected to the first coil 1152*a*. In addition, the first board side portion 1154*a* may be coupled to and electrically connected to a first Hall sensor 1153*a*.

The second board side portion 1154*b* may be coupled to and electrically connected to the second coil 1152*b*. In addition, it should be understood that the second board side portion 1154*b* may be coupled to and electrically connected to the first Hall sensor.

The third board side portion 1154*c* may be coupled to and electrically connected to the third coil 1152*c*. In addition, the third board side portion 1154*c* may be coupled to and electrically connected to a second Hall sensor 1153*b*.

The yoke unit 1155 may include a first yoke 1155*a*, a second yoke 1155*b*, and a third yoke 1155*c*. The first yoke 1155*a* may be positioned in the first seating groove and coupled to the first magnet 1151*a*. In addition, the second yoke 1155*b* may be positioned in the second seating groove and coupled to the second magnet 1151*b*. In addition, the third yoke 1155*c* may be positioned in the third seating groove and coupled to the third magnet 1151*c*. The first to third yokes 1155*a* to 1155*c* allow the first to third magnets 1151*a* to 1151*c* to be easily seated in the first to third seating grooves and coupled to the housing.

Figure 11A:
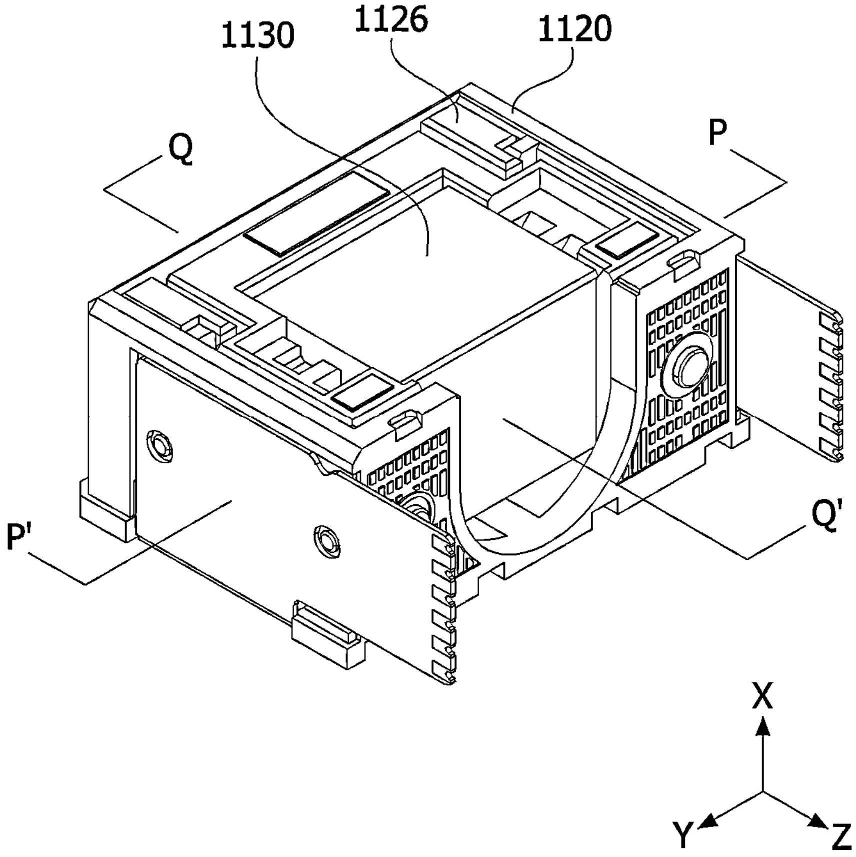
FIG. 11A is a perspective view of the first camera actuator according to the embodiment.
Figure 11B:
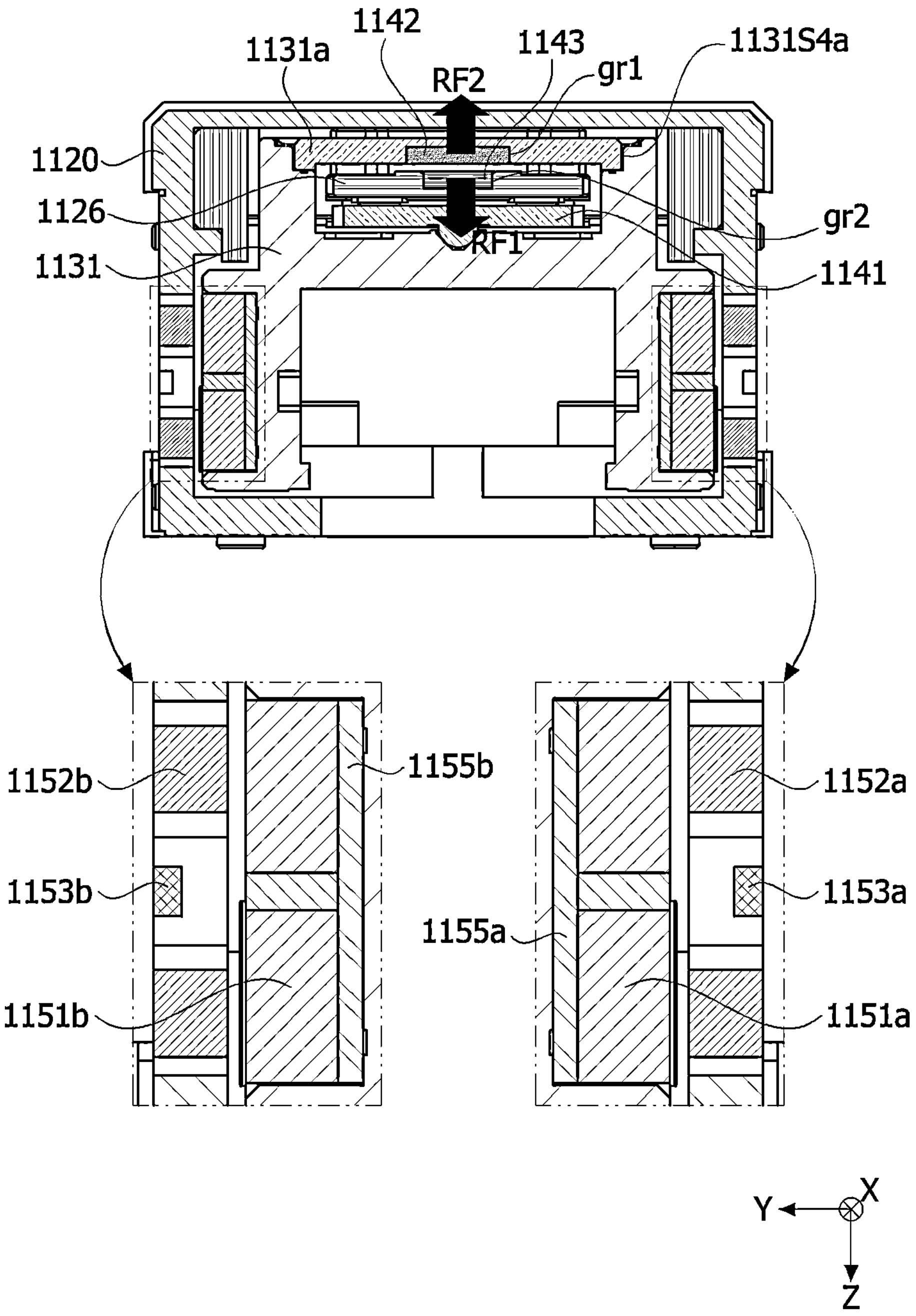
FIG. 11B is a cross-sectional view along line PP' in FIG. 11A.
Figure 11C:
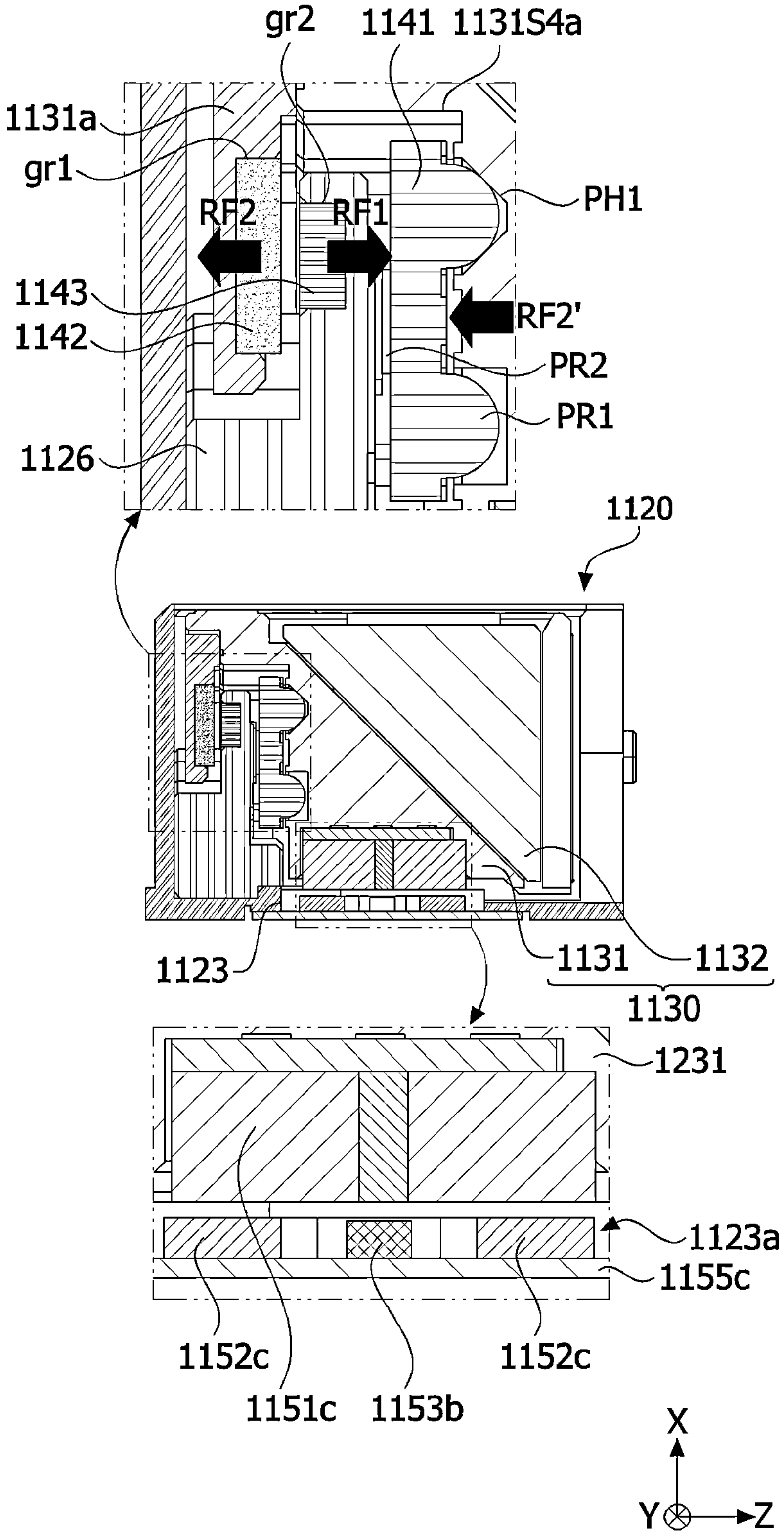
FIG. 11C is a cross-sectional view along line QQ' in FIG. 11A.

FIG. 11A is a perspective view of the first camera actuator according to the embodiment, FIG. 11B is a cross-sectional view along line PP' in FIG. 11A, and FIG. 11C is a cross-sectional view along line QQ' in FIG. 11A.

Referring to FIGS. 11A to 11C, the first coil 1152*a* may be positioned on the first housing side portion 1121, and the first magnet 1151*a* may be positioned on the first holder outer surface 1131S1 of the holder 1131. Therefore, the first coil 1152*a* and the first magnet 1151*a* may be positioned to face each other. At least a portion of the first magnet 1151*a* may overlap the first coil 1152*a* in the second direction (Y-axis direction).

In addition, the second coil 1152*b* may be positioned on the second housing side portion 1122, and the second magnet 1151*b* may be positioned on the second holder outer surface 1131S2 of the holder 1131. Therefore, the second coil 1152*b* and the second magnet 1151*b* may be positioned to face each other. At least a portion of the second magnet 1151*b* may overlap the second coil 1152*b* in the second direction (Y-axis direction).

In addition, the first coil 1152*a* and the second coil 1152*b* may overlap each other in the second direction (Y-axis direction), and the first magnet 1151*a* and the second magnet 1151*b* may overlap each other in the second direction (Y-axis direction).

With this configuration, the electromagnetic force applied to the outer surfaces of the holder (the first holder outer surface and the second holder outer surface) may be positioned on parallel axes in the second direction (Y-axis direction) to allow the X-axis tilting to be performed accurately and precisely.

In addition, the second protruding portion PR2 (PR2*a* and PR2*b*) of the tilting guide unit 1141 may be in contact with the first member 1126 of the first housing 1120. The second protruding portion PR2 may be seated in a second protrusion groove PH2 formed in one side surface of the first member 1126. In addition, when the X-axis tilting is performed, the second protruding portion PR2 (PR2*a* and PR2*b*) may be a reference axis (or a rotational axis) of the tilting. Therefore, the tilting guide unit 1141 and the mover 1130 may move in the second direction.

In addition, as described above, the first Hall sensor 1153*a* may be positioned outside to be electrically connected and coupled to the first board unit 1154. However, the present invention is not limited to such a position.

In addition, the third coil 1152*c* may be positioned on the third housing side portion 1123, and the third magnet 1151*c* may be positioned on the third holder outer surface 1131S3 of the holder 1131. At least portions of the third coil 1152*c* and the third magnet 1151*c* may overlap in the first direction (X-axis direction). Therefore, the electromagnetic force between the third coil 1152*c* and the third magnet 1151*c* may be easily controlled.

As described above, the tilting guide unit 1141 may be positioned on a fourth holder outer surface 1131S4 of the holder 1131. In addition, the tilting guide unit 1141 may be seated in a fourth seating groove 1131S4*a* of the fourth holder outer surface. As described above, the fourth seating groove 1131S4*a* may include the first region AR1, the second region AR2, and the third region AR3.

The second member 1131*a* may be disposed in the first region AR1, and the second member 1131*a* may include the first groove gr1 formed on the inner surface of the second member 1131*a*. In addition, the second magnet 1142 may be disposed in the first groove gr1 as described above, and a repulsive force RF2 generated by the second magnet 1142 may be transmitted to the fourth seating groove 1131S4*a* of the holder 1131 through the second member 1131*a* (RF2'). Therefore, the holder 1131 may apply a force to the tilting guide unit 1141 in the same direction as the repulsive force RF2 generated by the second magnet 1142.

The first member 1126 may be disposed in the second region AR2. The first member 1126 may include the second groove gr2 facing the first groove gr1. In addition, the first member 1126 may include the second protrusion groove PH2 disposed in a surface corresponding to the second groove gr2. In addition, a repulsive force RF1 generated by the first magnet 1143 may be applied to the first member 1126. Therefore, the first member 1126 and the second member 1131*a* may press the tilting guide unit 1141 disposed between the first member 1126 and the holder 1131 through the generated repulsive forces RF1 and RF2'. Therefore, even after the holder is tilted with respect to the X-axis or the Y-axis by a current applied to the first and second coils or the third coil 1152*c*, the coupling between the holder 1131, the first housing 1120, and the tilting guide unit 1141 can be maintained.

The tilting guide unit 1141 may be disposed in the third region AR3. As described above, the tilting guide unit 1141 may include the first protruding portion PR1 and the second protruding portion PR2. In this case, the first protruding portion PR1 and the second protruding portion PR2 may be disposed on the second surface 1141*b* and the first surface 1141*a* of the base BS, respectively. As described above, even in other embodiments to be described below, the first protruding portion PR1 and the second protruding portion PR2 may be variously positioned on facing surfaces of the base BS.

The first protrusion groove PH1 may be positioned in the fourth seating groove 1131S4*a*. In addition, the first protruding portion PR1 of the tilting guide unit 1141 may be accommodated in the first protrusion groove PH1. Therefore, the first protruding portion PR1 may be in contact with the first protrusion groove PH1. A maximum diameter of the first protrusion groove PH1 may correspond to a maximum diameter of the first protruding portion PR1. This can also be applied to the second protrusion groove PH2 and the second protruding portion PR2 in the same manner. In other words, a maximum diameter of the second protrusion groove PH2 may correspond to a maximum diameter of the second protruding portion PR2. In addition, the second protruding portion PR2 may be in contact with the second protrusion groove PH2. With this configuration, the first-axis tilting may be easily performed with respect to the first protruding portion PR1, the second-axis tilting may be easily performed with respect to the second protruding portion PR2, and the tilting radius can be increased.

In addition, since the tilting guide unit 1141 may be disposed side by side with the second member 1131*a* and the first member 1126 in the third direction (Z-axis direction), the tilting guide unit 1141 may overlap the optical member 1132 in the first direction (X-axis direction). More specifically, in an embodiment, the first protruding portion PR1 may overlap the optical member 1132 in the first direction (X-axis direction). Furthermore, at least a portion of the first protruding portion PR1 may overlap the third coil 1152*c* or the third magnet 1151*c* in the first direction (X-axis direction). In other words, in the camera actuator according to the embodiment, each protruding portion, which is the central axis of the tilting, may be positioned adjacent to the center of gravity of the mover 1130. Therefore, the tilting guide unit may be positioned adjacent to the center of gravity of the holder. Therefore, the camera actuator according to the embodiment can minimize a moment value at which the holder is tilted and also minimize the consumption of the current applied to the coil unit or the like to tilt the holder, thereby minimizing power consumption and improving the reliability of the device.

In addition, the second magnet 1142 and the first magnet 1143 may not overlap the third coil 1152*c* or the optical member 1132 in the first direction (X-axis direction). In other words, in an embodiment, the second magnet 1142 and the first magnet 1143 may be disposed to be spaced apart from the third coil 1152*c* or the optical member 1132 in the third direction (Z-axis direction). Therefore, it is possible to minimize the magnetic force transmitted from the second magnetic 1142 and the first magnetic 1143 to the third coil 1152*c*. Therefore, the camera actuator according to the embodiment may easily perform vertical driving (Y-axis tilting) and can minimize power consumption.

Furthermore, as described above, the second Hall sensor 1153*b* positioned inside the third coil 1153*c* may detect a change in magnetic flux and thus perform position sensing between the third magnet 1151*c* and the second Hall sensor 1153*b*. In this case, an offset voltage of the second Hall sensor 1153*b* may be changed depending on the influence of the magnetic field generated from the second magnet 1142 and the first magnet 1143.

The first camera actuator according to the embodiment may include the second member 1131*a*, the second magnet 1142, the first magnet 1143, the first member 1126, the tilting guide unit 1141, and the holder 1131, which are disposed sequentially in the third direction. However, since the second magnet is positioned in the second member and the first magnet is positioned in the first member, the second member, the first member, the tilting guide unit, and the holder may be disposed sequentially.

In addition, in an embodiment, separation distances of the second magnet 1142 and the first magnet 1143 from the holder 1131 (or the optical member 1132) in the third direction may be greater than a separation distance from the tilting guide unit 1141. Therefore, the second Hall sensor 1153*b* under the holder 1131 may also be disposed to be spaced a predetermined distance from the second magnet 1142 and the first magnet 1143. Therefore, it is possible to minimize the influence of the magnetic field generated by the second magnet 1142 and the first magnet 1143 on the second Hall sensor 1153*b*, thereby preventing the Hall voltage from being saturated by being concentrated to a positive or negative value. In other words, such a configuration may allow a Hall electrode to have a range in which Hall calibration may be performed. Furthermore, a temperature also affects the electrode of the Hall sensor, and resolution power of a camera lens varies depending on the temperature, but in the embodiment, it is possible to prevent the case in which the Hall voltage is concentrated to the positive or negative value to compensate the resolution power of the lens correspondingly, thereby easily preventing the degradation of the resolution power.

In addition, a circuit for compensating the offset with respect to the output (i.e., the Hall voltage) of the second Hall sensor 1153*b* may also be easily designed.

In addition, according to the embodiment, some regions of the tilting guide unit 1141 may be positioned outside the fourth holder outer surface on the basis of the fourth holder outer surface of the holder 1131.

The tilting guide unit 1141 excluding the first protruding portion PR1 and the second protruding portion PR2 may be seated in the fourth seating groove 1131S4*a* with respect to the base BS. In other words, a length of the base BS in the third direction (Z-axis direction) may be smaller than a length of the fourth seating groove 1131S4*a* in the third direction (Z-axis direction). With this configuration, it is possible to easily realize miniaturization.

In addition, a maximum length of the tilting guide unit 1141 in the third direction (Z-axis direction) may be greater than a length of the fourth seating groove 1131S4*a* in the third direction (Z-axis direction). Therefore, as described above, an end of the second protruding portion PR2 may be positioned between the fourth holder outer surface and the first member 1126. In other words, at least a portion of the second protruding portion PR2 may be positioned in a direction opposite to the third direction (Z-axis direction) more than the holder 1131. In other words, the holder 1131 may be spaced a predetermined distance from the end (portion in contact with the second protrusion groove) of the second protruding portion PR2 in the third direction (Z-axis direction).

With this configuration, since the second member 1131*a* is positioned inside the first member 1126, it is possible to increase space efficiency and realize miniaturization. Furthermore, even when the driving (tilting or rotation of the mover 1130) by the electromagnetic force is performed, the second member 1131*a* does not protrude outward from the first member 1126, and thus it is possible to block the second member 1131*a* from being in contact with nearby devices. Therefore, it is possible to improve the reliability.

In addition, a predetermined separation space may be present between the second magnet 1142 and the first magnet 1143. In other words, the second magnet 1142 and the first magnet 1143 may face each other with the same polarity.

Figure 12A:
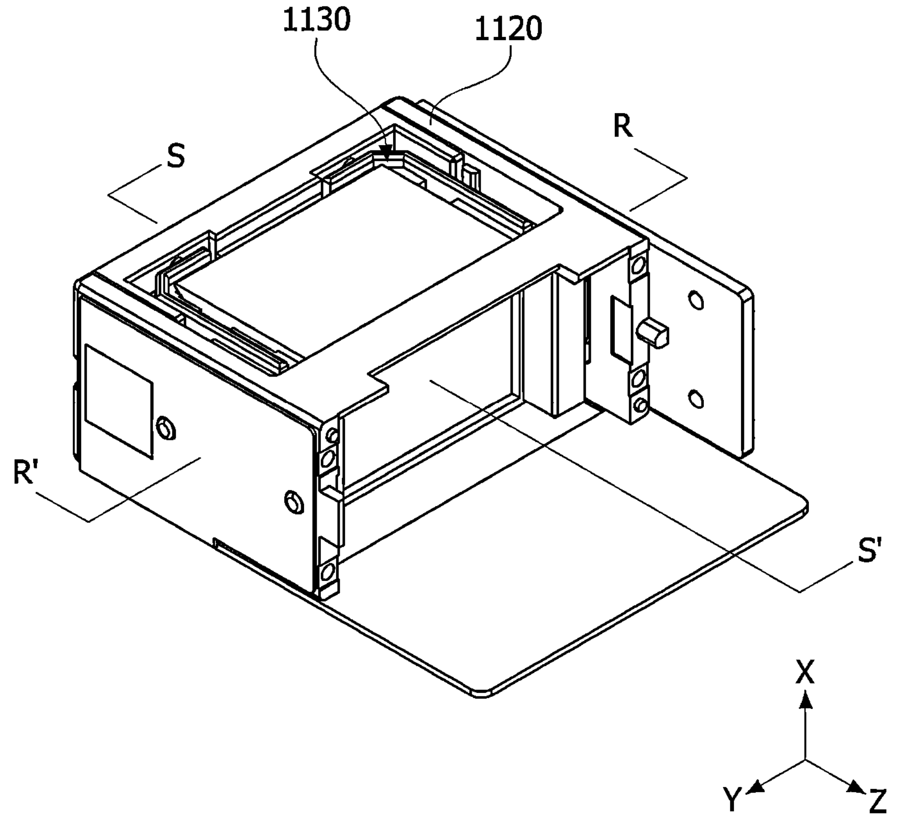
FIG. 12A is a perspective view of the first camera actuator according to the embodiment.
Figure 12B:
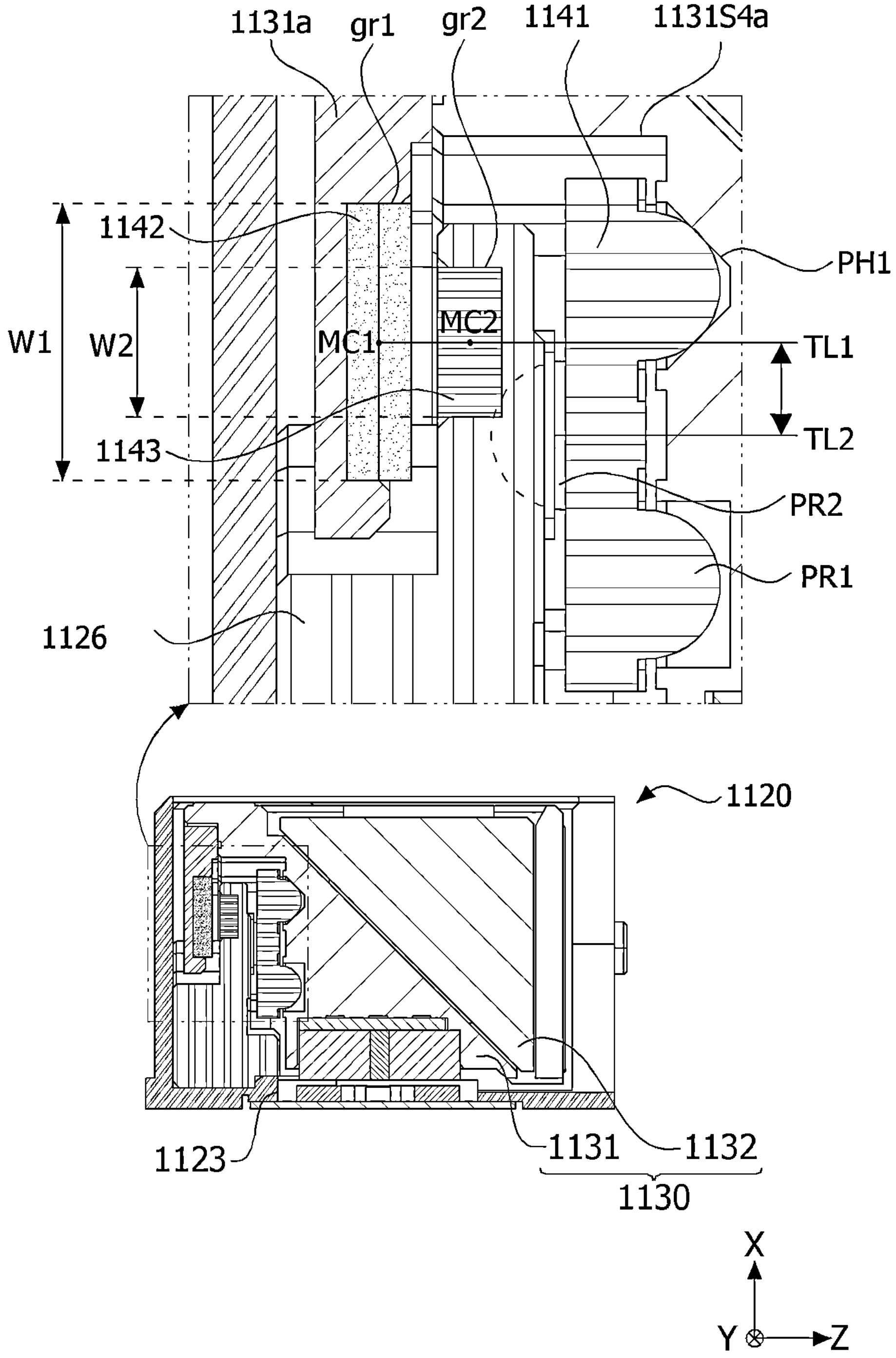
FIG. 12B is a cross-sectional view along line SS' in FIG. 12A.
Figure 12C:
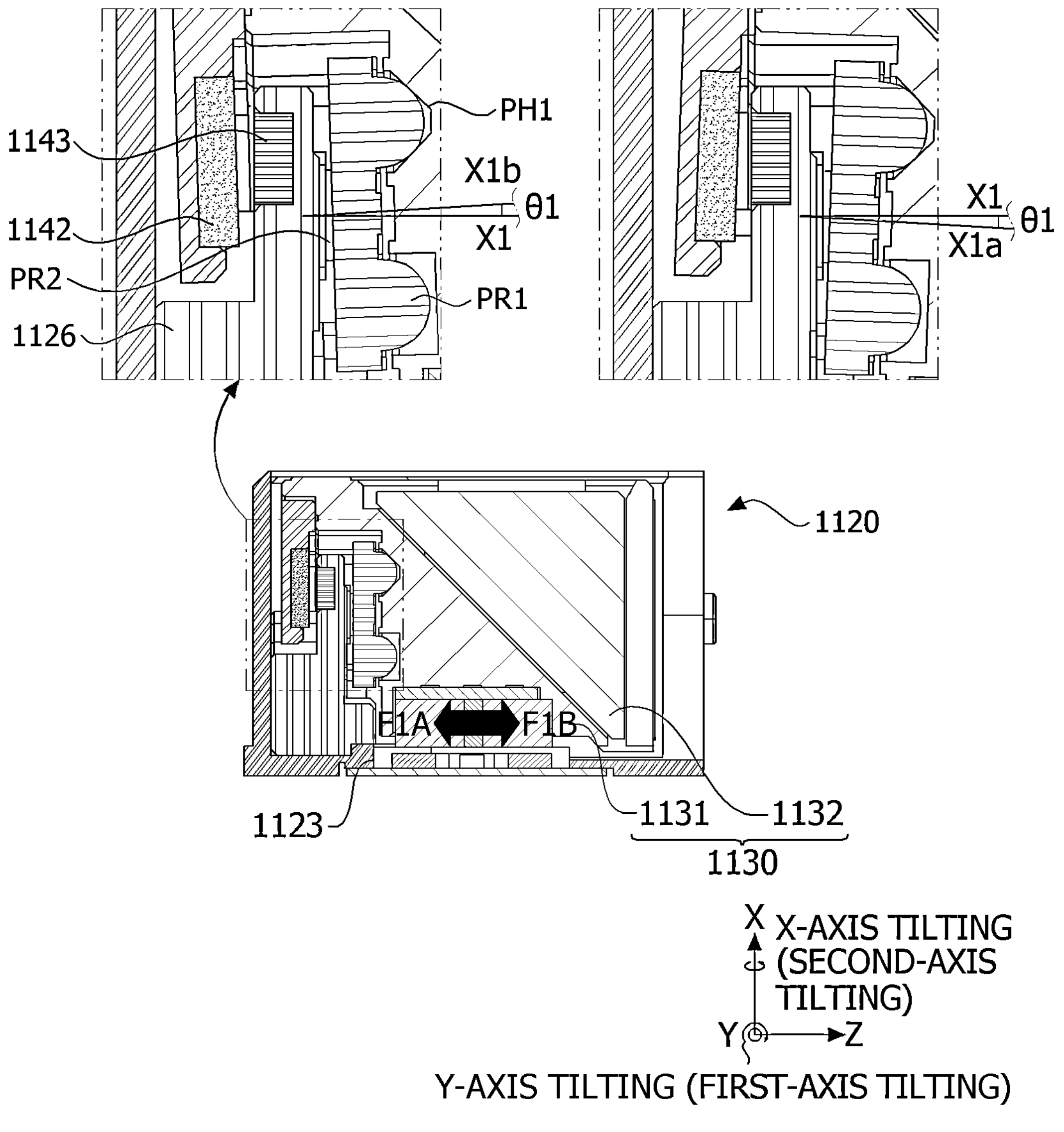
FIG. 12C is an exemplary view of the movement of the first camera actuator shown in FIG. 12B.

FIG. 12A is a perspective view of the first camera actuator according to the embodiment, FIG. 12B is a cross-sectional view along line SS' in FIG. 12A, and FIG. 12C is an exemplary view of the movement of the first camera actuator shown in FIG. 12B.

Referring to FIGS. 12A to 12C, the Y-axis tilting may be performed by the first camera actuator according to the embodiment. In other words, an OIS can be implemented by rotating the first camera actuator in the first direction (X-axis direction).

In an embodiment, the third magnet 1151*c* disposed under the holder 1131 may generate the electromagnetic force with the third coil 1152*c* to tilt or rotate the mover 1130 with respect to the second direction (Y-axis direction).

Specifically, the repulsive force between the second magnet 1142 and the first magnet 1143 may be transmitted to the second member 1131*a* and the first member 1126 and finally transmitted to the tilting guide unit 1141 disposed between the first member 1126 and the holder 1131. Therefore, the tilting guide unit 1141 may be pressed by the mover 1130 and the first housing 1120 by the above-described repulsive force.

In addition, the second protruding portion PR2 may be supported by the first member 1126. In this case, in an embodiment, the tilting guide unit 1141 may rotate or tilt with respect to the second protruding portion PR2 protruding toward the first member 1126, which is the reference axis (or the rotational axis), that is, with respect to the second direction (Y-axis direction). In other words, the tilting guide unit 1141 may rotate or tilt with respect to the second protruding portion PR2 protruding toward the first member 1126 in the first direction (X-axis direction), which is the reference axis (or the rotational axis).

For example, an OIS can be implemented by rotating (X1→X1*a*) the mover 130 at a first angle θ1 in the X-axis direction by first electromagnetic forces F1A and FIB between the third magnet 1151*c* disposed in the third seating groove and the third coil 1152*c* disposed on the third board side portion.

Conversely, an OIS can be implemented by rotating (X1→X1*b*) the mover 130 at the first angle θ1 in a direction opposite to the X-axis direction by the first electromagnetic forces F1A and F1B between the third magnet 1151*c* disposed in the third seating groove and the third coil 1152*c* disposed on the third board side portion.

The first angle θ1 may be in the range of ±1° to ±3°. However, the present invention is not limited thereto.

Hereinafter, in the first camera actuators according to various embodiments, the electromagnetic force may move the mover by generating a force in the described direction or move the mover in the described direction even when a force is generated in another direction. In other words, the described direction of the electromagnetic force is a direction of the force generated by the magnet and the coil to move the mover.

In addition, a center MC1 of the second magnet 1142 and a center MC2 of the first magnet 1143 may be disposed side by side in the third direction (Z-axis direction). In other words, a center line TL1 connecting the center MC1 of the second magnet 1142 to the center MC2 of the first magnet 1143 may be parallel to the third direction (Z-axis direction).

In addition, a bisector TL2 which bisects the second protruding portion PR2 and corresponds to the third direction (Z-axis direction) may be parallel to the center line TL1. In other words, the bisector TL2 may be a line which bisects the second protruding portion PR2 in the first direction (X-axis direction), and a plurality of bisectors TL2 may be provided.

In an embodiment, the bisector TL2 may be disposed to be spaced apart from the center line TL1 in the first direction (X-axis direction). The bisector TL2 may be positioned above the center line TL1. With this configuration, since the separation distance between the third coil 1152*c* and the third magnet 1151*c* may be increased, the holder may more accurately perform two axes tilting. Furthermore, when a current is not applied to the coil, the position of the holder can be maintained equally.

More specifically, since the center MC1 of the second magnet 1142 and the center MC2 of the first magnet 1143 are spaced apart from the bisector TL2 in the first direction (X-axis direction), the force (e.g., the repulsive force) between the second magnet 1142 and the first magnet 1143 may act at a distance spaced apart from the bisector TL2 corresponding to the optical axis in the first direction (X-axis direction). In addition, a momentum is generated in the mover 1130 by such a force. However, when the center MC1 of the second magnet 1142 and the center MC2 of the first magnet 1143 are positioned on the bisector TL2, there is a problem that during the execution of the calibration, the positions of the tilting guide unit and the second magnet 1142 are not maintained after tilting. In other words, in the camera actuator according to the embodiment, since the center MC1 of the second magnet 1142 and the center MC2 of the first magnet 1143 are not disposed on the bisector TL2, the positions of the tilting guide unit and the second magnet 1142 may be maintained after tilting or rotating.

In another embodiment, the center MC1 of the second magnet 1142 and the center MC2 of the first magnet 1143 may be disposed to be spaced apart from each other in the first direction (X-axis direction).

In addition, the center MC1 of the second magnet 1142 and the center MC2 of the first magnet 1143 may not be positioned on the bisector TL2. For example, the center MC1 of the second magnet 1142 and the center MC2 of the first magnet 1143 may be positioned above the bisector TL2. Therefore, since a separation distance between the third coil 1152*c* and the third magnet 1151*c* may increase, the holder may perform two axes tilting more accurately. Furthermore, when a current is not applied to the coil, the position of the holder can be equally held.

In addition, the first magnet 1143 and the second magnet 1142 may have different sizes. In an embodiment, the first magnet 1143 and the second magnet 1142 may have the same length in the optical axis direction or the third direction (Z-axis direction) and have different areas in the first direction and the second direction. For example, a length W1 of the first magnet 1143 in the first direction may be greater than a length W2 of the second magnet 1142 in the first direction. Alternatively, the lengths may be different in any one of the first direction and the second direction.

In this case, the area of the first magnet 1143 may be greater than the area of the second magnet 1142. In addition, the first driving unit 1150 includes the driving magnet 1151, the driving coil 1152, the Hall sensor unit 1153, the first board unit 1154, and the yoke unit 1155.

In addition, the second magnet 1142 and the first magnet 1143 may have different lengths in the first direction (X-axis direction).

In an embodiment, the area of the second magnet 1142 coupled to the second member 1131*a* and tilted together with the mover 1130 may be greater than the area of the first magnet 1143. For example, the length of the second magnet 1142 in the first direction (X-axis direction) may be greater than the length of the first magnet 1143 in the first direction (X-axis direction). In addition, the length of the second magnet 1142 in the second direction (Y-axis direction) may be greater than a length of the first magnet 1143 in the second direction (Y-axis direction). In addition, the first magnet 1143 may be positioned in a virtual linear line extending both ends of the second magnet 1142 in the third direction.

With this configuration, even when the magnet at one side (e.g., the second magnet) is tilted upon tilting or rotating, it is possible to easily prevent forces other than the vertical force from being generated by the tilting. In other words, even when the second magnet vertically tilts together with the mover 1130, the second magnet may not receive a force (e.g., a repulsive force or an attractive force) against the tilting from the first magnet 1143. Therefore, it is possible to increase driving efficiency.

Figure 13A:
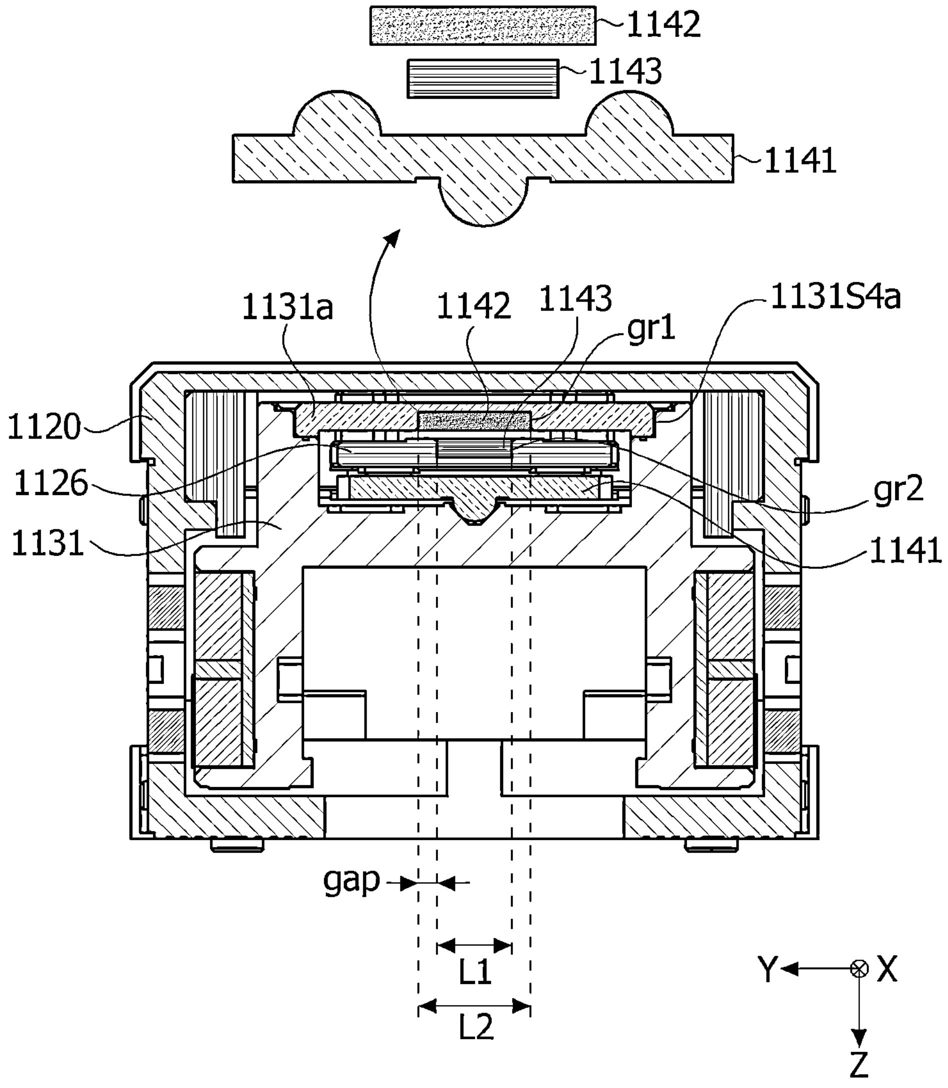
FIG. 13A is a cross-sectional view along line RR' in FIG. 12A.
Figure 13B:
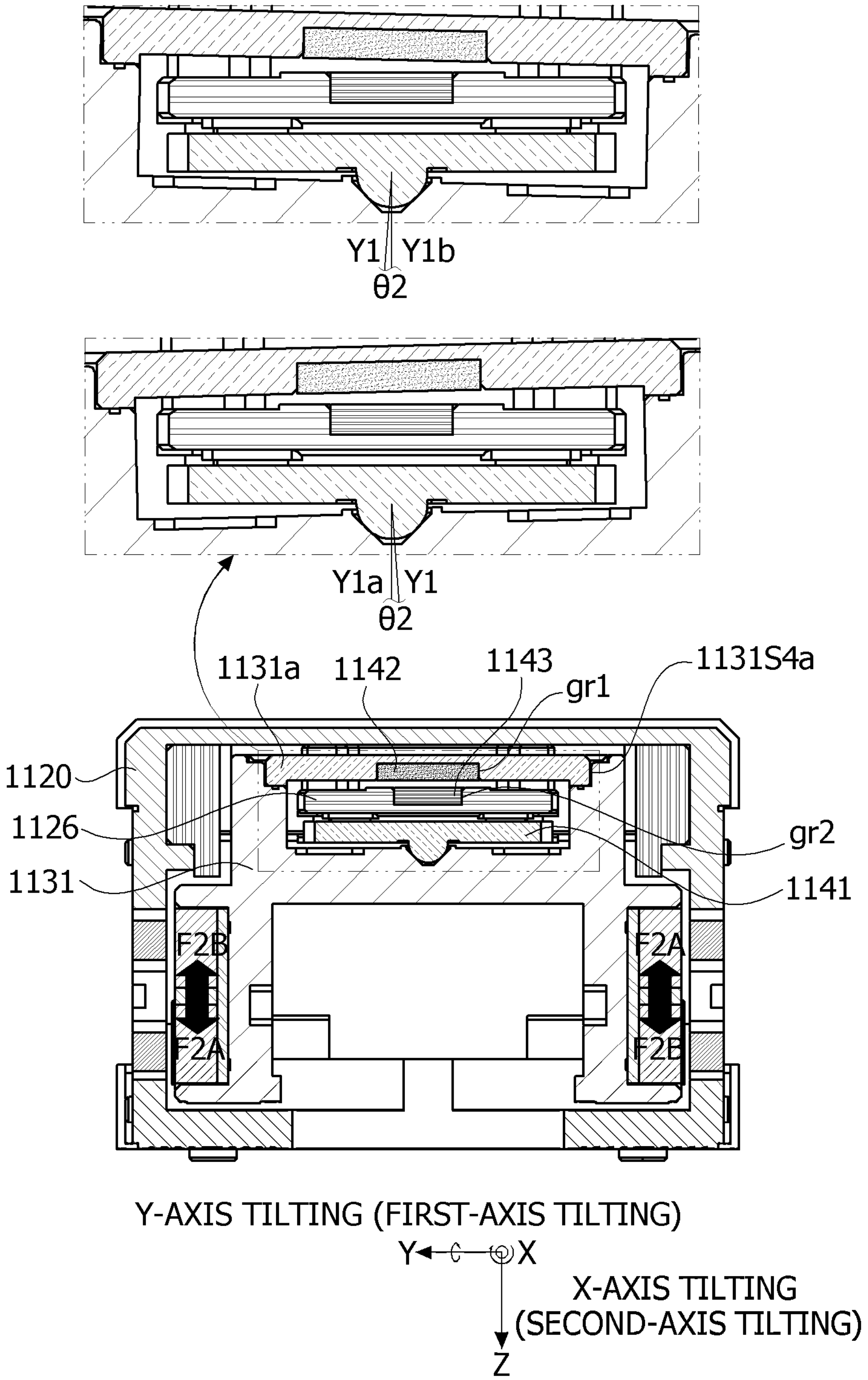
FIG. 13B is an exemplary view of the movement of the first camera actuator shown in FIG. 13A.

FIG. 13A is a cross-sectional view along line RR' in FIG. 12A, and FIG. 13B is an exemplary view of the movement of the first camera actuator shown in FIG. 13A.

Referring to FIGS. 13A and 13B, X-axis tilting may be performed. In other words, an OIS can be implemented by tilting or rotating the mover 1130 in the Y-axis direction.

In an embodiment, the first magnet 1151*a* and the second magnet 1151*b* disposed on the holder 1131 may generate the electromagnetic force with the first coil 1152*a* and the second coil 1152*b*, respectively, and tilt or rotate the tilting guide unit 1141 and the mover 1130 with respect to the first direction (X-axis direction).

Specifically, the repulsive force between the second magnet 1142 and the first magnet 1143 may be transmitted to the first member 1126 and the holder 1131 and finally transmitted to the tilting guide unit 1141 disposed between the holder 1131 and the first member 1126. Therefore, the tilting guide unit 1141 may be pressed by the mover 1130 and the first housing 1120 due to the above-described repulsive force.

In addition, the 1-1 protrusion PR1*a* and the 1-2 protrusion PR1*b* may be spaced apart from each other in the first direction (X-axis direction) and supported by the first protrusion groove PH1 formed in the fourth seating groove 1131S4*a* of the holder 1131. In addition, in an embodiment, the tilting guide unit 1141 may rotate or tilt with respect to the first protruding portion PR1 protruding toward the holder 1131 (e.g., in the third direction), which is the reference axis (or the rotational axis), that is, with respect to the first direction (X-axis direction).

For example, an OIS can be implemented by rotating (Y1→Y1*a*) the mover 1130 at a second angle θ2 in the Y-axis direction by second electromagnetic forces F2A and F2B between the first and second magnets 1151*a* and 1151*b* disposed in the first seating groove and the first and second coils 1152*a* and 1152*b* disposed on the first and second board side portions. In addition, an OIS can be implemented by rotating (Y1→Y1*b*) the mover 130 at the second angle θ2 in the Y-axis direction by the second electromagnetic forces F2A and F2B between the first and second magnets 1151*a* and 1151*b* disposed in the first seating groove and the first and second coils 1152*a* and 1152*b* disposed on the first and second board side portions. The second angle θ2 may be in the range of ±1° to 3°. However, the present invention is not limited thereto.

In addition, an electromagnetic force may act on the first coil 1152*a* in the third direction, and an electromagnetic force may act on the second coil 1152*b* in a direction opposite to the third direction. At this time, the first magnet 1151*a* and the second magnet 1151*b* may be moved in the shown directions F2B and F2A by receiving a force generated by the electromagnetic force. In other words, the electromagnetic forces generated by the first and second magnets 1151*a* and 1151*b* and the first and second coils 1152*a* and 1152*b* may act in the third direction or a direction opposite to the third direction. For example, the electromagnetic force may be generated on a left side portion of the mover 1130 in the third direction (Z-axis direction) and may act on a right side portion of the mover 1130 in a direction opposite to the third direction (Z-axis direction). Therefore, the mover 1130 may rotate in the first direction. Alternatively, the mover 130 may move in the second direction.

As described above, the second camera actuator according to the embodiment may control the mover 1130 to rotate in the first direction (X-axis direction) or the second direction (Y-axis direction) by the electromagnetic force between the driving magnet in the holder and the driving coil disposed in the first housing, thereby minimizing the occurrence of a decentering or tilting phenomenon and providing the best optical characteristics upon implementing the OIS. In addition, as described above, "Y-axis tilting" is rotation or tilting in the first direction (X-axis direction), and "X-axis tilting" is rotation or tilting in the second direction (Y-axis direction).

In addition, a length L1 of the first magnet 1143 in the first direction may be greater than a length L2 of the second magnet 1142 in the first direction. A ratio between the length L1 of the first magnet 1143 in the second direction and the length L2 of the second magnet 1142 in the second direction may be in the range of 1:0.5 to 1:0.75. When the ratio is smaller than 1:0.5, the repulsive force between the first and second magnets may not be significantly applied to the entirety of the mover. In addition, when the ratio is greater than 1:0.75, it may be difficult for the repulsive force to be concentrated on the central axis of the first protruding portion.

Furthermore, a gap between one end of the first magnet 1143 and one end of the second magnet 1142 may be in the range of 0.2 mm to 0.6 mm. Specifically, the gap between the one end of the first magnet 1143 and the one end of the second magnet 1142 may be in the range of 0.225 mm to 0.5 mm. More specifically, the gap between the one end of the first magnet 1143 and the one end of the second magnet 1142 may be in the range of 0.25 mm to 0.4 mm.

Figure 14A:
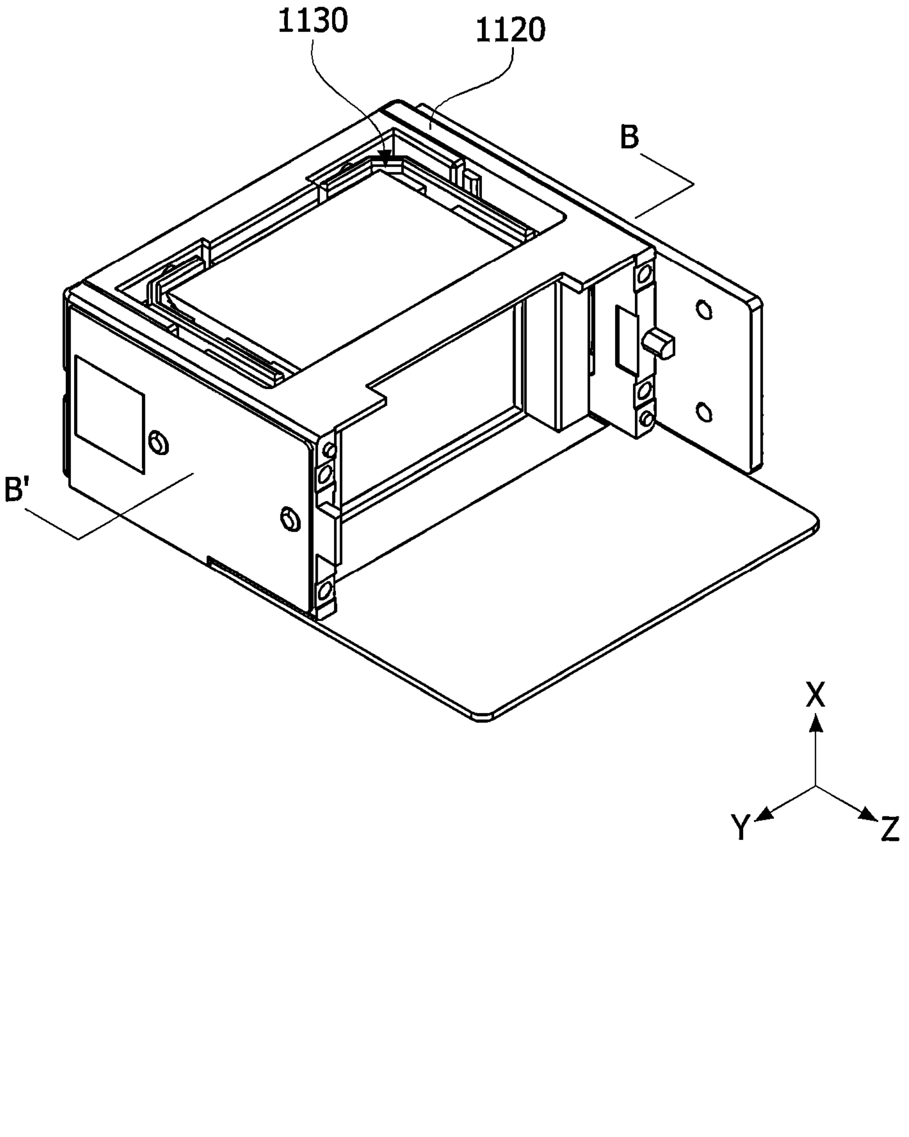
FIG. 14A is a perspective view of the first camera actuator according to the embodiment.
Figure 14B:
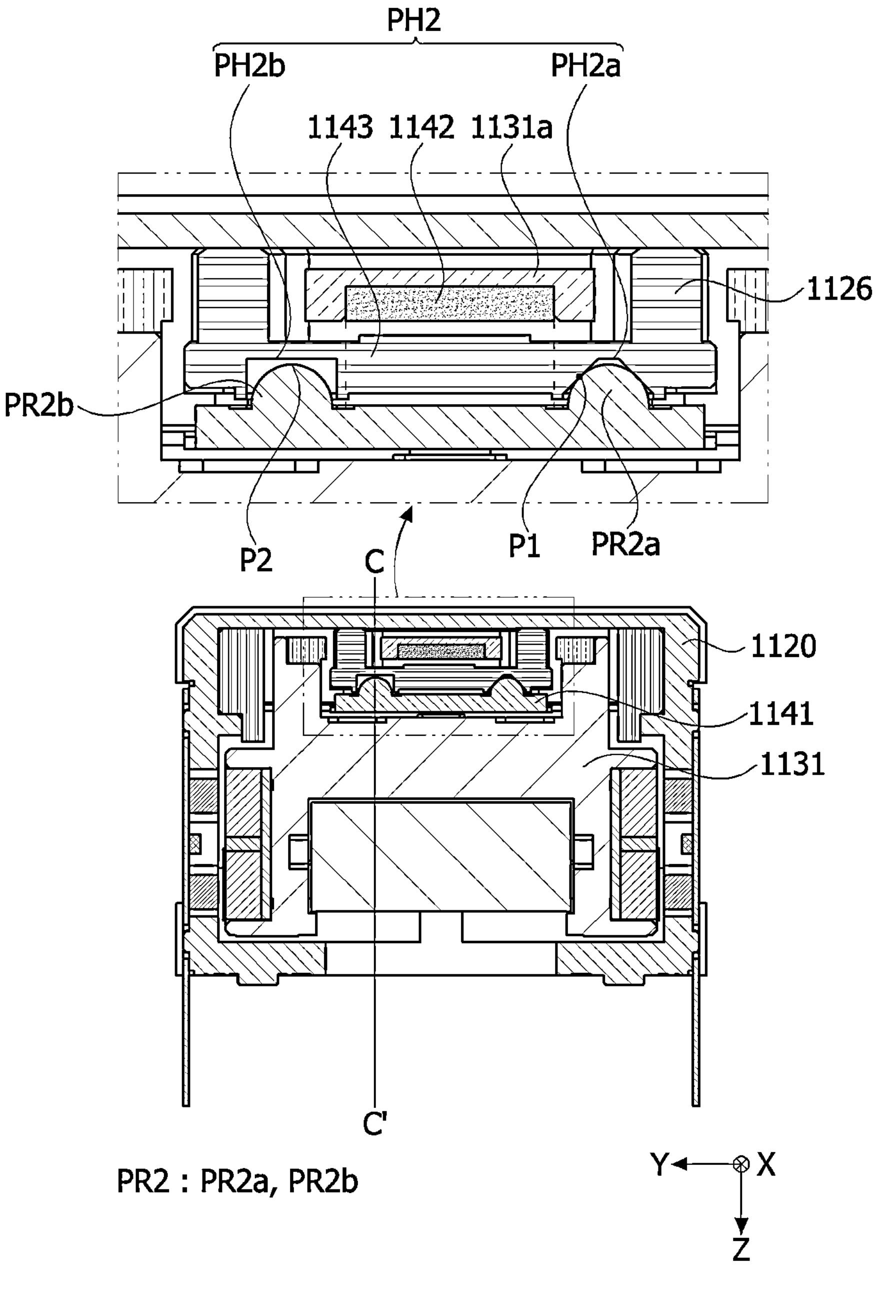
FIG. 14B is a view along line BB' in FIG. 14A.
Figure 14C:
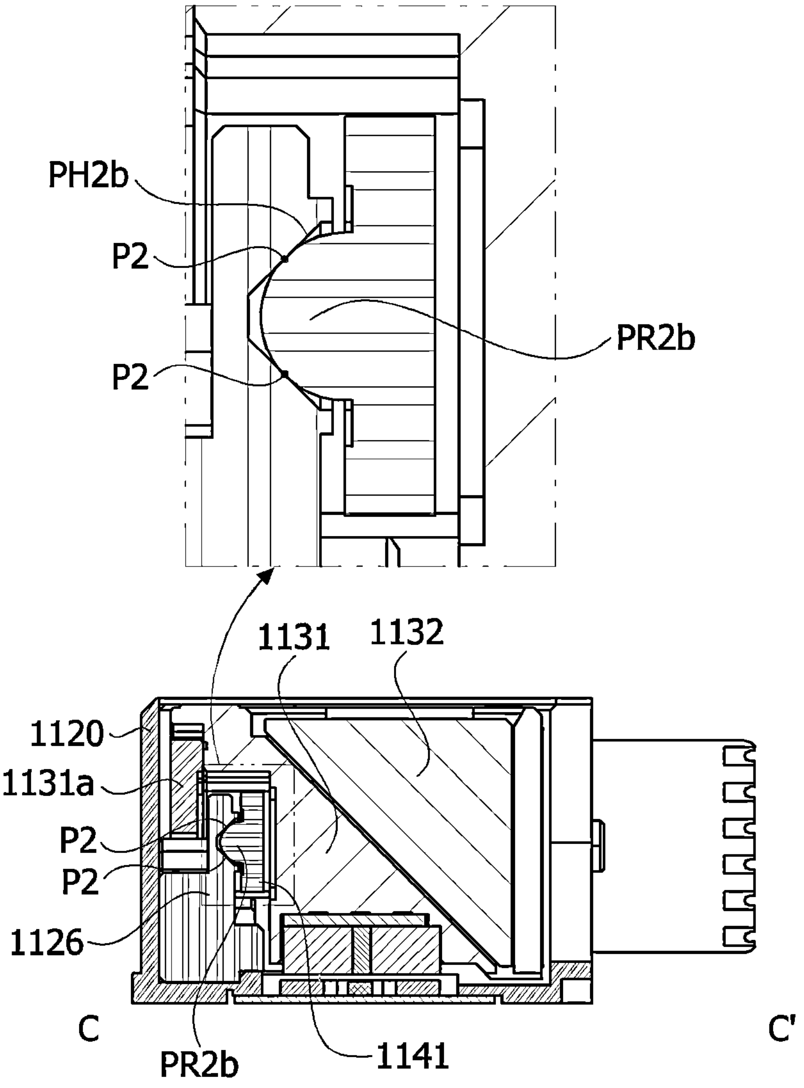
FIG. 14C is a view along line CC' in FIG. 14B.

FIG. 14A is a perspective view of the first camera actuator according to the embodiment, FIG. 14B is a view along line BB' in FIG. 14A, and FIG. 14C is a view along line CC' in FIG. 14B.

Referring to FIGS. 14A to 14C, in the first camera actuator according to the embodiment, any protruding portions of the first protruding portions and the second protruding portions may be disposed to be spaced apart from each other in the horizontal direction or the second direction (Y-axis direction) and may have a contact point with any one of the mover 1130 and the housing 1120 (e.g., the first member 1126).

For example, the first protruding portion PR1 may extend from the base of the tilting guide unit 1141 toward the mover 1130 (or the holder 1131) as described above. The second protruding portion PR2 may extend from the base of the tilting guide unit 1141 toward the housing or the first member. Furthermore, the first protruding portion PR1 may be a hemisphere, ball, or rolling member protruding to one side and may be provided as a plurality of first protruding portions. In addition, a plurality of first protruding portions PR1 may be disposed to be spaced apart from each other in the vertical direction (X-axis direction) or the first direction. In addition, the second protruding portion PR2 may be a hemisphere, ball, or rolling member which protrudes or extends in the optical axis direction or the third direction (Z-axis direction) and may be provided as a plurality of second protruding portions. In addition, a plurality of second protruding portions PR2 may be disposed to be spaced apart from each other in the horizontal direction or the second direction (Y-axis direction). Hereinafter, the second protruding portions PR2 are disposed to be spaced apart from each other in the horizontal direction, and based on the same, the following description will be made.

Therefore, in an embodiment, the second protruding portion PR2 may be spaced apart from each other in the horizontal direction or the second direction (Y-axis direction) and may have a contact point with the housing (or the first member). Furthermore, the mover 1130 may include the first protrusion groove PH1 in which the first protruding portion PR1 is seated. The first member 1126 may include the second protrusion groove PH2 in which the second protruding portion PR2 is seated.

More specifically, the second protruding portion PR2 may include a first sub-protrusion PR2a and a second sub-protrusion PR2b spaced apart from each other in the horizontal direction or the second direction (Y-axis direction).

In addition, the second protrusion groove PH2 may include a first contact point P1 in contact with the first sub-protrusion PR2a therein. In addition, the second protrusion groove PH2 may include a second contact point P2 in contact with the second sub-protrusion PR2b therein.

For example, the number of second protrusion grooves PH2 may correspond to the number of second protruding portions PR2. Therefore, the second protrusion groove PH2 may include the 2-1 protrusion groove PH2a and the 2-2 protrusion groove PH2b. The 2-1 protrusion groove PH2a and the 2-2 protrusion groove PH2b may be spaced apart from each other in the second direction (Y-axis direction). In addition, the first sub-protrusion PR2a may include a contact point in contact with the 2-1 protrusion groove PH2a. As described above, the number of contact points may vary depending on the number of inclined surfaces in the second protrusion groove PH2. In this case, the first contact point P1 may be positioned therein or at an innermost side of the second protrusion groove PH2. Furthermore, a plurality of first contact points P1 may be provided. In addition, the inside may be a direction toward the center point on the XY plane. In addition, the 2-2 protrusion groove PH2b may include the second contact point P2 in contact with the second sub-protruding portion PR2b.

In an embodiment, the first magnet 1143 may be positioned between the contact points. For example, the first magnet 1143 may be positioned between the first contact point P1 and the second contact point P2 at which the second protruding portion PR2 is in contact with the second protrusion groove PH2.

In other words, any protruding portions of the first protruding portions and the second protruding portions may be disposed to be spaced apart from each other in the horizontal direction. In this case, the second protruding portion may include the first sub-protrusion PR2a and the second sub-protrusion PR2b disposed to be spaced apart from each other in the horizontal direction. In addition, each of the first sub-protrusion PR2a and the second sub-protrusion PR2b may include a plurality of contact points in contact with the housing. The plurality of contact points may include the first contact point P1 and the second contact point P2. In addition, the first magnet may be positioned between contact points facing each other among the plurality of contact points. In other words, the first magnet 1143 may be positioned between the first contact point P1 and the second contact point P2. Alternatively, the first magnet 1143 may be positioned between or inside the contact points with the smallest separation distance in the second direction (Y-axis direction) between the sub-protrusions spaced apart from each other among the plurality of contact points.

In addition, a region inside the first contact point P1 of the first sub-protrusion PR2a may have a different area from a region inside the second contact point P2 of the second sub-protrusion PR2b. In an embodiment, the second contact point P2 may be positioned on a line or XZ plane which bisects the 2-2 protrusion groove PH2b. In addition, the first contact point P1 may be positioned inward from a line or XZ plane which bisects the 2-1 protrusion groove PH2a. Therefore, the first contact point P1 may be positioned closer to the center point bisecting the first magnet 1143 in the second direction (Y-axis direction) than the second contact point P2. In other words, a length between the center point and the first contact point P1 may be smaller than a length between the center point and the second contact point P2. Therefore, an area of an inner region of the first contact point P1 of the first sub-protrusion PR2a may be smaller than an area of an inner region of the second contact point P2 of the second sub-protrusion PR2b. In this case, the first magnet 1143 may be positioned between the first contact point P1 and the second contact point P2 and misaligned with the first contact point P1 and the second contact point P2 in the optical axis direction (Z-axis direction). In other words, the first magnet 1143 may be positioned between the first contact point P1 and the second contact point P2 and may not overlap the first contact point P1 and the second contact point P2 in the optical axis direction (Z-axis direction).

Furthermore, the first magnet 1143 may be misaligned with the first sub-protrusion PR2a and the second sub-protrusion PR2b in the third direction (Z-axis direction) or the optical axis direction without overlapping the first sub-protrusion PR2a and the second sub-protrusion PR2b. With this configuration, the amount of the magnetic force or force generated from the first magnet 1143 applied toward the second protruding portion PR2 may be decreased. In other words, since the protruding portion of the tilting guide unit in the camera actuator may be less affected by the magnetic force caused by the magnet, friction between the protruding portion and the contact point can be decreased, thereby increasing current consumption and increasing a suppression ratio for an OIS.

In addition, the first magnet 1143 may be disposed between the first sub-protrusion PR2a and the second sub-protrusion PR2b. In addition, the first magnet 1143 may be misaligned with the first sub-protrusion PR2a and the second sub-protrusion PR2b in the optical axis direction or the third direction (Z-axis direction). Alternatively, a portion of the first magnet 143 may overlap the first sub-protrusion PR2a and the second sub-protrusion PR2b in the optical axis direction or the third direction (Z-axis direction). In addition, the first magnet 1143 may be disposed inside the first protruding portion separated in the vertical direction or the first direction (X-axis direction). In other words, the first magnet 1143 may be disposed between the third sub-protrusion and the fourth sub-protrusion.

Furthermore, the vertical direction (X-axis direction) or the first direction may be a direction perpendicular to the optical axis direction (Z-axis direction) and may be parallel to a direction in which light is incident on the optical member. Furthermore, the vertical direction (X-axis direction) may be a direction from bottom to top.

In addition, the optical axis direction or the third direction (Z-axis direction) may correspond to a direction from the first magnet 1143 to the second magnet 1142.

Furthermore, the vertically spaced first protruding portion PR1 and the horizontally spaced second protruding portion PR2 may be positioned adjacent to the first member. With this configuration, as the mover rotates with respect to the second protruding portion PR2, a change in light provided to the image sensor in response to the rotation of the tilting guide unit may become greater. Therefore, even when a height in the vertical direction is small, light incident in the first direction moves by being reflected in the third direction, thereby providing a wide changeable optical range in the vertical direction (first direction). Furthermore, it is possible to provide a more improved rotational radius in the vertical direction than a rotational radius in the horizontal direction.

Figure 14D:
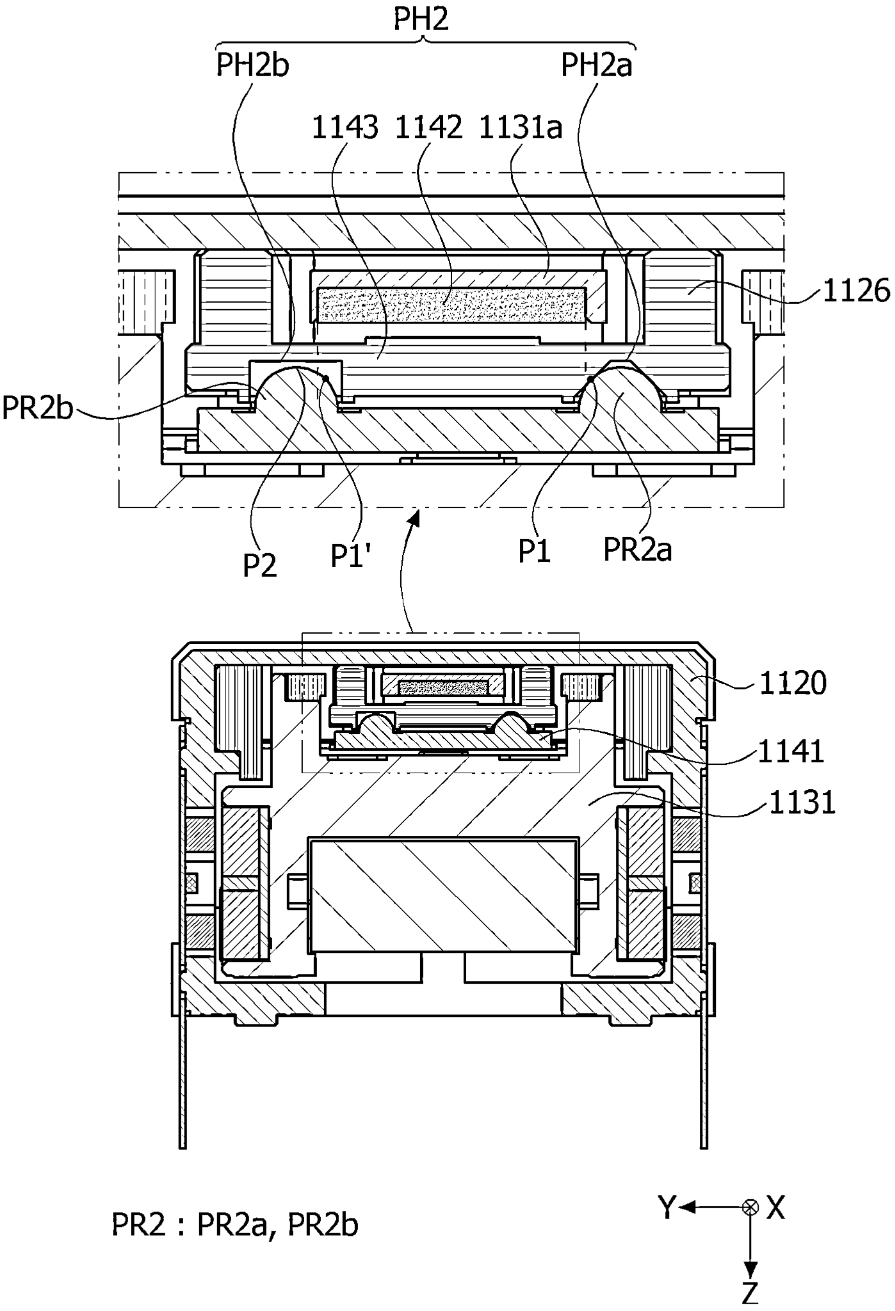
FIG. 14D is a cross-sectional view of the first camera actuator according to another embodiment.

FIG. 14D is a cross-sectional view of a first camera actuator according to another embodiment.

Referring to FIG. 14D, the above-described contents except for the contents to be described below can be applied to the first camera actuator according to another embodiment in the same manner. Even in the first camera actuator according to another embodiment, any protruding portions of the first protruding portions and the second protruding portions may be disposed to be spaced apart from each other in the horizontal direction or the second direction (Y-axis direction) and may have a contact point of any one of the mover 1130 and the housing 1120 (e.g., the first member 1126).

In addition, the second protruding portion PR2 may be spaced apart from each other in the horizontal direction or the second direction (Y-axis direction) and may have a contact point with the housing (or the first member). In addition, the second protruding portion PR2 may include the first sub-protrusion PR2*a* and the second sub-protrusion PR2*b* spaced apart from each other in the horizontal direction or the second direction (Y-axis direction). In addition, the second protrusion groove PH2 may include the first contact point P1 in contact with the first sub-protrusion PR2*a* therein. Furthermore, the second protrusion groove PH2 may include the second contact point P2 in contact with the second sub-protrusion PR2*b* therein. For example, the number of second protrusion grooves PH2 may correspond to the number of second protruding portions PR2. Therefore, the second protrusion groove PH2 may include the 2-1 protrusion groove PH2*a* and the 2-2 protrusion groove PH2*b*. The 2-1 protrusion groove PH2*a* and the 2-2 protrusion groove PH2*b* may be spaced apart from each other in the second direction (Y-axis direction). In addition, the first sub-protrusion PR2*a* may include a contact point in contact with the 2-1 protrusion groove PH2*a*. As described above, the number of contact points may vary depending on the number of inclined surfaces in the second protrusion groove PH2. In this case, the first contact point P1 may be positioned therein or at an innermost side of the second protrusion groove PH2. Furthermore, a plurality of first contact points P1 may be provided. In addition, the inside may be a direction toward the center point on the XY plane. In addition, the 2-2 protrusion groove PH2*b* may include the second contact point P2 in contact with the second sub-protruding portion PR2*b*. The first contact point P1 may not overlap the first magnet 1143 in the optical axis direction or the third direction (Z-axis direction). In addition, the second magnet 1142 may not overlap the first contact point P1 in the optical axis direction or the third direction.

In addition, any one of the first sub-protrusion PR2*a* and the second sub-protrusion PR2*b* may overlap the first contact point P1 or a point P1' (corresponding to the contents to be described below) corresponding to the first contact point in the optical axis direction. Alternatively, any one of the first sub-protrusion PR2*a* and the second sub-protrusion PR2*b* may overlap the first contact point P1 or the point P1' (corresponding to the contents to be described below) corresponding to the first contact point in the optical axis direction.

Therefore, at least a portion of the first magnet 1143 may overlap the first sub-protrusion PR2*a* and the second sub-protrusion PR2*b* in the optical axis direction. In other words, the first magnet 1143 may overlap the inner region of the first contact point P1 of the first sub-protrusion PR2*a* in the optical axis direction or the third direction (Z-axis direction). In addition, the first magnet 1143 may overlap an inner region of the second contact point P2 of the second sub-protrusion PR2*b* in the optical axis direction or the third direction (Z-axis direction). In addition, the first magnet 1143 may overlap a region between the first sub-protrusion PR2*a* and the second sub-protrusion PR2*b* in the optical axis direction or the third direction (Z-axis direction).

In addition, an area of a region where the first magnet 1143 and the first sub-protrusion PR2*a* overlap each other in the third direction (Z-axis direction) may differ from an area of a region where the first magnet 1143 and the second sub-protrusion PR2*b* overlap each other in the third direction (Z-axis direction). For example, an area of a region where the first magnet 1143 and the first sub-protrusion PR2*a* overlap each other in the third direction (Z-axis direction) may be smaller than an area of a region where the first magnet 1143 and the second sub-protrusion PR2*b* overlap each other in the third direction (Z-axis direction). With this configuration, the magnetic force or force generated from the first magnet 1143 applied toward the second protruding portion PR2 may be decreased. In other words, since the protruding portion of the tilting guide unit in the camera actuator may be less affected by the magnetic force caused by the magnet, friction between the protruding portion and the contact point can be decreased, thereby increasing current consumption and increasing a suppression ratio for an OIS.

Furthermore, as described above with reference to FIG. 14C, the second contact point P2 may be positioned on the line or XZ plane which bisects the 2-2 protrusion groove PH2*b*. The above-described contents are applied to the following description in the same manner.

Figure 14E:
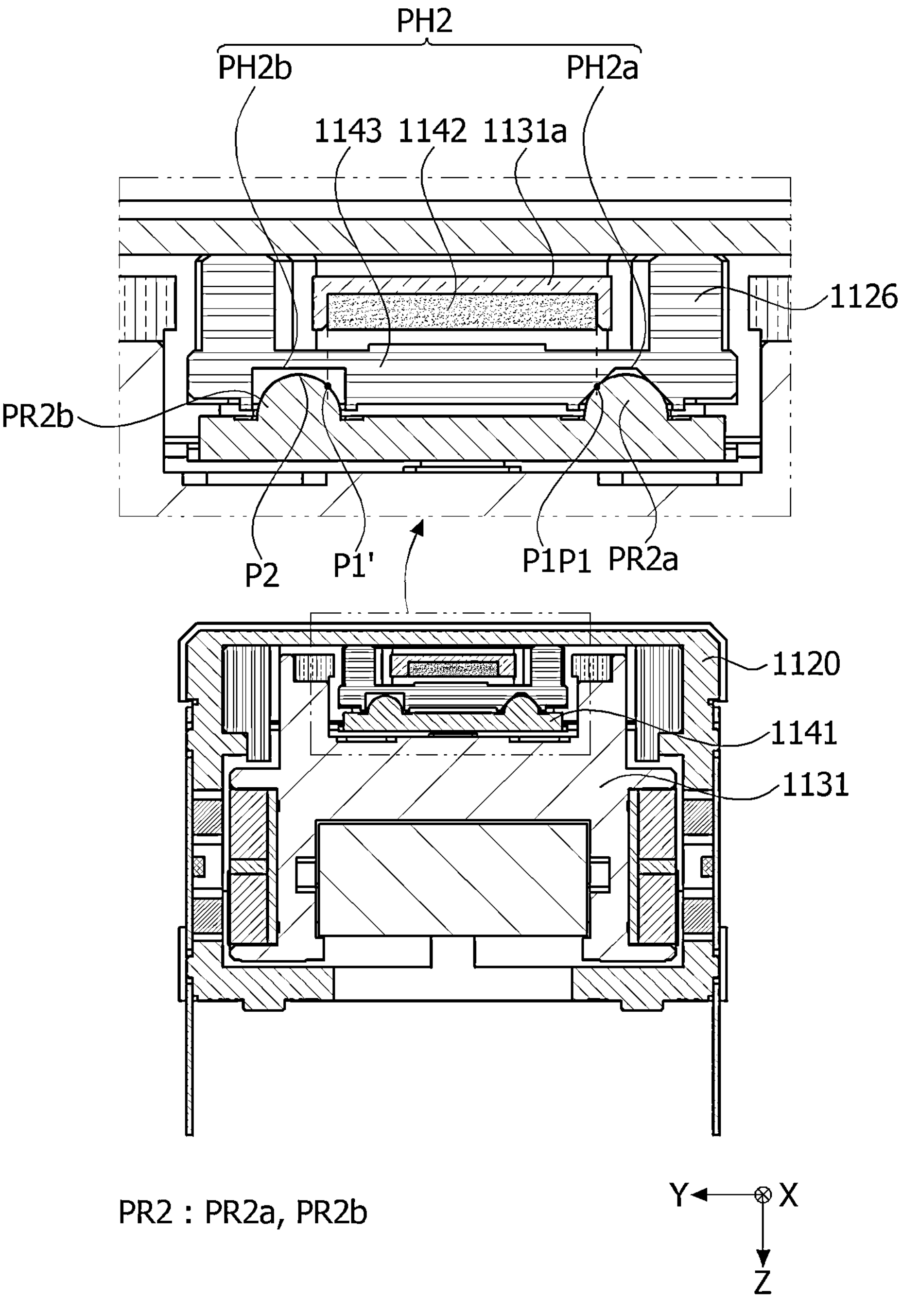
FIG. 14E is a cross-sectional view of the first camera actuator according to still another embodiment.

FIG. 14E is a cross-sectional view of a first camera actuator according to still another embodiment.

Referring to FIG. 14E, the above-described contents except for the contents to be described below can be applied to the first camera actuator according to still another embodiment in the same manner. Even in the first camera actuator according to another embodiment, any protruding portions of the first protruding portions and the second protruding portions may be disposed to be spaced apart from each other in the horizontal direction or the second direction (Y-axis direction) and may have a contact point of any one of the mover 1130 and the housing 1120 (e.g., the first member 1126).

In addition, the second protruding portions PR2 may be spaced apart from each other in the horizontal direction or the second direction (Y-axis direction) and may have a contact point with the housing (or the first member). In addition, the second protruding portion PR2 may include the first sub-protrusion PR2*a* and the second sub-protrusion PR2*b* spaced apart from each other in the horizontal direction or the second direction (Y-axis direction). In addition, the second protrusion groove PH2 may include the first contact point P1 in contact with the first sub-protrusion PR2*a* therein. Furthermore, the second protrusion groove PH2 may include the second contact point P2 in contact with the second sub-protrusion PR2*b* therein. For example, the number of second protrusion grooves PH2 may correspond to the number of second protruding portions PR2. Therefore, the second protrusion groove PH2 may include the 2-1 protrusion groove PH2*a* and the 2-2 protrusion groove PH2*b*. The 2-1 protrusion groove PH2*a* and the 2-2 protrusion groove PH2*b* may be spaced apart from each other in the second direction (Y-axis direction). In addition, the first sub-protrusion PR2*a* may include a contact point in contact with the 2-1 protrusion groove PH2*a*. As described above, the number of contact points may vary depending on the number of inclined surfaces in the second protrusion groove PH2. In this case, the first contact point P1 may be positioned therein or at an innermost side of the second protrusion groove PH2. Furthermore, a plurality of first contact points P1 may be provided. In addition, "inward" may be a direction toward the center point on the XY plane. In addition, the 2-2 protrusion groove PH2*b* may include the second contact point P2 in contact with the second sub-protruding portion PR2*b*.

Therefore, at least a portion of the first magnet 1143 may overlap the first sub-protrusion PR2*a* and the second sub-protrusion PR2*b* in the optical axis direction. In other words, the first magnet 1143 may overlap the inner region of the first contact point P1 of the first sub-protrusion PR2*a* in the optical axis direction or the third direction (Z-axis direction). In addition, the first magnet 1143 may overlap an inner region of the second contact point P2 of the second sub-protrusion PR2*b* in the optical axis direction or the third direction (Z-axis direction). In addition, the first magnet 1143 may overlap a region between the first sub-protrusion PR2*a* and the second sub-protrusion PR2*b* in the optical axis direction or the third direction (Z-axis direction).

In addition, the area of the region where the first magnet 1143 and the first sub-protrusion PR2*a* overlap each other in the third direction (Z-axis direction) may be the same as the area of a region where the first magnet 1143 and the second sub-protrusion PR2*b* overlap each other in the third direction (Z-axis direction). Therefore, the area of the region where the first magnet 1143 and the first sub-protrusion PR2*a* overlap each other in the third direction (Z-axis direction) may be the same as the area of the region where the first magnet 1143 and the second sub-protrusion PR2*b* overlap each other in the third direction (Z-axis direction). Therefore, the first magnet 1143 may be positioned between the point P1' corresponding to the first contact point P1 with respect to the first contact point P1 and the center point. Therefore, the first magnet 1143 may also be bisected in the second direction with respect to the center point. In addition, the contact point P1' may not overlap the first magnet 1143 in the optical axis direction or the third direction (Z-axis direction). In addition, the second magnet 1142 may not overlap the contact point P1' in the optical axis direction or the third direction. With this configuration, the magnetic force or force generated from the first magnet 1143 applied toward the second protruding portion PR2 may be decreased. In other words, since the protruding portion of the tilting guide unit in the camera actuator may be less affected by the magnetic force caused by the magnet, friction between the protruding portion and the contact point can be decreased, thereby increasing current consumption and increasing a suppression ratio for an OIS.

In addition, as described above with reference to FIG. 14C, the second contact point P2 may be positioned on the line or XZ plane which bisects the 2-2 protrusion groove PH2*b*. The above-described contents are applied to the following description in the same manner.

Figure 15A:
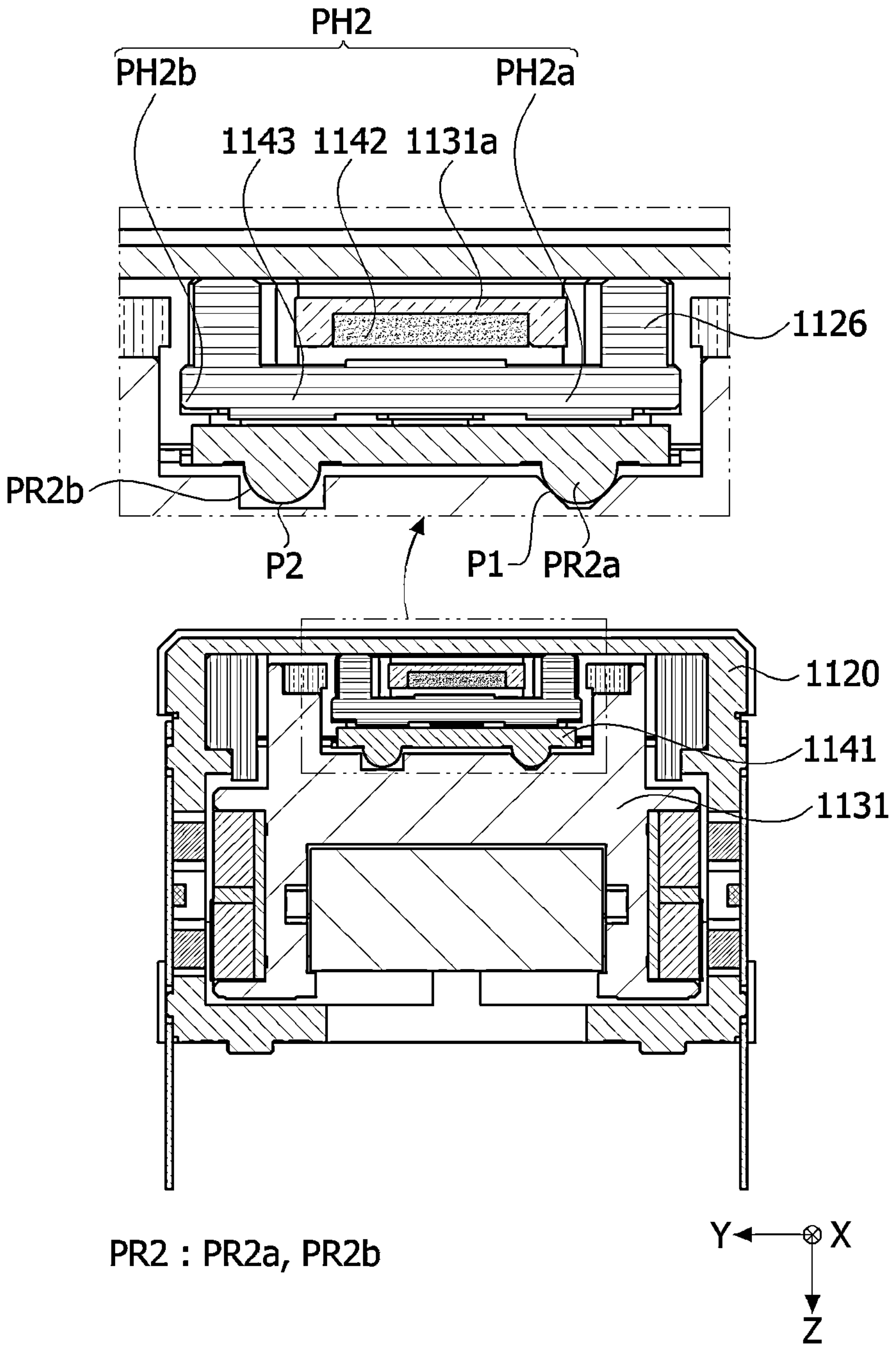
FIGS. 15A and 15B are cross-sectional views of a first camera actuator according to a modified embodiment.
Figure 15B:
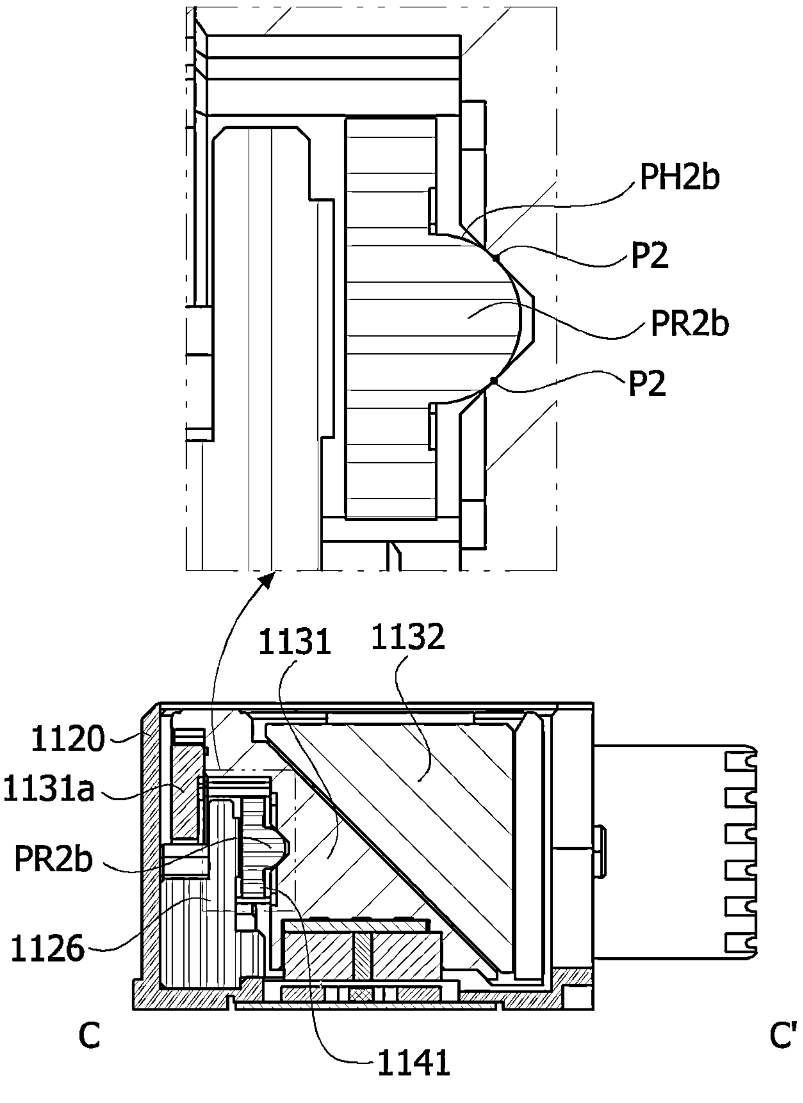

FIGS. 15A and 15B are cross-sectional views of a first camera actuator according to a modified embodiment.

Referring to FIGS. 15A and 15B, the above-described contents except for the contents to be described below can be applied to the first camera actuator according to the modified embodiment in the same manner. Even in the first camera actuator according to the modified embodiment, any protruding portions of the first protruding portions and the second protruding portions may be disposed to be spaced apart from each other in the horizontal direction or the second direction (Y-axis direction) and may have a contact point of any one of the mover 1130 and the housing 1120 (e.g., the first member 1126).

In this case, the first protruding portions PR1 may be spaced apart from each other in the horizontal direction or the second direction (Y-axis direction) and may have a contact point with the mover 1130. The first protruding portion PR1 may include the 1-1 protruding portion and the 1-2 protruding portion. In addition, the second protruding portion PR2 may include the 2-1 protruding portion and the 2-2 protruding portion spaced apart from each other in the vertical direction or the first direction (X-axis direction). In addition, the first protrusion groove PH1 may include a contact point in contact with the 1-1 protruding portion PR1 therein. Furthermore, the first protrusion groove PH1 may include the second contact point P2 in contact with the 1-2 protruding portion therein. For example, the number of first protrusion grooves PH1 may correspond to the number of second protruding portions PR1. Therefore, the first protrusion groove PH1 may include the 1-1 protrusion groove and the 1-2 protrusion groove. The 1-1 protrusion groove and the 1-2 protrusion groove may be spaced apart from each other in the second direction (Y-axis direction). In addition, the 1-1 protruding portion may include a contact point in contact with the 1-1 protrusion groove. As described above, the number of contact points may vary depending on the number of inclined surfaces in the first protrusion groove PH1. In this case, the first contact point P1 may be positioned therein or at an innermost side of the first protrusion groove PH1. Furthermore, a plurality of first contact points P1 may be provided. In addition, the inside may be a direction toward the center point on the XY plane. In addition, the 1-2 protrusion groove may include the second contact point P2 in contact with the 1-2 protruding portion.

Therefore, the first magnet 1143 may not overlap the 1-1 protruding portion and the 1-2 protruding portion in the optical axis direction. In addition, at least a portion of the first magnet 1143 may overlap the 1-1 protruding portion and the 1-2 protruding portion in the optical axis direction. For example, the first magnet 1143 may overlap the inner region of the first contact point P1 of the 1-1 protruding portion in the optical axis direction or the third direction (Z-axis direction). In addition, the first magnet 1143 may overlap the inner region of the second contact point P2 of the 1-2 protruding portion in the optical axis direction or the third direction (Z-axis direction). In addition, the first magnet 1143 may overlap the region between the first sub-protrusion PR2*a* and the second sub-protrusion PR2*b* in the optical axis direction or the third direction (Z-axis direction). Therefore, the magnetic force or force generated from the first magnet 1143 applied toward the first protruding portion PR1 may be decreased. In other words, since the protruding portion of the tilting guide unit in the camera actuator may be less affected by the magnetic force caused by the magnet, friction between the protruding portion and the contact point can be decreased, thereby increasing current consumption and increasing a suppression ratio for an OIS. Furthermore, with this configuration, as the mover rotates with respect to the first protruding portion PR1, a change in light provided to the image sensor in response to the rotation of the tilting guide unit may become greater. Therefore, even when a height in the vertical direction is small, light incident in the first direction moves by being reflected in the third direction, thereby providing a wide changeable optical range in the vertical direction (first direction). Furthermore, it is possible to provide a more improved rotational radius in the vertical direction than a rotational radius in the horizontal direction.

Figure 16:
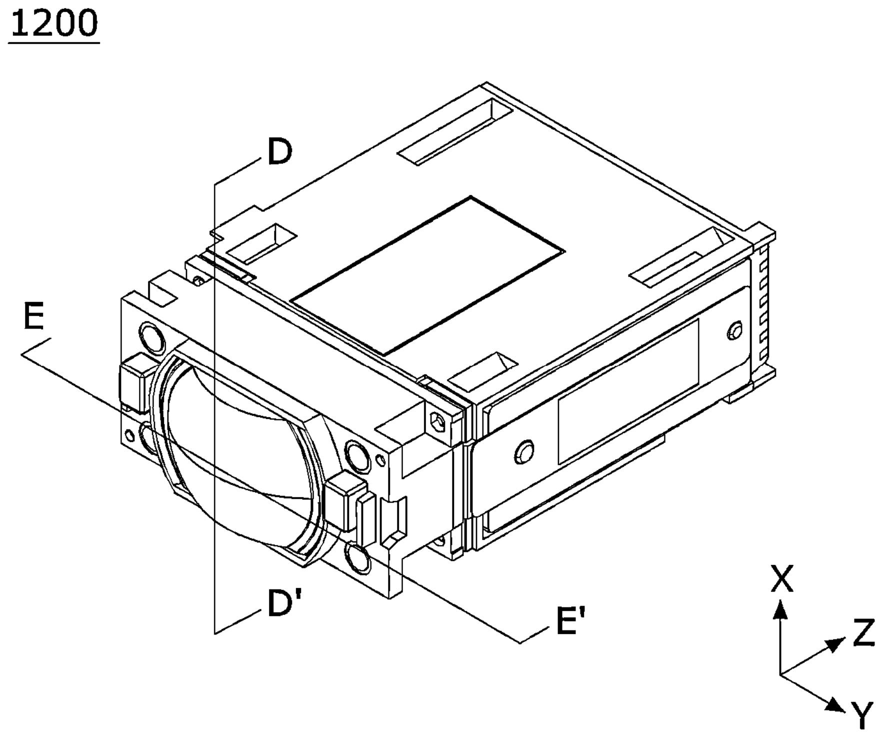
FIG. 16 is a perspective view of a second camera actuator according to the embodiment.
Figure 17:
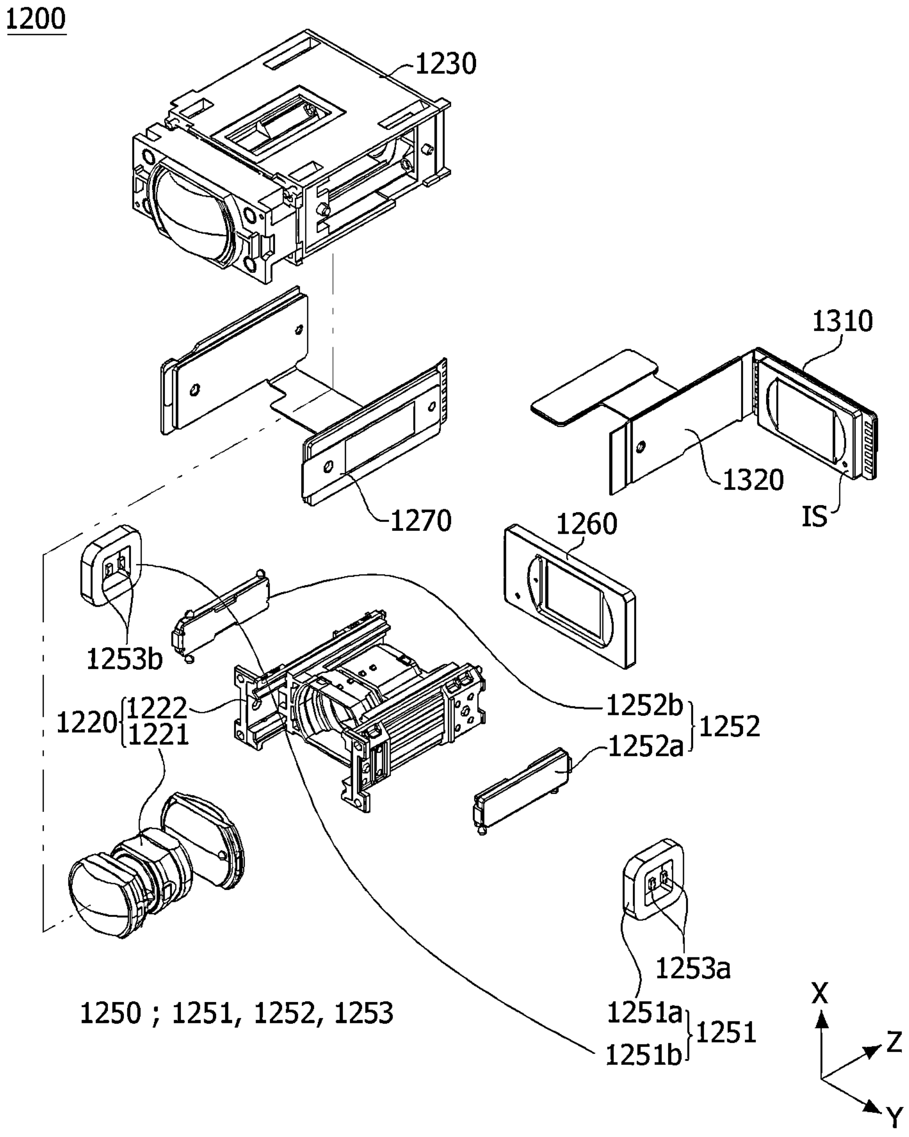
FIG. 17 is an exploded perspective view of the second camera actuator according to the embodiment.
Figure 18:
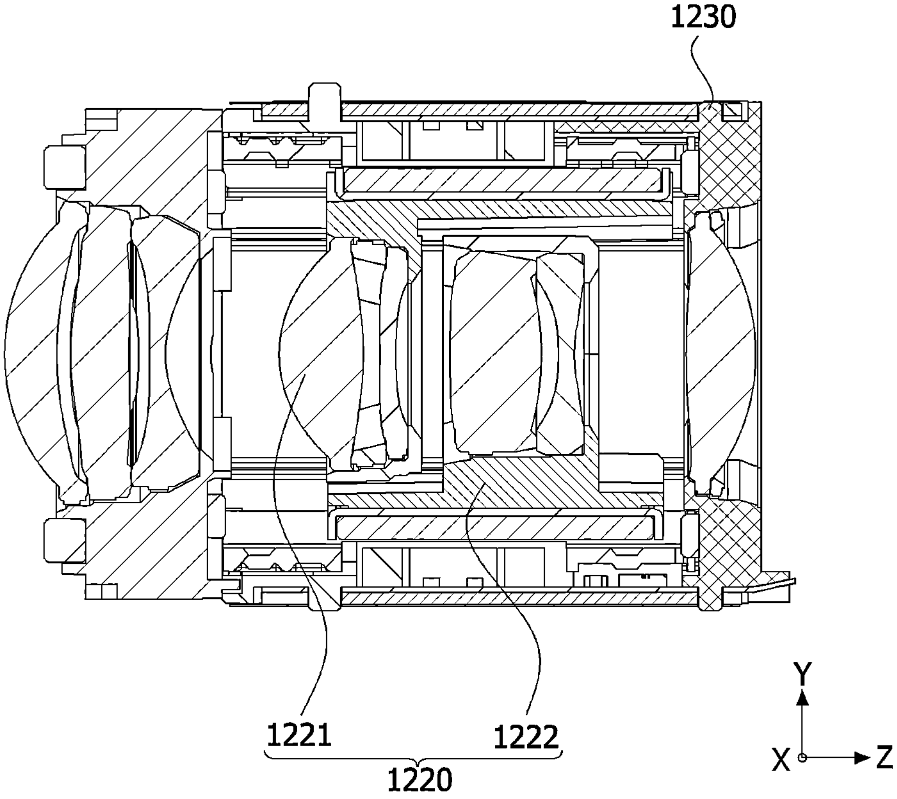
FIG. 18 is a cross-sectional view along line DD' in FIG. 16.
Figure 19:
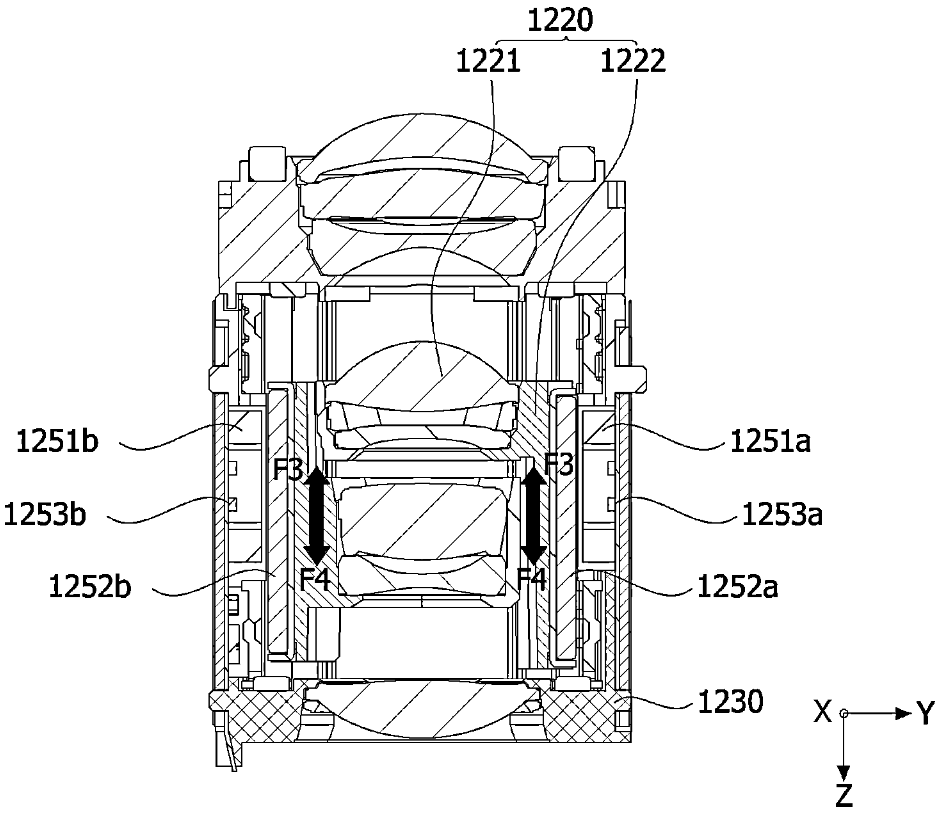
FIG. 19 is a cross-sectional view along line EE' in FIG. 16.

FIG. 16 is a perspective view of a second camera actuator according to the embodiment, FIG. 17 is an exploded perspective view of the second camera actuator according to the embodiment, FIG. 18 is a cross-sectional view along line DD' in FIG. 16, and FIG. 19 is a cross-sectional view along line EE' in FIG. 16.

Referring to FIGS. 16 to 19, a second camera actuator 1200 according to an embodiment may include a lens unit 1220, a second housing 1230, a second driving unit 1250, a base unit (not shown), and a second board unit 1270. Furthermore, the second camera actuator 1200 may further include a second shield can (not shown), an elastic unit (not shown), and a bonding member (not shown). Furthermore, the second camera actuator 1200 according to the embodiment may further include an image sensor IS.

The second shield can (not shown) may be positioned in one region (e.g., an outermost side) of the second camera actuator 1200 and positioned to surround the components (the lens unit 1220, the second housing 1230, the second driving unit 1250, the base unit (not shown), the second board unit 1270, and the image sensor IS) to be describe below.

The second shield can (not shown) can block or reduce electromagnetic waves generated from the outside. Therefore, it is possible to reduce the occurrence of malfunction in the second driving unit 1250.

The lens unit 1220 may be positioned in the second shield can (not shown). The lens unit 1220 may move in the third direction (Z-axis direction). Therefore, the above-described AF function may be performed.

Specifically, the lens unit 1220 may include a lens assembly 1221 and a bobbin 1222.

The lens assembly 1221 may include at least one lens. In addition, although a plurality of lens assemblies 1221 may be provided, the following description will be made based on one lens assembly.

The lens assembly 1221 may be coupled to the bobbin 1222 and moved in the third direction (Z-axis direction) by an electromagnetic force generated from a fourth magnet 1252*a* and a second magnet 1252*b* coupled to the bobbin 1222.

The bobbin 1222 may include an opening region surrounding the lens assembly 1221. In addition, the bobbin 1222 may be coupled to the lens assembly 1221 by any of various methods. In addition, the bobbin 1222 may include a groove in a side surface thereof and may be coupled to the fourth magnet 1252*a* and the second magnet 1252*b* through the groove. A bonding member or the like may be applied to the groove.

In addition, the bobbin 1222 may be coupled to elastic units (not shown) on an upper end and rear end thereof. Therefore, the bobbin 1222 may be supported by the elastic units (not shown) while moving in the third direction (Z-axis direction). In other words, a position of the bobbin 1222 may be maintained in the third direction (Z-axis direction). The elastic unit (not shown) may be formed of a leaf spring.

The second housing 1230 may be disposed between the lens unit 1220 and the second shield can (not shown). In addition, the second housing 1230 may be disposed to surround the lens unit 1220.

The second housing 1230 may have a hole formed in a side portion thereof. A fourth coil 1251*a* and a fifth coil 1251*b* may be disposed in the hole. The hole may be positioned to correspond to the above-described groove of the bobbin 1222.

The fourth magnet 1252*a* may be positioned to face the fourth coil 1251*a*. In addition, the second magnet 1252*b* may be positioned to face the fifth coil 1251*b*.

The elastic unit (not shown) may include a first elastic member (not shown) and a second elastic member (not shown). The first elastic member (not shown) may be coupled to an upper surface of the bobbin 1222. The second elastic member (not shown) may be coupled to a lower surface of the bobbin 1222. In addition, the first elastic member (not shown) and the second elastic member (not shown) may be formed of a leaf spring as described above. In addition, the first elastic member (not shown) and the second elastic member (not shown) may provide elasticity for moving the bobbin 1222.

The second driving unit 1250 may provide driving forces F3 and F4 for moving the lens unit 1220 in the third direction (Z-axis direction). The second driving unit 1250 may include a driving coil 1251 and a driving magnet 1252.

The lens unit 1220 may be moved in the third direction (Z-axis direction) by the electromagnetic force generated between the driving coil 1251 and the driving magnet 1252.

The driving coil 1251 may include the fourth coil 1251*a* and the fifth coil 1251*b*. The fourth coil 1251*a* and the fifth coil 1251*b* may be disposed in the holes formed in the side portions of the second housing 1230. In addition, the fourth coil 1251*a* and the fifth coil 1251*b* may be electrically connected to the second board unit 1270. Therefore, the fourth coil 1251*a* and the fifth coil 1251*b* may receive a current or the like through the second board unit 1270.

The driving magnet 1252 may include the fourth magnet 1252*a* and the fifth magnet 1252*b*. The fourth magnet 1252*a* and the fifth magnet 1252*b* may be disposed in the above-described groove of the bobbin 1222 and positioned to correspond to the fourth coil 1251*a* and the fifth coil 1251*b*.

A base unit (not shown) may be positioned between the lens unit 1220 and the image sensor IS. A component such as a filter may be fixed to the base unit (not shown). In addition, the base unit (not shown) may be disposed to surround the image sensor IS. With this configuration, since the image sensor IS is free from foreign substance and the like, it is possible to improve the reliability of the device.

In addition, the second camera actuator may be a zoom actuator or an AF actuator. For example, the second camera actuator may support one lens or a plurality of lenses and perform an AF function or a zooming function by moving the lenses according to a predetermined control signal of a controller.

In addition, the second camera actuator may be a fixed zoom or a continuous zoom. For example, the second camera actuator may provide movement of the lens assembly 1221.

In addition, the second camera actuator may be formed of a plurality of lens assemblies. For example, at least one of a first lens assembly (not shown), a second lens assembly (not shown), a third lens assembly (not shown), and a guide pin (not shown) may be disposed in the second camera actuator. The above-described contents can be applied to the same. Therefore, the second camera actuator may perform a high-magnification zooming function through the driving unit. For example, although the first lens assembly (not shown) and the second lens assembly (not shown) may be moving lenses that move through the driving unit and the guide pin (not shown) and the third lens assembly (not shown) may be a fixed lens, the present invention is not limited thereto. For example, the third lens assembly (not shown) may perform a function of a focator by which light forms an image at a specific position, and the first lens assembly (not shown) may perform a function of a variator for re-forming an image formed by the third lens assembly (not shown), which is the focator, at another position. Meanwhile, the first lens assembly (not shown) may be in a state in which a magnification change is large because a distance to a subject or an image distance is greatly changed, and the first lens assembly (not shown), which is the variator, may play an important role in a focal length or magnification change of the optical system. Meanwhile, imaging points of an image formed by the first lens assembly (not shown), which is the variator, may be slightly different depending on a position. Therefore, the second lens assembly (not shown) may perform a position compensation function for the image formed by the variator. For example, the second lens assembly (not shown) may perform a function of a compensator for accurately forming an image at an actual position of the image sensor using the imaging points of the image formed by the second lens assembly (not shown) which is the variator.

The image sensor IS may be positioned inside or outside the second camera actuator. In an embodiment, as shown, the image sensor IS may be positioned inside the second camera actuator. The image sensor IS may receive light and convert the received light into an electrical signal. In addition, the image sensor IS may include a plurality of pixels in the form of an array. In addition, the image sensor IS may be positioned on the optical axis.

As described above, the circuit board 1300 according to the embodiment may include a first circuit board unit 1310 and a second circuit board unit 1320. The first circuit board unit 1310 may be positioned under the base and coupled to the base. In addition, the image sensor IS may be disposed on the first circuit board unit 1310. In addition, the first circuit board unit 1310 and the image sensor IS may be electrically connected.

In addition, the second circuit board unit 1320 may be positioned on a side portion of the base. In particular, the second circuit board unit 1320 may be positioned on a first side portion of the base. Therefore, the second circuit board unit 1320 may be positioned adjacent to the first coil positioned adjacent to the first side portion for easy electrical connection.

Furthermore, the circuit board 1300 may further include a fixed board (not shown) positioned on a side surface thereof. Therefore, even when the circuit board 1300 is made of a flexible material, the circuit board 1300 may be coupled to the base while maintaining stiffness by the fixed board.

The second circuit board unit 1320 of the circuit board 1300 may be positioned on the side portion of the second driving unit 1250. The circuit board 1300 may be electrically connected to the first driving unit and the second driving unit. For example, the electrical connection may be made by a surface mounting technology (SMT). However, the present invention is not limited to such a method.

The circuit board 1300 may include a circuit board having wiring patterns which may be electrically connected, such as a rigid PCB, a flexible PCB, or a rigid-flexible PCB. However, the present invention is not limited to these types.

In addition, the circuit board 1300 may be electrically connected to another camera module in the terminal or a processor of the terminal. Therefore, the above-described camera actuator and camera device including the same may transmit and receive various signals in the terminal.

Figure 20:
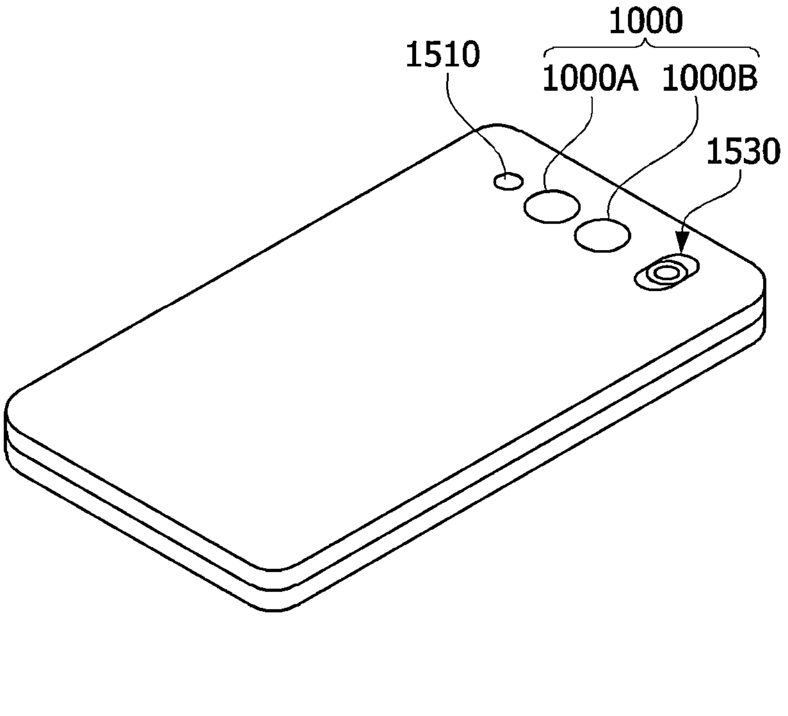
FIG. 20 is a perspective view of a mobile terminal to which the camera module according to the embodiment is applied.

FIG. 20 is a perspective view of a mobile terminal to which the camera module according to the embodiment is applied.

As shown in FIG. 20, a mobile terminal 1500 according to an embodiment may include a camera module 1000, a flash module 1530, and an AF device 1510, which are provided on a rear surface thereof.

The camera module 1000 may include an image capturing function and an AF function. For example, the camera module 1000 may include the AF function using an image.

The camera module 1000 processes an image frame of a still image or a moving image obtained by an image sensor in a capturing mode or a video call mode.

The processed image frame may be displayed on a predetermined display and stored in a memory. A camera (not shown) may also be disposed on a front surface of a body of the mobile terminal.

For example, the camera module 1000 may include a first camera module 1000A and a second camera module 1000B, and at least one of the first camera module 1000A and the second camera module 1000B can implement an OIS function together with an AF or zooming function.

The flash module 1530 may include a light emitting device for emitting light therein. The flash module 1530 may be operated by a camera operation of the mobile terminal or a user's control.

The AF device 1510 may include one of a package of a surface light emitting laser device as a light emitting unit.

The AF device 1510 may include the AF function using a laser. The AF device 1510 may be mainly used in a condition that the AF function using the image of the camera module 1000 is degraded, for example, a proximity of 10 m or less or dark environment.

The AF device 1510 may include a light emitting unit including a vertical cavity surface emitting laser (VCSEL) semiconductor device and a light receiving unit for converting light energy into electrical energy, such as a photodiode.

Figure 21:
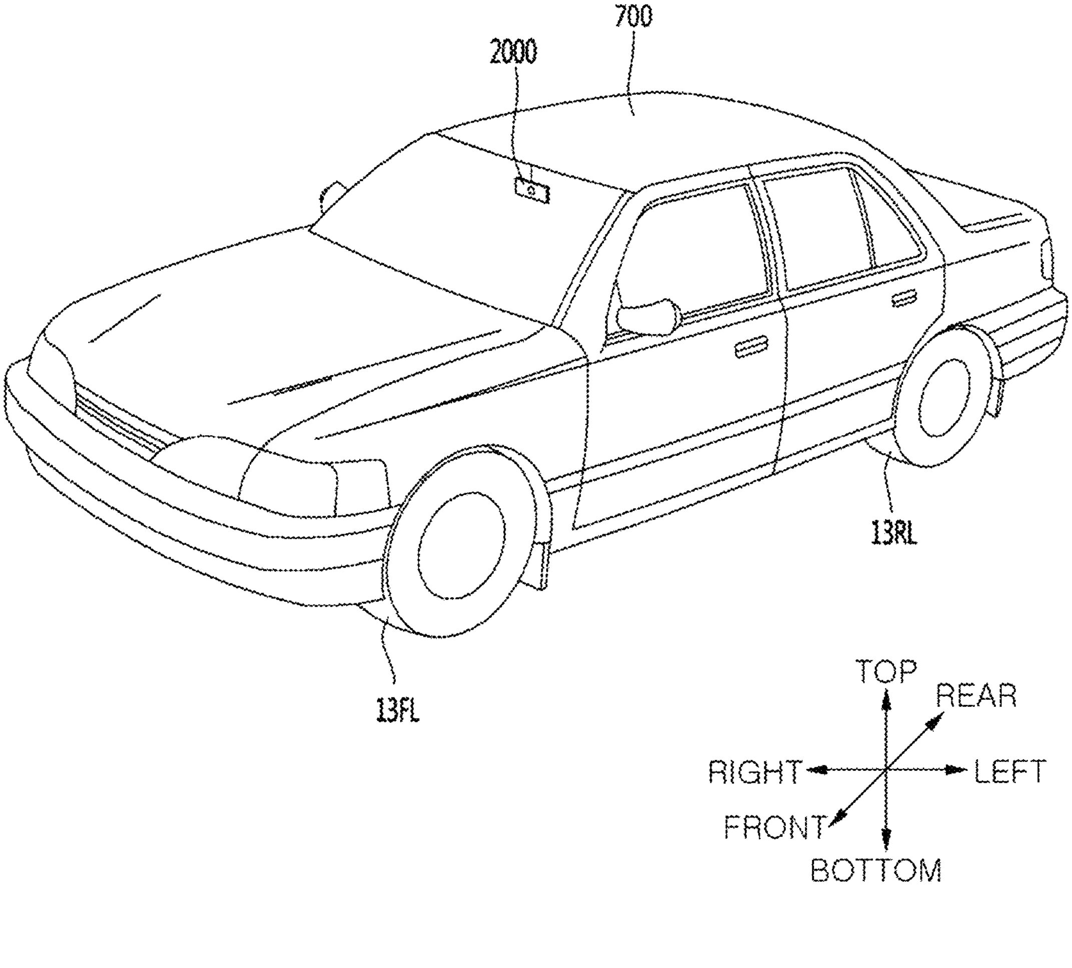
FIG. 21 is a perspective view of a vehicle to which the camera module according to the embodiment is applied.

FIG. 21 is a perspective view of a vehicle to which the camera module according to the embodiment is applied.

For example, FIG. 21 is an external view showing the vehicle including a vehicle driving assistance device to which the camera module 1000 according to the embodiment is applied.

Referring to FIG. 21, a vehicle 700 according to the embodiment may include wheels 13FL and 13FR rotated by a power source and a predetermined sensor. Although the sensor may be a camera sensor 2000, the present invention is not limited thereto.

The camera sensor 2000 may be a camera sensor to which the camera module 1000 according to the embodiment is applied. The vehicle 700 according to the embodiment may acquire image information through the camera sensor 2000 for capturing a forward image or a surrounding image, determine a situation in which a lane line is not identified using the image information, and generate a virtual lane line when the lane line is not identified.

For example, the camera sensor 2000 may acquire a forward image by capturing a view in front of the vehicle 700, and a processor (not shown) may acquire image information by analyzing an object included in the front image.

For example, when a lane line, an adjacent vehicle, a traveling obstacle, and objects, such as a median, a curb, or a tree corresponding to an indirect road mark, are captured in the image captured by the camera sensor 2000, the processor may detect the object and include the detected object in the image information. At this time, the processor may further supplement the image information by acquiring distance information to the object detected through the camera sensor 2000.

The image information may be information on the object captured in the image. The camera sensor 2000 may include an image sensor and an image processing module.

The camera sensor 2000 may process still images or moving images obtained by the image sensor (e.g., a complementary metal-oxide semiconductor (CMOS) or a charge-coupled device (CCD)).

The image processing module may process the still images or moving images acquired through the image sensor to extract necessary information, and transmit the extracted information to the processor.

In this case, although the camera sensor 2000 may include a stereo camera for improving the measurement accuracy of the object and further securing information such as a distance between the vehicle 700 and the object, the present invention is not limited thereto.

Although embodiments have been mainly described above, these are only illustrative and do not limit the present invention, and those skilled in the art to which the present invention pertains can know that various modifications and applications not exemplified above are possible without departing from the essential characteristics of the embodiments. For example, each component specifically shown in the embodiments may be implemented by modification. In addition, differences related to these modifications and applications should be construed as being included in the scope of the present invention defined in the appended claims.

The invention claimed is:

1. A camera actuator comprising:

a housing;

a mover which is disposed in the housing and in which an optical member is disposed;

a tilting guide unit configured to guide tilting of the mover; and a first magnet and a second magnet bigger than the first magnet, which press the tilting guide unit against the mover, wherein the tilting guide unit includes a base, first protruding portions protruding from one surface of the base toward the mover, and second protruding portions protruding from the other surface of the base in a direction opposite to a protruding direction of the first protruding portion, wherein any protruding portions of the first protruding portions and the second protruding portions are disposed to be spaced apart from each other in a horizontal direction and have a plurality of contact points with any one of the mover and the housing, and wherein the first magnet is positioned between contact points facing each other among the plurality of contact points.

2. The camera actuator of claim 1, wherein the mover includes a first groove in which the first protruding portion is disposed.

3. The camera actuator of claim 2, wherein the housing includes a second groove in which the second protruding portion is disposed.

4. The camera actuator of claim 3, wherein the second protruding portion includes a first sub-protrusion and a second sub-protrusion spaced apart from each other in the horizontal direction.

5. The camera actuator of claim 4, wherein the second groove includes a first contact point and a second contact point therein, wherein the first contact point is in contact with the first sub-protrusion, and the second contact point is in contact with the second sub-protrusion.

6. The camera actuator of claim 5, wherein an inner region of the first contact point in the first sub-protrusion has a different area from an inner region of the second contact point in the second sub-protrusion.

7. The camera actuator of claim 5, wherein the first magnet is positioned between the first contact point and the second contact point.

8. The camera actuator of claim 5, wherein at least a portion of the first magnet overlaps the first sub-protrusion and the second sub-protrusion in an optical axis direction.

9. The camera actuator of claim 8, wherein the optical axis direction corresponds to a direction from the first magnet to the second magnet.

10. The camera actuator of claim 5, wherein the first magnet does not overlap the first contact point and the second contact point in an optical axis direction.

11. The camera actuator of claim 5, wherein the first magnet is disposed inside the first protruding portion separated in a vertical direction.

12. The camera actuator of claim 11, wherein the vertical direction is a direction perpendicular to an optical axis direction and is parallel to a direction in which light is incident on an optical member.

13. The camera actuator of claim 4, wherein the first magnet is disposed between the first sub-protrusion and the second sub-protrusion and does not overlap the first sub-protrusion and the second sub-protrusion in an optical axis direction.

14. The camera actuator of claim 1, wherein the first magnet and the second magnet may face each other with the same polarity.

15. The camera actuator of claim 1, wherein the other of the first protruding portions and the second protruding portions are disposed to be spaced apart from each other in a vertical direction and have a plurality of contact points with the other of the mover and the housing.

16. The camera actuator of claim 1, wherein a repulsive force generated from the first magnet and the second magnet presses the tilting guide unit on the mover.

17. The camera actuator of claim 1, wherein a center of the first magnet and a center of the second magnet are arranged side by side along an optical axis.

18. The camera actuator of claim 1, wherein the first magnet is positioned in a virtual linear line extending both ends of the second magnet in an optical axis direction.

19. The camera actuator of claim 1, wherein a separation distance of the second magnet and the first magnet from the mover in the an optical axis direction is greater than a separation distance of the second magnet and the first magnet from the tilting guide unit in the optical axis direction.

20. The camera actuator of claim 1, wherein the first magnet and the second magnet are spaced apart from each other in an optical axis direction.

* * * * *